United States Patent
Murayama et al.

[11] Patent Number: 5,940,524
[45] Date of Patent: Aug. 17, 1999

[54] IMAGE PROCESSING METHOD AND IMAGE PROCESSING DEVICE

[75] Inventors: Yasuhiko Murayama; Mikio Aoki; Naoki Kuwata, all of Nagano-ken, Japan

[73] Assignee: Seiko Epson Corporation, Tokyo, Japan

[21] Appl. No.: 09/025,800

[22] Filed: Feb. 19, 1998

Related U.S. Application Data

[62] Division of application No. 08/480,869, Jun. 7, 1995, Pat. No. 5,764,813.

[30] Foreign Application Priority Data

| Jul. 25, 1994 | [JP] | Japan | 6-172693 |
| Dec. 14, 1994 | [JP] | Japan | 6-310990 |

[51] Int. Cl.$^6$ ............................................. G06K 9/00
[52] U.S. Cl. .......................... 382/112; 380/270; 358/465
[58] Field of Search ........................... 382/248, 250, 382/260, 261, 270, 271, 272, 112, 176, 273; 375/240; 358/401, 405, 406, 462, 465, 466

[56] References Cited

U.S. PATENT DOCUMENTS

| 4,462,408 | 7/1984 | Silverstein et al. | 600/146 |
| 4,513,439 | 4/1985 | Gorgone | 382/135 |
| 4,691,329 | 9/1987 | Juri et al. | 375/240 |
| 4,879,753 | 11/1989 | El-Sherbini | 382/270 |
| 4,903,317 | 2/1990 | Nishihara et al. | 382/248 |
| 5,428,728 | 6/1995 | Lung et al. | 345/469 |
| 5,467,404 | 11/1995 | Vuylsteke et al. | 382/274 |
| 5,471,309 | 11/1995 | Bolza-Schunemann | 356/394 |
| 5,519,792 | 5/1996 | Gershony | 382/254 |
| 5,537,495 | 7/1996 | Overton | 382/269 |
| 5,553,166 | 9/1996 | Kakutani | 382/252 |
| 5,619,596 | 4/1997 | Iwaki | 382/278 |

Primary Examiner—Joseph Mancuso
Assistant Examiner—Vikkram Bali
Attorney, Agent, or Firm—Oliff & Berridge, PLC

[57] ABSTRACT

An image processing method and device computes the image quality as an evaluation value, determine the image quality based on this evaluation value, and employ a restoration process in accordance with image quality when this image quality is poor. The image processing device includes an image quality computation unit to extract a characteristic amount to determine the image quality of the image data entered by an image input device and to compute the characteristic amount as the evaluation value, a binary threshold determination unit to determine a binary threshold value for the image to be processed using an evaluation value obtained by the image quality computation unit, and an image quality improvement unit to determine candidates for image quality improvement unit by extracting sections which have the possibility of image quality deterioration based on the characteristics and to perform image quality improvement on candidates for image quality improvement processing using the evaluation value obtained by said image quality computation unit. The image quality computation unit extracts a characteristic amount of the image in sections with the possibility of image quality deterioration unit determines the image quality using this characteristic amount as an evaluation value; the binary threshold value determination means determines the optimum binary threshold value on the basis of this evaluation value; and the image quality improvement unit extracts candidates for and performs the image quality improvement process only when image quality improvement is necessary.

16 Claims, 37 Drawing Sheets

▧ ··· SIZE OF ONE PIXEL

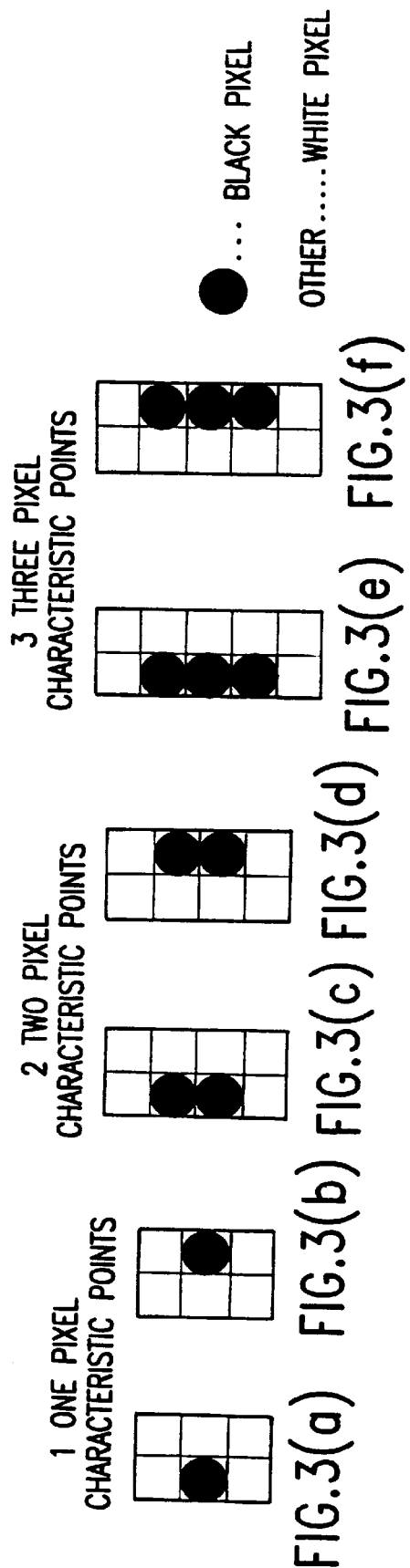

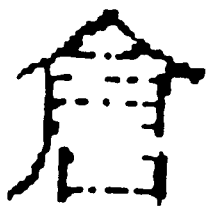  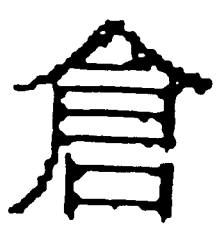 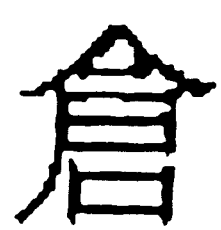
TH1= 5　　　TH1= 6　　　TH1= 7　　　TH1= 8
   
TH1= 9　　　TH1= 10　　　TH1= 11　　　TH1= 12
FIG.5

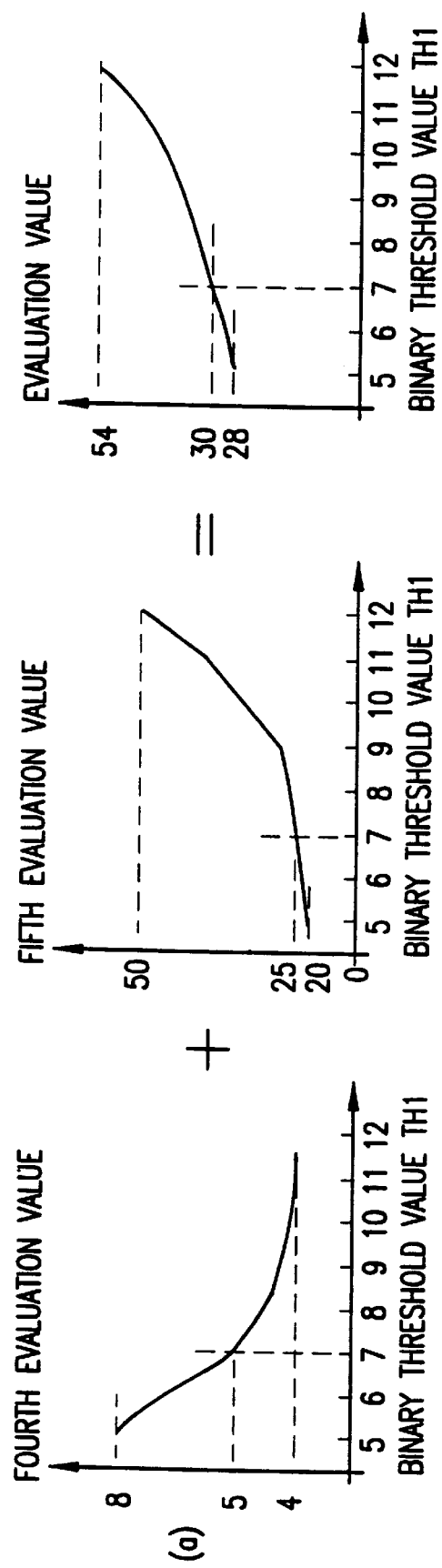

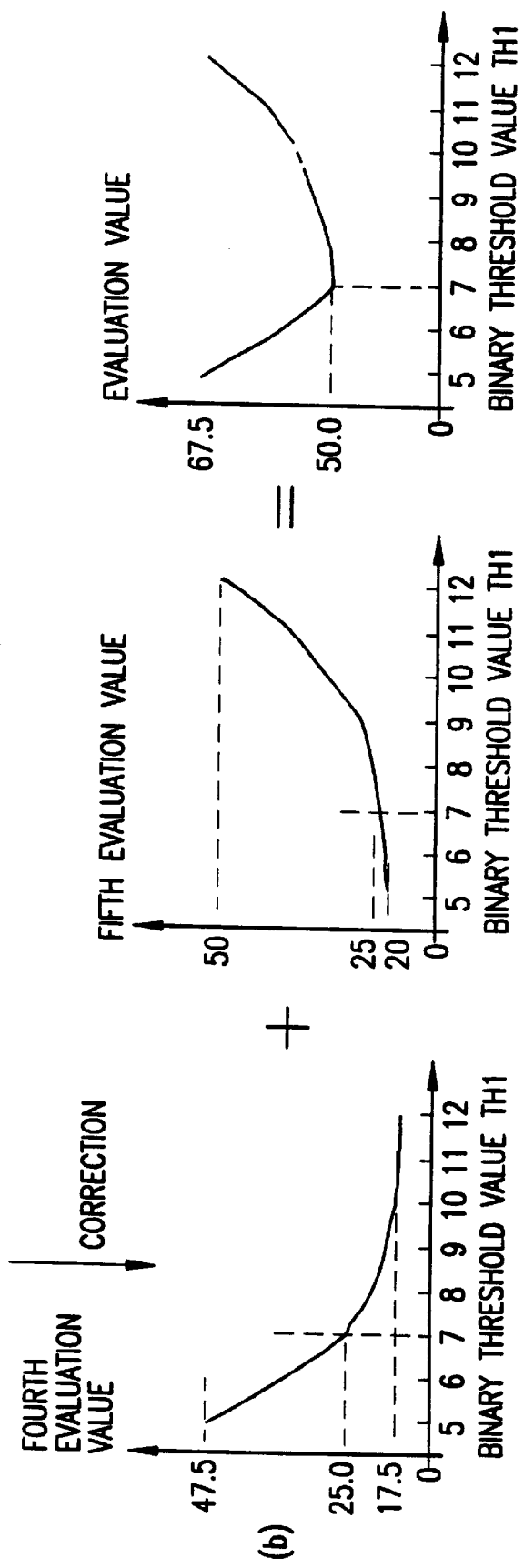

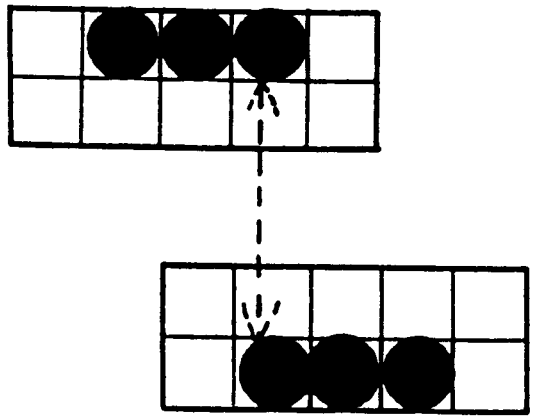
FIG.28(c) EXAMPLE OF SECOND CONDITION NOT SATISFIED
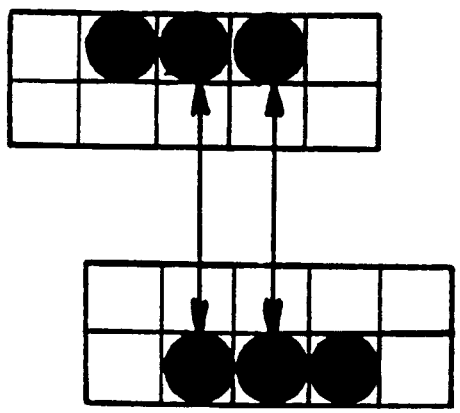
FIG.28(b) EXAMPLE OF SECOND CONDITION SATISFIED
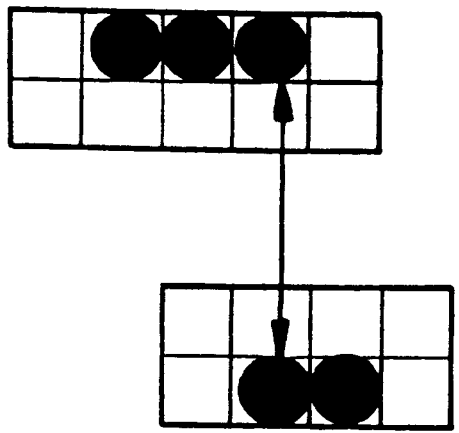
FIG.28(a) EXAMPLE OF FIRST CONDITION SATISFIED

ORIGINAL IMAGE

▨ ...ONE PIXEL CORRESPONDING SECTION

DETERIORATED IMAGE

▨ ... 1 ONE PIXEL

TWO PIXELS = SPACE

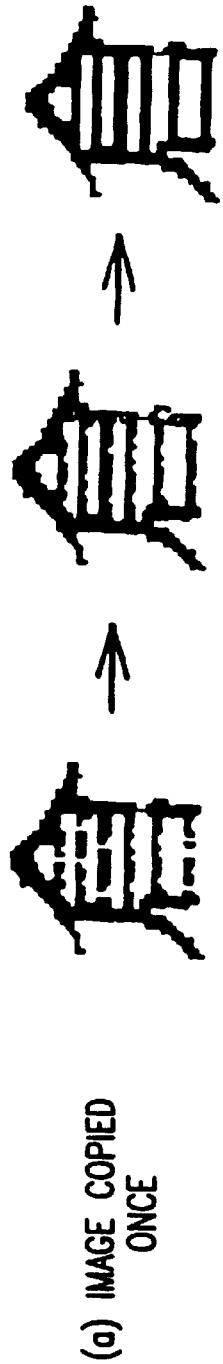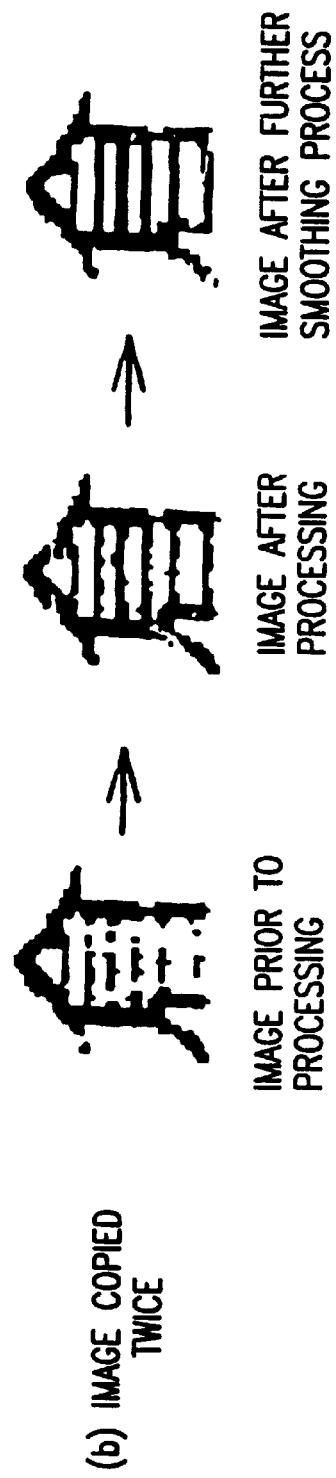

ORIGINAL IMAGE

IMAGE COPIED ONCE

IMAGE COPIED TWICE

IMAGE PROCESSING METHOD AND IMAGE PROCESSING DEVICE

CROSS REFERENCE TO RELATED APPLICATIONS

This application is a division of application Ser. No. 08/480,869, filed Jun. 7, 1995, now U.S. Pat. No. 5,764,813. This application is also related to application Ser. No. 08/478,784, filed Jun. 7, 1995 and titled "Image Processing Method and Image Processing Device."

FIELD OF THE INVENTION

The present invention relates to an image processing method and an image processing device which evaluates objectively the copy quality of a copy machine, for example, enables restoration of a deteriorated image, and further may be used as a preparatory process for an optical character recognition (OCR) process.

DESCRIPTION OF RELATED ART

The use of copy machines has spread widely in recent times. The capability of recent copy machines to restore images faithfully is improving rapidly. Digital copy machines, in particular, which are becoming more common today, can produce high quality copies with highly faithful copying capabilities.

Therefore, if an original to be copied has a clear and clean image, digital copy machines, with their highly faithful copying capabilities, can produce high quality copies that are virtually the same as the original. However, when the original is one that was copied by a conventional analog copy machine and the image has deteriorated, a digital copy machine, with its highly faithful copying capabilities, will reproduce a deteriorated copy.

Moreover, in recent years, optical character recognition technology is spreading in which a printed text is read by a scanner and characters from the input image data are extracted and changed into computer code. In such optical character recognition technology, a high ratio of recognition is achieved when a text is read by a scanner if the text is an original having a clear and clean character image as described in FIG. 41(a) rather than a copy produced by a copy machine.

However, even if the original has a clear and clean image, the image deteriorates with repeated copying and, if such a deteriorated image is read by a scanner, the copy may result in deteriorated images as described in FIG. 41(b) and FIG. 41(c). FIG. 41(b) represents an image produced by reading a once-copied original by a scanner, while (c) represents an image produced by reading the copy of a once-copied original (twice-copied original) by the scanner.

In order to cope with the deterioration of image quality as a result of copying, various measures have been provided for an optical character recognition mechanism. A dictionary for character recognition, including deteriorated character images, may be prepared and/or a function to repair some degree of unevenness provided.

As described above, a high level of capability to reproduce a faithful copy is required of copy machines, but when a deteriorated image (FIG. 41(b) and FIG. 41(c)) as a result of repeated copying is copied by a digital copy machine with a high level of capability to produce a faithful copy, there have been problems of inability to produce a high quality copy.

Moreover, evaluation of copy machine capability (evaluation of image quality) has been primarily performed by subjective evaluation. In other words, in general, human eyes, after seeing the copied image, determine the capability of the copy machine. Traditionally, there have been technologies associated with copy machines to correct the unevenness of deteriorated characters to some degree when characters which have deteriorated as a result of repeated copying are used as the object of optical character recognition or further copying, but there has been no technology to enable objective, numerical evaluation of image quality, to determine the quality of image, especially the so-called faintness or smudge of the characters, and to repair appropriately according to the deterioration condition of the image.

Moreover, in optical character recognition technology to extract and change into codes the characters from input image data, deteriorated characters are not sufficiently recognized. For example, suppose the character images of FIGS. 41(a), 41(b), and 41(c) were targeted for character recognition. Assuming the character recognition rate of FIG. 41(a) to be 100%, the rate drops rapidly with 90% for 41(b) and 80% for 41(c). Thus, a sufficient recognition rate is not obtained for deteriorated images. Moreover, images pleasing to the eye are not produced.

Furthermore, in assigning binary values to character images, it is necessary to determine the optimum binary threshold values, but the traditional binary threshold determination method does not result in optimum binary threshold values for characters. There have been cases in which faintness and smudges resulted after binary values were assigned to character images by final binary threshold values.

SUMMARY OF THE INVENTION

In order to solve these and other problems, the present invention provides an image processing method and an image processing device which, applied to a copy machine, evaluates the quality of the copied image objectively, determines deteriorated sections of the image, enables execution of an improvement process for the deteriorated sections according to the deterioration condition, enables determination of optimum binary threshold values for characters, and may be used effectively as a preparatory process for an optical character recognition device and the like.

An image processing method of the present invention comprises an image quality computation process wherein a characteristic amount is extracted to determine the image quality of image data entered by an image input device, and wherein the characteristic amount is computed as an evaluation value, and the image quality is determined by the evaluation value obtained by the image quality computation process.

Moreover, said computation process may include a first characteristic amount extraction process which has, to begin with, several patterns of pixel characteristics as characteristic points; computes the first characteristic amount, which is the ratio of the frequency of the appearance of said characteristic points in processing lines and the frequency of reversal of black pixels and white pixels; and determines image quality using the first evaluation value which is the first characteristic amount computed above.

Furthermore, said image quality computation process may include a second characteristic amount extraction process which computes the average length of a continuous string of black pixels nearly equivalent to the size of a character; computes the number of continuous strings of black pixels longer than the average continuous string of black pixels nearly equivalent to the size of a character; computes a second characteristic amount which is the ratio of the number of continuous strings of black pixels longer than the average length and one-half of the number of reversals of black pixel and white pixels; and determines image quality using a second evaluation value which is the second characteristic amount computed above.

In addition, said image quality computation process may include the first characteristic amount extraction process and said second characteristic amount extraction process; compute evaluation values based on a first evaluation value obtained by the first characteristic amount extraction process and a second evaluation value obtained by the second characteristic amount extraction process; and the image quality may be determined using an evaluation value based on the first and the second evaluation values.

Moreover, said image quality computation process may include a third characteristic amount extraction process to extract as the third characteristic amount the average length of a continuous string of black pixels nearly equivalent to a character in the processing line and in said first characteristic amount extraction amount; obtain an evaluation value based on a first evaluation value obtained from the first characteristic amount extraction process and a third characteristic amount obtained from the third characteristic amount extraction process; and the image quality may be determined using an evaluation value based on the first evaluation value and the third evaluation value.

Furthermore, said image quality computation process may include the second characteristic amount extraction process and the third characteristic amount extraction process; compute an evaluation value based on a second evaluation value obtained by the second characteristic amount extraction process and a third characteristic amount obtained by the third characteristic amount extraction process; and the image quality may be determined using an evaluation value based on the first and the second evaluation values as well as the third characteristic amount.

In addition, said image quality computation process may include the first characteristic amount extraction process, the second characteristic amount extraction process, and the third characteristic amount extraction process; compute evaluation values based on a first evaluation value obtained by the first characteristic amount extraction process, a second evaluation value obtained by second characteristic amount extraction process, and a third characteristic amount obtained by the third characteristic amount extraction process; and the image quality may be determined using evaluation values based on the first and the second evaluation values as well as the third characteristic amount.

Moreover, the image quality computation process may include a fourth characteristic amount extraction process which performs orthogonal transformation of input image data into frequency regions in order to enable extraction of characteristic amount in the frequency space, computes a fourth characteristic amount by focusing on the high frequency component after orthogonal transformation, and determines the image quality using a fourth evaluation value which is the fourth characteristic amount computed above.

Furthermore, the image quality computation process may include a fifth characteristic amount extraction process which performs orthogonal transformation of input image data into frequency regions in order to enable extraction of characteristic amount in the frequency space, computes a fifth characteristic amount by focusing on the low frequency component after orthogonal transformation, and determines the image quality using a fifth evaluation value which is the fifth characteristic amount computed above.

In addition, if the image quality computation process includes the fourth characteristic amount extraction process and the fifth characteristic amount extraction process, evaluation values may be computed based on a fourth evaluation value obtained by the fourth characteristic amount extraction process and a fifth evaluation value may be obtained by the fifth characteristic amount extraction process, and the image quality may be determined using evaluation values based on the fourth and the fifth evaluation values.

Moreover, the image quality computation process may include the fourth characteristic amount extraction process and the third characteristic amount extraction process, and compute evaluation values based on a fourth evaluation value obtained by the fourth characteristic amount extraction process and a third characteristic amount obtained by the third characteristic amount extraction process, enabling also to determine the image quality using evaluation values based on the fourth evaluation value and the third characteristic amount.

Furthermore, the image quality computation process may include the fifth characteristic amount extraction process and the third characteristic amount extraction process, and compute evaluation values based on a fifth evaluation value obtained by the fifth characteristic amount extraction process and a third characteristic amount obtained by the third characteristic amount extraction process, enabling also to determine the image quality using evaluation values based on the fifth evaluation value and the third characteristic amount.

In addition, the image quality computation process may include the fourth characteristic amount extraction process, the fifth characteristic amount extraction process, and the third characteristic amount extraction process; compute evaluation values based on a fourth evaluation value obtained by the fourth characteristic amount extraction process, a fifth evaluation value obtained by the fifth characteristic amount extraction process, and a third characteristic amount obtained by the third characteristic amount extraction process; and the image quality may be determined using evaluation values based on the fourth and fifth evaluation values as well as the third characteristic amount.

Moreover, the image quality computation process may impose restrictions on the range of extracting said characteristic amount if different regions exist in an original to be processed and compute evaluation values by performing extraction of a characteristic amount for each region.

Furthermore, the image processing method of the present invention may include an image quality computation process to extract a characteristic amount to determine the image quality of image data entered by an image input device and to compute an evaluation value which is the extracted characteristic amount, and an image quality improvement process to determine, from the deterioration characteristic, candidates for the image quality improvement process by extracting sections which have the possibility of deteriorated image quality, and to execute the image quality improvement process on candidates for image quality improvement processing by using evaluation values obtained by the image quality computation process.

The image quality improvement process may include a processing candidate extraction process to extract candidates for image quality improvement processing, and pixel processing to interpolate pixels in executing image quality improvement on processing candidates extracted by the processing candidate extraction process.

The processing candidate extraction process may include a characteristic point extraction process to detect and extract characteristic points generated by deterioration in a section with deteriorated image quality, and a candidate determination process to determine candidates for image quality improvement using the positional relationship of the characteristic points extracted by the characteristic point extraction process.

Moreover, the pixel processing may include a threshold computation process which, using the evaluation value obtained by said image quality computation process, obtains a threshold value from a function with the evaluation value as variable, compares the threshold value with the interval on which interpolation of pixels is performed, and determines whether or not to perform the interpolation process of pixels based on the results of the comparison.

Furthermore, the pixel processing may include a character cutting-out process, also enabling execution of pixel interpolation within the region of characters which are cut out by the character cutting-out process to improve image quality.

In addition, the image processing method of the present invention may include an image quality computation process to extract a characteristic amount to determine the image quality of the image data entered by an image input device and to compute the characteristic amount as an evaluation value, and a binary threshold determination process to determine the binary threshold value for the image to be processed using the evaluation value obtained by the image quality computation process.

The binary threshold value determination process may define a threshold value which determines an evaluation value, based on more than one value among all the evaluation values obtained by said image quality computation process, corresponding to a predetermined value as the target binary threshold value.

Moreover, the image processing method of the present invention may include an image quality computation process to extract a characteristic amount to determine the image quality of the image data entered by an image input device and to compute the characteristic amount as an evaluation value, a binary threshold determination process to determine a binary threshold value for an image to be processed using an evaluation value obtained by the image quality computation process, and an image quality improvement process to determine candidates for the image quality improvement process by extracting sections which have the possibility of image quality deterioration based on the characteristics and to perform the image quality improvement process on candidates for image quality improvement processing using the evaluation value obtained by said image quality computation process.

Furthermore, the image processing device of the present invention may include an image input device to enter images written on originals and the like, and an image quality computation unit to extract and compute a characteristic amount as an evaluation value to determine the image quality of the image data entered by said image input device.

The computation unit may include a first characteristic amount extraction device which has, to begin with, several patterns of pixel characteristics as characteristic points; computes the first characteristic amount, which is the ratio of the frequency of the appearance of said characteristic points in processing lines and the frequency of reversal of black pixels and white pixels; and determines image quality using the first evaluation value which is the first characteristic amount computed above.

Furthermore, the image quality computation unit may include a second characteristic amount extraction device which computes the average length of a continuous string of black pixels nearly equivalent to the size of a character; computes the number of continuous strings of black pixels longer than the average continuous string of black pixels nearly equivalent to the size of a character; computes a second characteristic amount which is the ratio of the number of continuous strings of black pixels longer than the average length and one-half of the number of reversals of black pixel and white pixels; and determines image quality using a second evaluation value which is the second characteristic amount computed above.

In addition, the image quality computation unit may include the first characteristic amount extraction device and the second characteristic amount extraction device; compute evaluation values based on a first evaluation value obtained by the first characteristic amount extraction device and a second evaluation value obtained by the second characteristic amount extraction device; and determine the image quality using an evaluation value based on the first and the second evaluation values.

Moreover, the image quality computation unit may include a third characteristic amount extraction device to extract as the third characteristic amount the average length of a continuous string of black pixels nearly equivalent to a character in the processing line and in the first characteristic amount extraction amount; obtain an evaluation value based on a first evaluation value obtained from the first characteristic amount extraction device and a third characteristic amount obtained from the third characteristic amount extraction device; and the image quality may be determined using an evaluation value based on the first evaluation value and the third evaluation value.

Furthermore, the image quality computation unit may include the second characteristic amount extraction device and the third characteristic amount extraction device; compute an evaluation value based on a second evaluation value obtained by the second characteristic amount extraction device and a third characteristic amount obtained by the third characteristic amount extraction device; and the image quality may be determined using an evaluation value based on the first and the second evaluation values as well as the third characteristic amount.

In addition, the image quality computation unit may include the first characteristic amount extraction device, the second characteristic amount extraction device, and the third characteristic amount extraction device; compute evaluation values based on a first evaluation value obtained by the first characteristic amount extraction device, a second evaluation value obtained by second characteristic amount extraction device, and a third characteristic amount obtained by the third characteristic amount extraction device; and the image quality may be determined using evaluation values based on the first and the second evaluation values as well as the third characteristic amount.

Moreover, said image quality computation unit may include a fourth characteristic amount extraction device which performs orthogonal transformation of input image data into frequency regions in order to enable extraction of characteristic amount in the frequency space, computes a fourth characteristic amount by focusing on the high frequency component after orthogonal transformation, and determines the image quality using a fourth evaluation value which is the fourth characteristic amount computed above.

Furthermore, the image quality computation unit may include a fifth characteristic amount extraction device which performs orthogonal transformation of input image data into frequency regions in order to enable extraction of characteristic amount in the frequency space, computes a fifth characteristic amount by focusing on the low frequency component after orthogonal transformation, and determines the image quality using a fifth evaluation value which is the fifth characteristic amount computed above.

In addition, the image quality computation unit may include the fourth characteristic amount extraction device and said fifth characteristic amount extraction device and evaluation values may be computed based on a fourth evaluation value obtained by the fourth characteristic amount extraction device and a fifth evaluation value may be obtained by the fifth characteristic amount extraction device, and the image quality may be determined using evaluation values based on the fourth and the fifth evaluation values.

Moreover, the image quality computation unit may include the fourth characteristic amount extraction device and the third characteristic amount extraction device, compute evaluation values based on a fourth evaluation value obtained by the fourth characteristic amount extraction device and a third characteristic amount obtained by the third characteristic amount extraction device, enabling also to determine the image quality using evaluation values based on the fourth evaluation value and the third characteristic amount.

Furthermore, the image quality computation unit may include the fifth characteristic amount extraction device and the third characteristic amount extraction device, and compute evaluation values based on a fifth evaluation value obtained by the fifth characteristic amount extraction device and a third characteristic amount obtained by the third characteristic amount extraction device, enabling also to determine the image quality using evaluation values based on the fifth evaluation value and the third characteristic amount.

In addition, the image quality computation unit may include the fourth characteristic amount extraction device, the fifth characteristic amount extraction device, and the third characteristic amount extraction device; compute evaluation values based on a fourth evaluation value obtained by the fourth characteristic amount extraction device, a fifth evaluation value obtained by the fifth characteristic amount extraction device, and a third characteristic amount obtained by the third characteristic amount extraction device; and the image quality may be determined using evaluation values based on the fourth and fifth evaluation values as well as the third characteristic amount.

Moreover, the image quality computation unit may impose restrictions on the range of extracting said characteristic amount if different regions exist in an original to be processed and compute evaluation values by performing extraction of a characteristic amount for each range.

Furthermore, the image processing method of the present invention may include an image input device to enter image written on originals and the like and an image quality computation unit to extract a characteristic amount to determine the image quality of image data entered by an image input device and to compute an evaluation value which is the extracted characteristic amount, and an image quality improvement unit to determine, from the deterioration characteristic, candidates for the image quality improvement processing by extracting sections which have the possibility of deteriorated image quality, and to execute the image quality improvement processing on candidates for image quality improvement processing by using evaluation values obtained by said image quality computation unit.

The image quality improvement unit may include a processing candidate extraction device to extract candidates for image quality improvement processing, and pixel processing means to interpolate pixels in executing image quality improvement on processing candidates extracted by the processing candidate extraction device.

The processing candidate extraction device may include a characteristic point extraction device to detect and extract characteristic points generated by deterioration in a section with deteriorated image quality, and a candidate determination device to determine candidates for image quality improvement using the positional relationship of the characteristic points extracted by the characteristic point extraction device.

Moreover, the pixel processing may include a threshold computation means which, using the evaluation value obtained by said image quality computation unit, obtains a threshold value from a function with the evaluation value as variable, compares said threshold value with the interval on which interpolation of pixels is performed, and determines whether or not to perform the interpolation process of pixels based on the results of the comparison.

Furthermore, pixel processing means may include a character cut-out device, also enabling execution of pixel interpolation within the region of characters which are cut out by the character cut-out device to improve image quality.

In addition, the image processing device of the present invention may include an image quality computation unit to extract a characteristic amount to determine the image quality of the image data entered by an image input device and to compute the characteristic amount as an evaluation value, and a binary threshold determination means to determine the binary threshold value for the image to be processed using the evaluation value obtained by the image quality computation unit.

The binary threshold value determination unit may define a threshold value which makes the evaluation value, based on more than one value among all the evaluation values obtained by said image quality computation unit, correspond to the predetermined value as the target binary threshold value.

Moreover, the image processing device of the present invention may include an image input device to enter images written on originals and the like, an image quality computation unit to extract a characteristic amount to determine the image quality of the image data entered by the image input device and to compute the characteristic amount as the evaluation value, an image quality improvement unit to determine candidates for image quality improvement unit by extracting sections which have the possibility of image quality deterioration based on the characteristics and to perform image quality improvement on candidates for image quality improvement processing using the evaluation value obtained by said image quality computation unit, and a binary threshold value determination unit to determine a binary threshold value for the image to be processed using an evaluation value obtained by the image quality computation unit.

The present invention includes an image quality computation unit to determine the image quality of image data entered by an image input device and to compute the result of the determination as an evaluation value corresponding to the image quality. The image quality computation unit may include a first characteristic amount extraction device which has, to begin with, several patterns of pixel characteristics as characteristic points; computes a first characteristic amount which is the ratio of the frequency of the appearance of said characteristic points in the processing lines and the frequency of the reversal of black pixels and white pixels; and determines the image quality using a first evaluation value which is the first characteristic amount computed above. Moreover, the image quality computation unit may include a second characteristic amount extraction device which computes the average length of a continuous string of black pixels nearly equivalent to the size of a character, computes the number of continuous strings of black pixels longer than the average continuous string of black pixels nearly equivalent to the size of a character, computes a second characteristic amount which is the ratio of the number of continuous strings of black pixels longer than the average length and one-half of the number of reversals of black pixels and white pixels, and determines the image quality using a second evaluation value which is the second characteristic amount computed above.

The image quality computation unit may compute as the first evaluation value said first characteristic amount obtained by the first characteristic amount extraction device, and as the second evaluation value said second characteristic amount obtained by the second characteristic amount extraction device; and obtain an evaluation value, based on the first and the second evaluation values, which may be used for determination of the image quality. Moreover, said image quality computation unit may include a first characteristic amount extraction device and a third characteristic amount extraction device. The third characteristic amount extraction device may obtain as the third characteristic amount the average length of a continuous string of black pixels nearly equivalent to a character in the process line, and obtain an evaluation value, based on the first evaluation value and the third characteristic amount, which may be used to determine the image quality.

Moreover, the image quality computation unit may use the second characteristic amount extraction device and a third characteristic amount extraction device, and compute an evaluation value, based on the second evaluation value and the third characteristic amount, which is used to determine the image quality.

Furthermore, the image quality computation unit may use the first characteristic amount extraction device, the second characteristic amount extraction device, and the third characteristic amount extraction device; and compute an evaluation value, based on the first evaluation value, the second evaluation value, and a third characteristic amount obtained by said third characteristic amount extraction device, which is used to determine the image quality.

Moreover, the image quality computation unit may include a fourth characteristic amount extraction device; perform orthogonal transformation of the input image data into frequency regions in order to enable extraction of characteristic amounts in frequency space; compute a fourth characteristic amount by focusing on the high frequency component after the orthogonal transformation to determine the image quality using a fourth evaluation value, which is the fourth characteristic amount, and a fifth characteristic amount extraction device which performs orthogonal transformation of the input image data into frequency regions; computes a fifth characteristic amount by focusing on the low frequency component after the orthogonal transformation; determine the image quality using a fifth evaluation value which is the fifth characteristic amount computed above; and further make it possible to obtain an evaluation value based on the fourth evaluation value obtained by the fourth characteristic amount extraction device and the fifth evaluation value obtained by the fifth characteristic amount extraction device, and to determine the image quality using the evaluation value based on the fourth and the fifth evaluation values.

More specifically, the first characteristic amount and the fourth characteristic amount indicate the faintness of the characters, while the second characteristic amount and the fifth characteristic amount indicate smudging of the characters. From each of the characteristic amounts representing faintness and smudging, evaluation values associated with faintness and smudging are obtained and the image quality is determined objectively and accurately using these evaluation values individually or jointly.

Moreover, the image quality improvement unit may detect and extract, by the processing candidate extraction device, characteristic points in the image deteriorated sections produced by deterioration, and determines candidates for the image quality improvement process using a positional relationship among the characteristic points extracted by the characteristic point extraction device. Then, by said pixel processing work means, threshold values are obtained using the evaluation values obtained by said image quality computation unit and functions with these evaluation values as variables. Next, the threshold values are compared with intervals on which interpolation of pixels is to be performed and determination is made from the comparison results as to whether or not interpolation of pixels is to be conducted.

By these means, deteriorated sections such as faintness and smudging of characters may be determined accurately. For a section with missing pixels thus determined as a deteriorated section, the interval in which pixels are missing is compared with a predetermined threshold value and interpolation is performed after determining if such an interpolation of pixels is necessary. Thus, a restoration process matching the image quality is realized.

Moreover, a characteristic amount may be extracted and computed as an evaluation value after determining the image quality of the image data read in by an image input device and the threshold value, corresponding to a section in which an evaluation value, based on the two evaluation values associated with said faintness and smudging obtained above and matching a certain predetermined value, may be specified as the binary threshold value to be obtained. Thus, the binary threshold value enabling the best image quality may be determined as the binary threshold value to be obtained, and the binary change best suited for the character may be realized.

Furthermore, by combining the image quality computation process, which extracts a characteristic amount by determining the image quality of the image data read in by said image input device and computes the characteristic amount as the evaluation value; the binary threshold value determination process, which determines the binary threshold value for the image to be processed using the evaluation value obtained by the image quality computation process; and the image improvement process, which determines candidates for the image quality improvement process by extracting a section with possible deterioration of image quality based on its characteristics and performs the image quality improvement process on the candidates for image quality improvement process using the evaluation value obtained by said image quality computation process; objective and accurate determination of the image quality as a result of faintness and smudging may be realized. Moreover, the binary threshold value to be obtained may be determined by an evaluation value based on two evaluation values representing the faintness and the smudging, which enables optimum binary processing. In addition, the interpolation process can be performed if interpolation of pixels is found necessary when images after binary processing produce sections with missing pixels due to faintness.

BRIEF DESCRIPTION OF THE DRAWINGS

The invention will be described in detail with regard to the following drawings in which like reference numerals designate like elements and wherein:

FIG. 3(a)–3(f) are drawings showing characteristic points of faintness related to black and white pixels.

FIG. 5 is a drawing showing binary threshold values of faintness or smudging from 5 to 12 for the chinese character "kura".

FIG. 23(a)(1)–FIG. 23(a)(3) and FIG. 23(b)(1)–FIG. 23(b)(3) are graphs related to the determination of an evaluation value and a corrected evaluation value respectively.

FIGS. 28(a)–28(c) are a drawing showing conditions for interpolation candidates in an example where characteristic points are facing each other.

FIG. 34(a)(I)–FIG. 34(a)(III) and FIG. 34(b)(I)–FIG. 34(b)(III) are drawings showing examples of improved image quality according to the second aspect of present invention.

DETAILED DESCRIPTION OF PREFERRED EMBODIMENTS

Hereinafter, embodiments of the present invention will be described. In these embodiments, the resolution of the image is 300 dots per inch (DPI) and characters written in black against a white background (white manuscript paper) are used as the images to be processed.

As a first aspect of the present invention, a character image quality computation unit to compute the degree of deterioration of image quality of a character copied by a copy machine or a character read by a scanner prior to character recognition, for example, is described.

Figure 1:
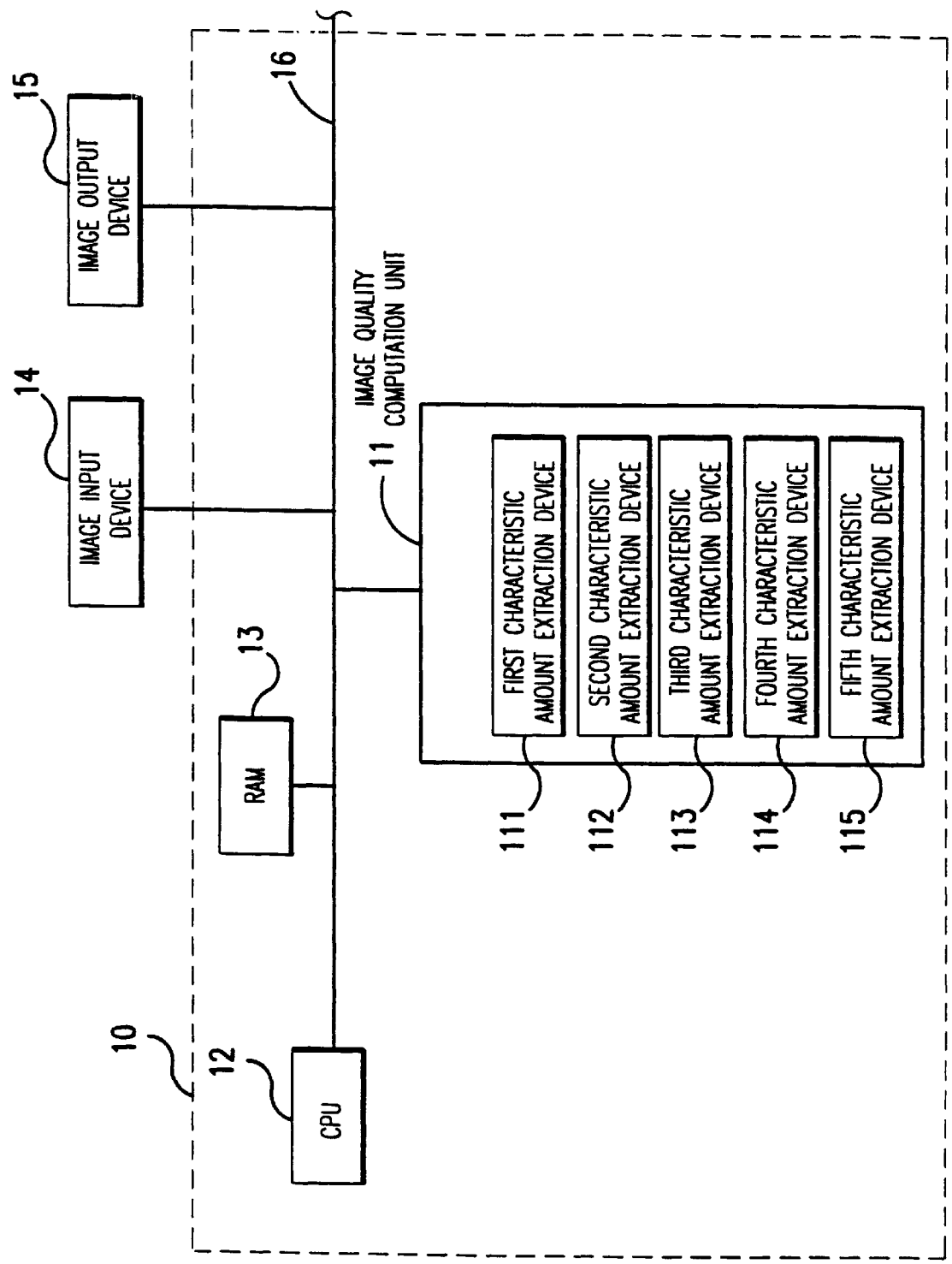
FIG. 1 is a block diagram of a first aspect of the present invention.

In FIG. 1, the image processing device 10 in the first aspect mainly comprises an image quality computation unit 11 (to be explained in detail later), a CPU 12 which controls the entire process, and the RAM 13. Moreover, an image input device 14 and an image output device 15 are connected to the image processing device 10 and the image quality computation unit 11, the RAM 13, the image input device 14, and the image output device 15 are connected to the CPU 12 through the bus 16.

Said image input device 14 can be an optical image input device (a scanner, for example) if optical image input is to be performed, or a communication input device or a memory device to store image data. Moreover the image output device 15 outputs (display, hard copy, or communication outputs) the image data entered after specified processing.

Moreover, the RAM 13 comprises a buffer for line data to store the image (character) data to be processed in the first aspect and the work area needed to perform various processes.

A first characteristic amount extraction device 111, a second characteristic amount extraction device 112, a third characteristic amount extraction device 113, and a fourth characteristic amount extraction device 114, and a fifth characteristic amount extraction means 115 constitute the main components of said image quality computation unit 11.

The image quality computation unit 11, as described before, computes the quality of the characters. Characteristic amounts such as faintness, smudging, and character size are the major criteria for determining the quality of the characters.

Said first characteristic amount extraction device 111 and a fourth characteristic amount extraction device 114 determine the image quality by extracting the characteristic amount of faintness. Moreover, said second characteristic amount extraction device 112 and a fifth characteristic amount extraction device 115 determine the image quality by extracting the characteristic amount of smudging. Furthermore, said third characteristic amount extraction device 113 extracts the characteristic amount of length in the horizontal direction which is equivalent to character size and, by adding this characteristic amount to the two characteristic amounts of said faintness and smudging, it performs more effectively the image quality improvement process in the image quality improvement unit, which will be explained later.

Hereinafter, the characteristic amount extraction processes of the first–fifth amount extraction devices 111–115 will be described individually, but each of the first, second, and third characteristic amount extraction devices 111, 112, and 113 will be described immediately below, while the fourth and the fifth characteristic amount extraction device 114 and 115 will be explained later.

To begin with, the first characteristic amount extraction device 111 will be explained.

As mentioned before, the first characteristic amount extraction device 111 extracts the characteristic amount of faintness. Here, explanation is given with reference to FIG. 2 and FIG. 3.

Figures 2A, 2B:
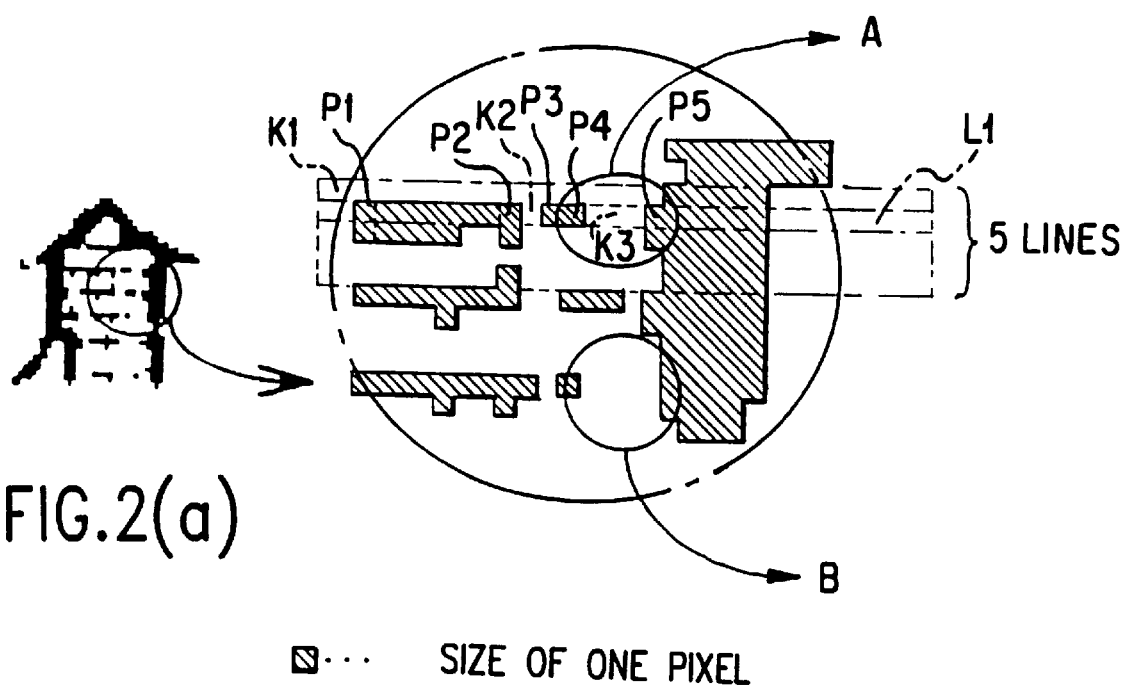
FIG. 2(a) and FIG. 2(b) are an image and an enlarged view of a portion of an image, respectively, of the Chinese character "kura" showing "faintness."
Figure 41A:
FIG. 41(a)–FIG. 41(c) are drawings showing an example of an image of the Chinese character "kura" as read by a scanner.
Figure 41B:
Figure 41C:
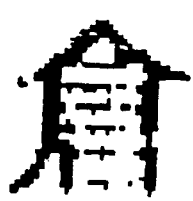

FIG. 2(a) is an image of the Chinese character kura and has faintness about the level of the image shown in FIG. 41(c). FIG. 2(b) is a magnification of a certain section (circled area) where faintness is produced in FIG. 2(a). FIG. 2(b) indicates that several pixels (1, 2, or 3 pixels) in the vertical direction are in a horizontally convex shape. A horizontally convex shape refers to a horizontal protrusion of 1, 2, or 3 vertically contiguous pixels, with no additional pixels immediately above or below them.

For example, consider the region enclosed by the broken line in FIG. 2(b). Let L1 in the region be a focus line. In the focus line L1, sections K1, K2, and K3 present faintness. Here, K2 shows the condition in which an empty space equivalent to 1 pixel is produced due to the faintness of 1 pixel, while K3 shows an empty space equivalent to 2 pixels due to the faintness of 2 pixels. Moreover, the convex part P1 equivalent to 2 vertical pixels exists in the section showing faintness K1, while the convex part P2 equivalent to 2 pixels and the convex part P3 equivalent to 1 pixel are facing each other in the section showing faintness K2. Furthermore, the convex part P4 equivalent to 1 pixel and the convex part P5 equivalent to 2 pixels are facing each other in the section showing faintness K3.

Now the first characteristic amount is computed using these convex parts. The formula for computing the amount is as follows.

First characteristic amount=Frequency of characteristic point appearance/Frequency of black and white reversal of pixels (1)

The first characteristic amount computed by formula (1) becomes one of the evaluation values by which excellence or poorness of quality is determined (hereafter referred to as the first evaluation value).

The characteristic points in said formula (1) represent the characteristics of said convex parts and are defined here as described in FIG. 3(a)–3(f). FIG. 3(a) and FIG. 3(b) describe 1 pixel characteristic points (corresponding to the convex part of 1 pixel) with FIG. 3(a) containing a section in which pixels do not exist in the vertical direction and to the right in the diagram (hereafter referred to as an empty section), and FIG. 3(b) containing an empty section in the vertical direction and to the left in the diagram. Moreover, FIG. 3(c) and FIG. 3(d) describe 2 pixel characteristic points (corresponding to the convex part of 2 pixels in the vertical direction) with FIG. 3(c) containing an empty section in the vertical direction and to the right in the diagram, and FIG. 3(d) containing an empty section in the vertical direction and to the left in the diagram. Furthermore, FIG. 3(e) and FIG. 3(f) describe 3 pixel characteristic points (corresponding to the convex part of 3 pixels in the vertical direction) with FIG. 3(e) containing an empty section in the vertical direction and to the right in the diagram, and FIG. 3(f) containing an empty section in the vertical direction and to the left in the diagram. Therefore, in order to examine up through 3 pixel characteristic points, it becomes necessary to provide pixel data equivalent to 5 lines (the region enclosed by the broken line in FIG. 2(b), for example). In this case, the second line from the top of 5 lines is designated as the focus line L1.

The frequency of appearance of pixel characteristic points on the focus line L1 in FIG. 2(b) is counted as follows: once for the convex part P1 (equivalent to FIG. 3(d)), once for the convex part P2 (equivalent to FIG. 3(c)), once for the convex part P3 (equivalent to FIG. 3(b)), once for the convex part P4 (equivalent to FIG. 3(a)), and once for the convex part P5 (equivalent to FIG. 3(d)), for a total of five appearances. Moreover, the frequency of black and white reversal of pixels to be used in formula (1) is counted as follows: once for the convex part P1 in the faintness section K1, once for the convex part P2 in the faintness section K2, once for the convex part P3 in the faintness section K2, once for the convex part P4 in the faintness section K3, once for the convex part P5 in the faintness section K3, and finally, once in the last section of the character on the line for a total of six reversals. Thus, the first characteristic amount is expressed as first characteristic amount=5/6. However, this figure is obtained within the range described in FIG. 2(b) and, in reality, the focus line L1 scans horizontally each line of the original to be processed, and the frequency is counted for the entire character on each line. Thus, the first characteristic amount computed may naturally be different from the value above.

Figure 4:
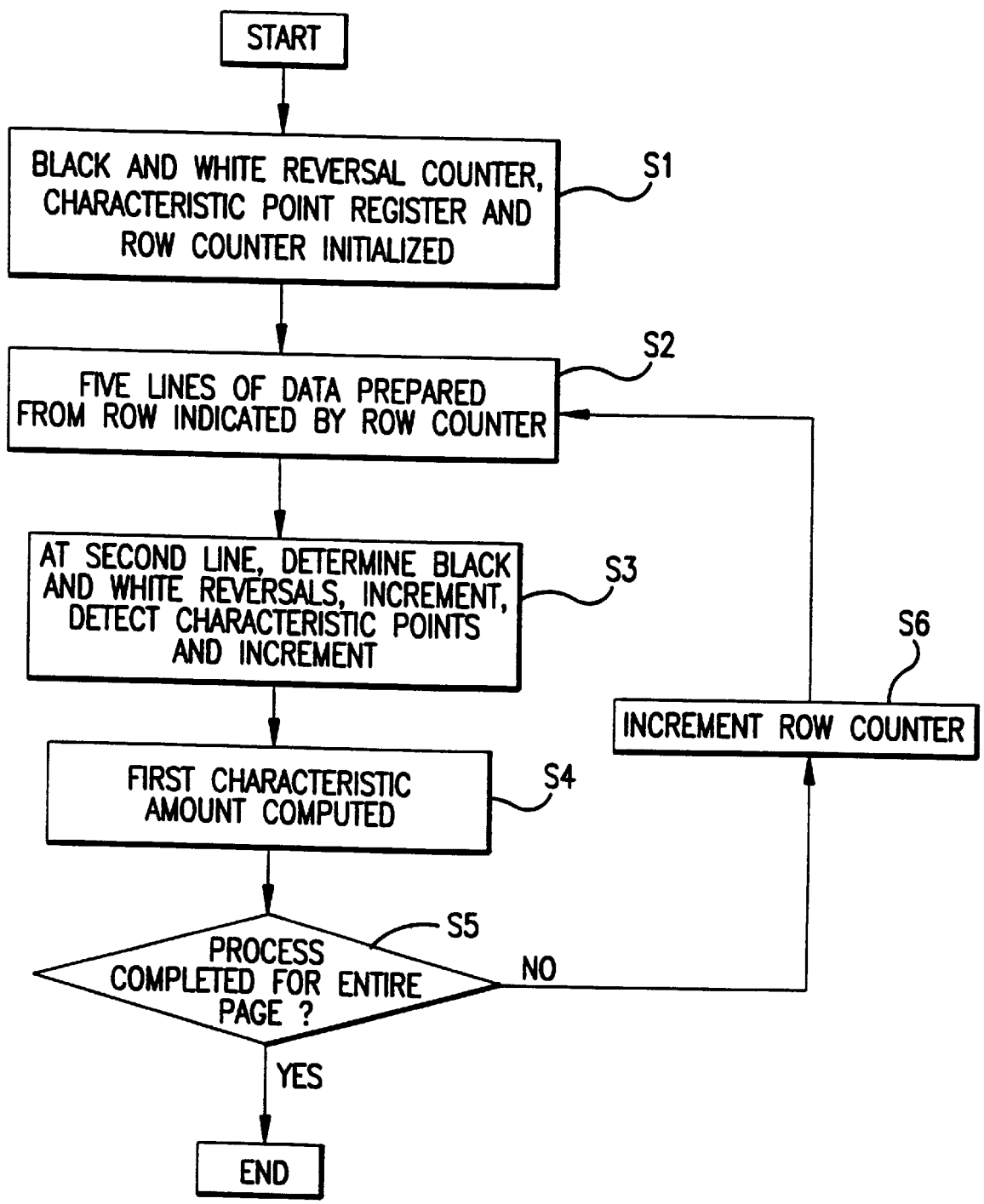
FIG. 4 is a flow chart of a first characteristic amount extraction process for use in the first aspect of the present invention.

FIG. 4 is a flow chart describing the process of computing the first characteristic amount mentioned above. Here, the first characteristic amount computation process is performed with a scanner which scans and reads each line of the original text according to instructions by the line counter. To begin with, in FIG. 4 a black and white reversal counter to count the frequency of black and white reversals of pixels and a characteristic point counter to count the frequency of appearance of characteristic points are initialized (step S1). Next, line data from the line specified by the line counter as line 5 are prepared (step S2), the second line is designated as the focus line to be scanned, and the frequency of black and white reversals as well as the frequency of the appearance of characteristic points are counted on the line (step S3). In order to avoid duplicated counting in this case, counting is done only when the second line from the top in FIG. 3 matches the focus line.

As counting of the frequency of black and white reversals and the frequency of the appearance of characteristic points are completed for the focus line, the first characteristic amount is computed using formula (1) (step S4). Then, determination is made on whether or not the first characteristic amount computation process is completed for the entire page of the original to be processed (step S5). If the process is not completed, the line counter is incremented (step 6) and the process from step S2 through step S5 will be executed.

In other words, the line data from the line specified by the line counter next to line 5 are prepared (step S2), and the second line is designated as the focus line to be scanned. After executing processes similar to the above, the frequency of black and white reversals counted this time is added to the frequency of black and white reversals of the previous scanning, and a characteristic amount is computed using formula (1). In this manner, the first characteristic amount is computed for the entire page of the original to be processed. The reason for adding the new frequency to the previous frequency is to improve the reliability of the evaluation value by increasing the amount of data. The same can be said for computation of each evaluation value below.

In the process described above, the first characteristic amount is computed each time the black and white reversal frequency counting process and characteristic point appearance frequency counting are completed for a certain focus line. This is done to execute concurrently the image quality determination process in the image quality computation unit 11 and the image quality improvement process in the image quality improvement unit, to be explained later, or the binary threshold value determination process in the binary threshold value determination unit. However, if the above image quality computation process is performed for the entire image to be processed first, and then the improvement process or the binary threshold value determination process is performed later, the first characteristic amount may be computed after completion of black and white reversal frequency counting and characteristic point appearance frequency counting for the entire page of the original to be processed in the process flow chart of FIG. 4.

Next, justification of said first characteristic amount in certain character image samples (a character image sample containing the Chinese character "kura" here) will be explained.

In FIG. 5, the character "kura" out of character image samples is scanned and input with 16 gradations (gray scale), and the character image is displayed wherein certain gradations (5–12 here) are changed to binary values as the binary threshold value. In order to distinguish this threshold value from several other threshold values to be mentioned in a later explanation, hereinafter the binary threshold value will be denoted by TH1. Evaluation of said first characteristic amount is done using the character image whose image quality is changed with the above method. Also, the character recognition rate is used as an evaluation method here. Incidently, in the evaluation using the character recognition rate, the rate may change even for the same image, according to the character recognition method used, but tendencies remain the same.

Figure 6A:
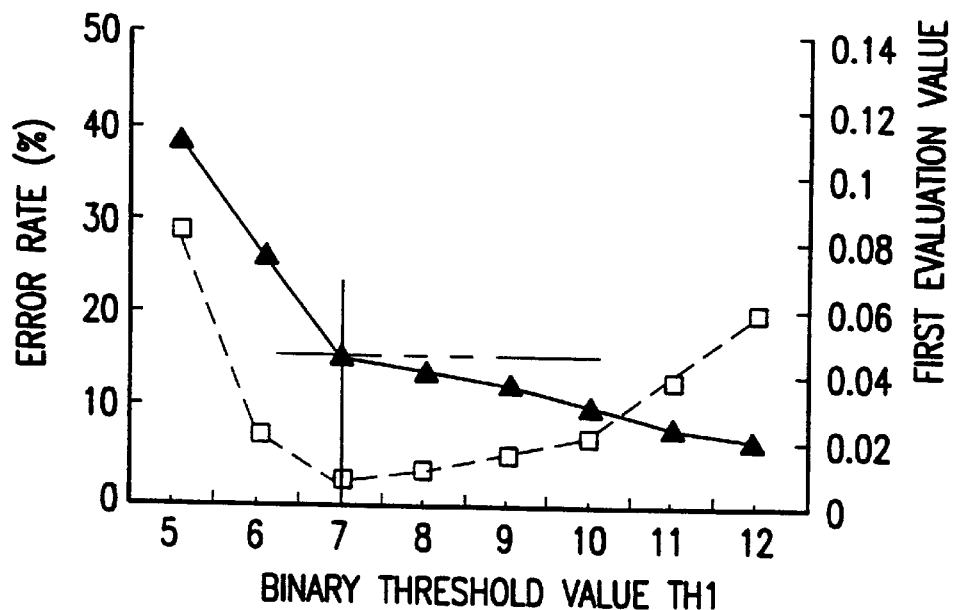
FIG. 6(a) and FIG. 6(b) are graphs showing the relationship between the binary threshold value, the character recognition error rate, and the first evaluation value based on faintness.

FIG. 6 displays a graph (dotted line) of the error rate (non-recognition rate) for each pixel with a binary threshold value TH1 from 5 through 12 described in FIG. 5, and a graph (solid line) of the first evaluation value (this evaluation value is exactly the first characteristic amount) for each pixel with a binary threshold value TH1 from 5 through 12. As described in FIG. 6(a) an image with a binary threshold value of 7 presents the lowest error rate. Moreover, the larger the value of the first evaluation value, the greater the level of faintness. Therefore, binary threshold values of 5 and 6 show a higher error rate due to deterioration of the image quality caused by faintness. Moreover, the reason for a large error rate for binary threshold values TH1 greater than or equal to 7 appears to be deterioration of the image quality due to smudging.

Figure 6B:
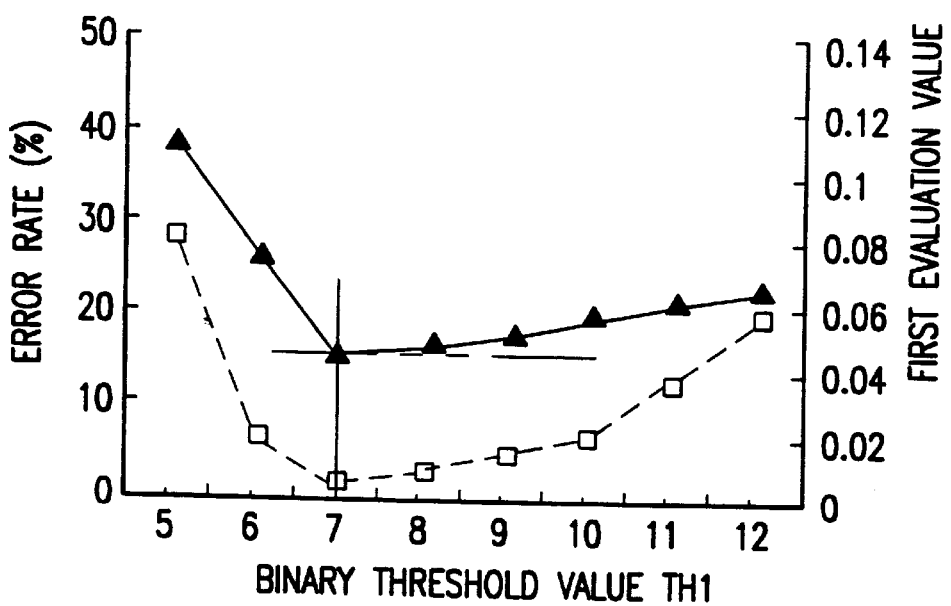

The evaluation here is an evaluation based on faintness. In other words, the desired conclusion is that the greater the level of faintness, the larger the value of the first evaluation value becomes, and with this the error rate also becomes larger. As described in FIG. 6(a), this relationship is established when the binary threshold value TH1 is less than 7. However, once the binary threshold value TH1 becomes 7 or greater, the error rate becomes larger as the first evaluation value becomes smaller. The relationship between the first evaluation value and the error rate reverses at either side of the binary threshold value TH1 of 7. This is because the error rate caused by smudging increases when the binary threshold value TH1 becomes 7 or greater, as explained before. In this manner, when the binary threshold value TH1 is 7 or greater, deterioration of the image quality due to smudging occurs and, as described before, the relationship between the first evaluation value and the error rate reverses at either side of the binary threshold value TH1 of 7. In other words, faintness and smudging are in an opposing relationship with the image quality, due to smudging becoming larger with decreases in the first evaluation value. Since the evaluation in question here is based on faintness, first evaluation values for binary threshold values TH1 7 or greater are folded back with respect to the broken line in FIG. 6(a) and FIG. 6(b) is obtained. When a correlation is run for the error rate (dotted line) and the first evaluation value (solid line) in FIG. 6(b), the correlation coefficient is found to be 0.86. The correlation coefficient assumes values less than or equal to 1 and greater than or equal to −1 with the coefficient 1 indicating the highest positive correlation. A coefficient of 1 shows that the two variables are identical. Therefore, the correlation coefficient of 0.86 shows that the first evaluation value and the error rate obtained here have a similar relationship and that the first evaluation value is a valid index for determining the image quality.

Evaluating the first characteristic amount from the human eye sensitivity point of view, the severer the faintness in FIG. 5, the larger the first evaluation value in FIG. 6(a), which is consistent with human eye sensitivity and establishes the first evaluation value as a valid index for determining image quality.

Thus, the level of faintness of characters is determined by the first evaluation value.

Next, the second characteristic amount extraction device will be described. The second characteristic amount is smudging. Here, image quality will be determined by extracting the characteristic amount of smudging. A detailed explanation follows.

In FIG. 5 described above, as the binary threshold value TH1 becomes larger, the number of horizontal black runs (refers to a continuous string of black pixels) increases, which indicates that deterioration of the image quality due to smudging occurs. Thus, the image quality is computed using the number of horizontal black runs nearly equalling the size of a character. The desired second characteristic amount is computed by the following formula.

$$\text{Second characteristic amount} = \text{Number of black runs longer than the specified length} / \text{Total number of black runs} \qquad (2)$$

The value obtained from formula (2) becomes an evaluation value to determine the excellence or poorness of the image quality. The "Number of black runs longer than the specified length" here refers to the number of horizontal black runs nearly equal to the size of a character, and the number of black runs equal to or longer than a threshold value TH2, to be described below, is counted. Here, a black run refers to a continuous string of black pixels, as mentioned before.

To begin with, an initial value is established for the threshold value TH2. The threshold value TH2 is established every time the processing line of the original to be processed is scanned, and the initial value of TH2, TH0, is set as TH0=24 pixels. The 24 pixels here are equivalent to about 70% of the size of an 8 point character (3 mm square) if the resolution is 300 DPI. The reason for setting the initial value TH0 to be 24 pixels is that characters smaller than that are not usually used. As mentioned above, the threshold value TH2 is reset each time the processing line of the original to be processed is scanned. In other words, the value is set to correspond to the characters actually being used. For example, when each line of an original with much text is scanned, the initial value TH0 to scan the first line is 24 and the average length of black runs longer than or equal to 24 pixels is computed for each character on the line and the average value thus obtained is multiplied by a certain value a (0.6–1.0). Then a new threshold value (threshold value TH2) is obtained using the threshold value previously obtained as the initial value. Thus, the threshold value TH2 represents the length of black runs nearly equivalent to the horizontal length of an average character of each character up to that point in a certain line.

Here, the threshold value TH2 is expressed as: TH2= average length of black runs, up to that point in a certain line, longer than or equal to the second threshold value:

$$TH2 \times \alpha \qquad (3)$$

In the formula (3), a is set at 0.6–1.0, but 0.85 was found to be most appropriate in the experiments. By changing the threshold value TH2 with the scanning of each line in this manner, it is possible to successfully cope with changes in the size of the characters.

In addition, the "total number of black runs" in formula (2) is the total number of black runs when the image is scanned in a sideways direction, and because this numerical value is one-half the "frequency of black and white reversals of pixels" in formula (1), this value may also be found using the "frequency of black and white reversals of pixels" found in step S3 of the process flow in FIG. 4 by taking one half of this number.

Figure 7:
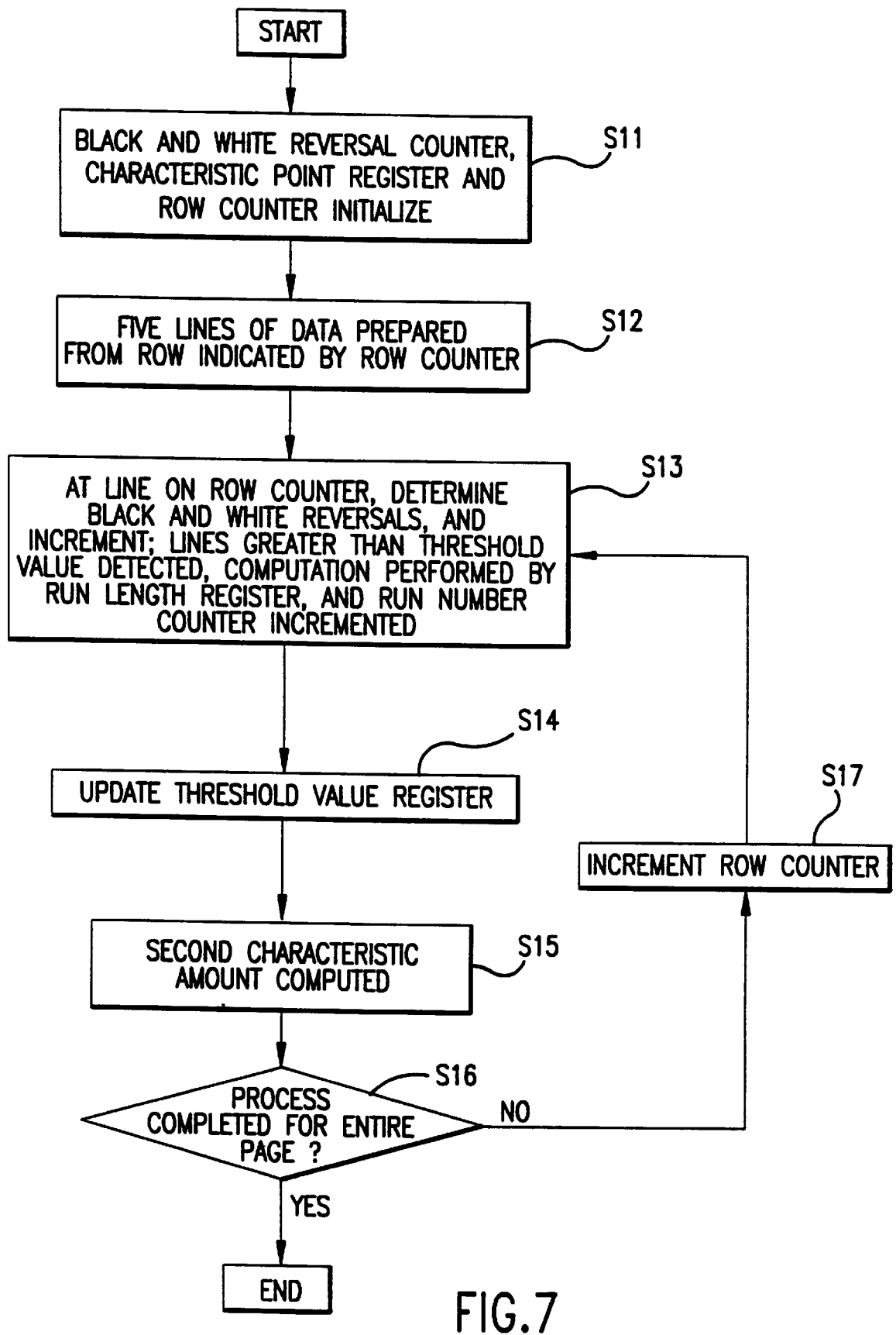
FIG. 7 is a flow chart showing a second characteristic extraction process for use in the present invention.

FIG. 7 shows a flow chart of the processes of the second characteristic amount computation as described above. In FIG. 7, first the black and white reversal counter which counts the frequency of black and white reversals; the run length register which stores the sum of black run lengths at least as long as threshold value TH2 in a line in order to find the average length of black runs at least as long as threshold value TH2 for each line; the run number counter which counts how many black runs at least as long as threshold value TH2 have occurred in each line; a threshold value register in which is stored a threshold value (initially 24 pixels as the initial value TH0) which is the base used to find threshold value TH2 for each line; and a row counter which indicates the row that is the target of processing are all initialized (step S11).

Next, line data from the row indicated by the row counter through line 5 is prepared (step S12), scanning of the lines is conducted with the target line being the second of these lines, and the frequency of black and white reversals is counted in addition to the number of black runs at least as long as threshold value TH2 being detected (step S13). In other words, in this step S13, in addition to the counting of the frequency of black and white reversals, the threshold value TH2 is found from formula (3) above with the value (initially 24) stored in the threshold value register as the base in order to detect the number of black runs at least as long as threshold value TH2. The number of black runs at least as long as this threshold value TH2 is detected, and the number of these black runs is counted by the run number counter. Furthermore, the contents of the threshold value register are updated in order to make the threshold value found through this the base value (step S14).

Next, the second characteristic amount is detected using formula 2 above (step S15) on the basis of the value detected in step S13. Then, the determination is made (step S16) as to whether or not the process of computing the second characteristic amount has been completed for the entire page of the document that is the object of processing, and if the process has not been completed, the row counter is incremented (step S17), and the processes from step S12 through step S16 are conducted again.

That is, line data from the row indicated by the row counter through line 5 is prepared (step S12), scanning of the lines is conducted with the target line being the second of these lines, processes similar to those described above are conducted, and the number of black runs at least as long as a preset length found this time is added to the number of black runs at least as long as the preset length found the previous time. Additionally, the total number of black runs counted this time is added to the total number of black runs found the previous time, and the second characteristic amount is computed using formula (2). In this way, the process of computing the second characteristic value is conducted for the entire page of the document that is the object of processing.

In addition, in the process which extracts this second characteristic amount, five lines need not be prepared for the line buffer number, for one line is sufficient, and in this case, the target line matches the line indicated by the row counter.

In the above processes, each time the processes in step S13 are completed, computation of the second threshold value is performed in order to conduct the image quality determination process in the image quality computation unit 11 in parallel with the image quality improvement process in the below-described image quality improvement unit or the binary threshold value determination process in the binary threshold value determination unit. However, when the above-described image quality computation process is first conducted on the entire image that is the object of processing, and following this the image quality improvement process or the binary threshold value determination process is conducted, the processes in steps S13 and S14 are first conducted over the entire image being processed in the flow of processes in FIG. 7, and after these processes have been entirely completed, computation of the second characteristic values may also be conducted all at once.

Next, the justification of this second characteristic amount (s) in a particular sample character image (herein, a sample character image containing the Chinese character "kura") will be described.

In this case also, the evaluation of this second characteristic amount(s) will be conducted with reference to FIG. 5 which was used in the description of the justification of the above-described first characteristic amount. As this method of evaluation, here also evaluation will be conducted using the character recognition rate. Even in evaluations using the character recognition rate, the recognition rate will change even with the same image depending on the character recognition method, but the tendency will be the same in both.

Figure 8A:
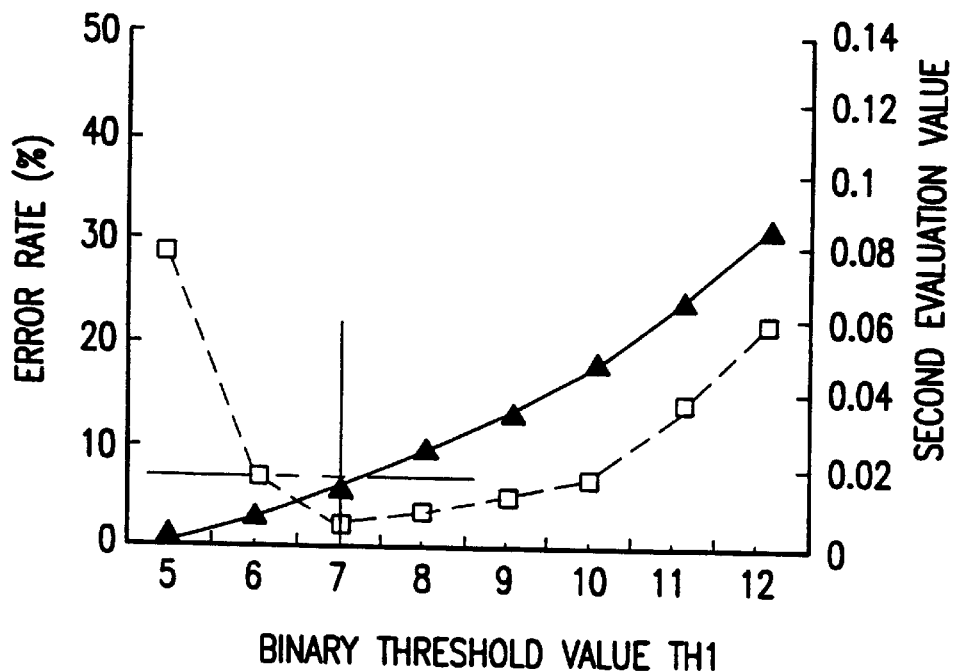
FIG. 8(a) and FIG. 8(b) are graphs showing the relationship between the binary threshold value, the character recognition error rate, and the second evaluation value based on "smudging."

FIG. 8(a) shows the relationship (indicated by the dotted line) of the error rate (the rate of inability to recognize) with respect to each image with a binary threshold value TH1 of 5 to 12, as shown in FIG. 5, and the relationship (indicated by the solid line) of the evaluation value (here, evaluation value is the value of the second characteristic amount, and will hereinafter be called the second evaluation value) with respect to each image with a binary threshold value TH1 of 5 to 12. As can be seen from this drawing, the error rate is lowest when the image has a binary threshold value TH1 of 7. In addition, the drawing indicates that smudging and faintness are larger the higher the numerical value of the second evaluation value. Accordingly, in the case shown in FIG. 8(a), the error rate is high due to deterioration of image quality caused by faintness when the binary threshold value TH1 is 5 and 6, and in addition, the error rate is high due to deterioration of image quality caused by smudging when the binary threshold value TH1 is 7 or higher.

Here, the evaluation is an evaluation which has "smudging" as the basis. That is to say, this is an evaluation wherein the desired evaluation value is one wherein the numerical value of the second evaluation value becomes larger the larger the "smudging", and the error rate also rises accompanying this. As can be seen from FIG. 8(a), this relationship is established when the binary threshold value TH1 is larger than 7. However, the relationship is such that the error rate becomes larger as the second evaluation value becomes smaller when the binary threshold value TH1 is smaller than 7, so that the relationship between the error rate and the second evaluation value is reversed, with the boundary being a binary threshold value TH1 of 7. This is because the error rate increases due to "faintness," as has been explained above, when the binary threshold value TH1 is smaller than 7.

Figure 8B:
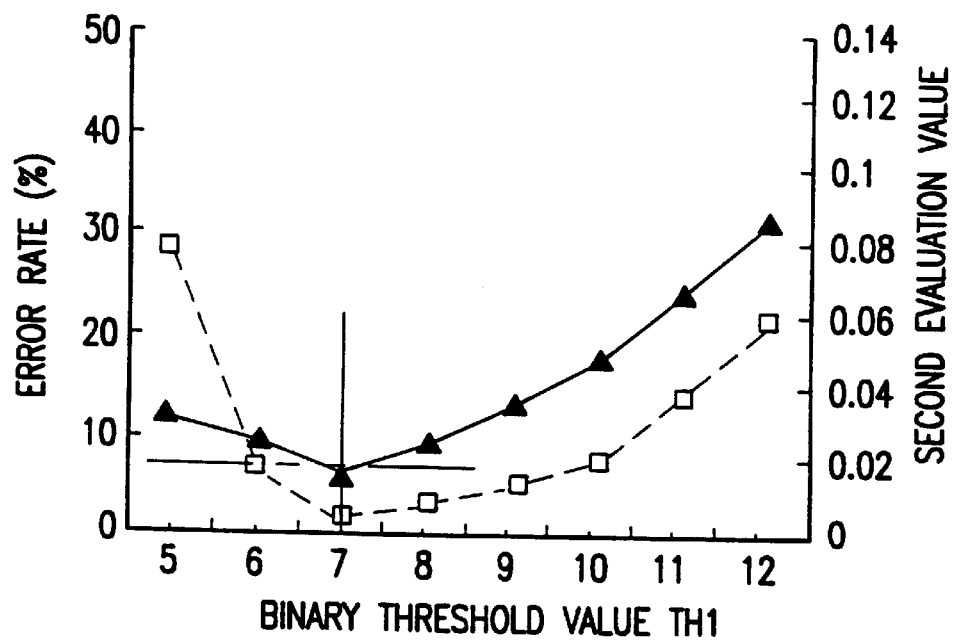

In this way, when the binary threshold value TH1 is smaller than 7, deterioration of image quality is produced due to faintness the smaller the second evaluation value becomes, and the relationship between the error rate and the evaluation value is reversed, with the boundary being a binary threshold value TH1 of 7 as has been explained above. Here, this evaluation is an evaluation which has "smudging" as the base, and in the case of "smudging," because the relationship is such that the error rate increases with increases in the numerical value of the second evaluation value, when the second evaluation value when the binary threshold value TH1 is smaller than 7 is folded back with linear symmetry about the dashed line in FIG. 8(a), FIG. 8(b) results. From this FIG. 8(b), when the correlation between the error rate (indicated by the dotted line) and the second evaluation value (indicated by the solid line) is found, the correlation coefficient becomes 0.70. In particular, the correlation coefficient between the two is 0.98 when the binary threshold value TH1 is in the smudging region greater than 7, the error rate indicated by the dotted line and the second evaluation value indicated by the solid line have substantially same relationship, and this becomes particularly effective in detecting "smudging."

In addition, if this evaluation of the second characteristic amount is evaluated from sensitivity as seen by the naked eye, the larger smudging becomes in FIG. 5, the larger the second evaluation value becomes in FIG. 8(a), and this matches the sensitivity seen by the naked eye, which indicates that this second evaluation value is an adequate indicator in determining image quality.

In this way, it is possible to determine the degree of smudging of a character from the second evaluation value.

Furthermore, an evaluation value is computed which takes into consideration both the first characteristic amount and the second characteristic amount found from the above-described processes. That is to say, by computing a new evaluation value which takes into consideration "faintness," which is the first characteristic amount, and "smudging," which is the second characteristic amount, a more accurate image quality determination is conducted. The following formula is an example of the method of computing this new evaluation value. Here, the new evaluation value is evaluation value A.

$$\text{(Evaluation value A)=(First characteristic amount)−(second characteristic amount)} \quad (4)$$

Figure 9:
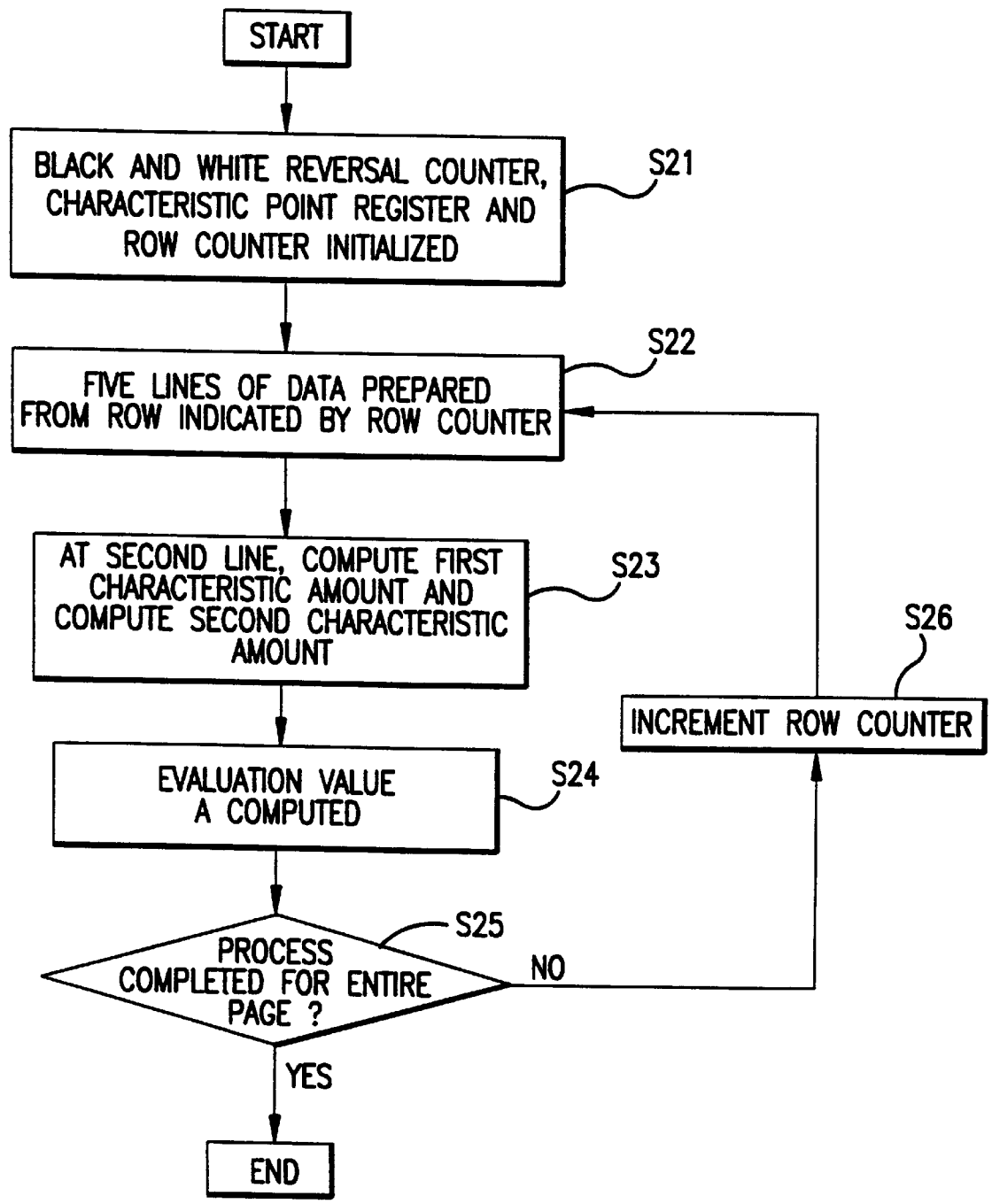
FIG. 9 is a flow chart showing a computation process of the evaluation value A based on the first evaluation value and the second evaluation value for use in the present invention.

FIG. 9 shows a flow chart of the processes of computing this evaluation value A. In FIG. 9, first each of the registers and counters indicated in the flowcharts in FIG. 4 and FIG. 7 above are initialized (step S21). Next, the line data is prepared through line five from the row indicated by the row counter (step S22), scanning of the line(s) is conducted with the second line being the target line, and the above-described first characteristic amount and second characteristic amount are computed (step S23).

Furthermore, each time these first characteristic amount and second characteristic amount are computed, the evaluation value A is computed using above-described formula (4) (step S24). Next, the determination is made (step S25) as to whether the process of computing evaluation value A has been completed for the entire page of the document that is the object of processing, and if this process has not been completed, the row counter is incremented (step S26), and the processes in above-described steps S22 through S25 are conducted again.

In the above processes, each time the processes in step S23 are completed, the evaluation value A is computed in order that this kind of image quality determination process in this image quality computation unit 11 is conducted in parallel with the below-described image quality improvement processes in the image quality improvement unit or the binary threshold value determination processes in the binary threshold value determination unit. However, when the image quality computation process is first conducted as described for the entire page of the document that is the object of processing, following which all of the image quality improvement processes or the binary threshold value determination processes are conducted, in the process flow of FIG. 9 all evaluation values A may be computed after the processes in step S23 have been completed for the entire image that is the object of processing.

Next, the justification for this evaluation value A in a particular sample character image (herein, a sample character image containing the Chinese character "kura") will be described, said value taking into consideration these first and second characteristic amounts.

In this case also, the evaluation of this evaluation value A will be conducted with reference to FIG. 5 which was used in the description of the justification of the above-described first and second characteristic amounts. As this method of evaluation, here also evaluation will be conducted using the character recognition rate. Even in evaluations using the character recognition rate, the recognition rate will change even with the same image depending on the character recognition method, but the tendency will be the same in both.

Figure 10A:
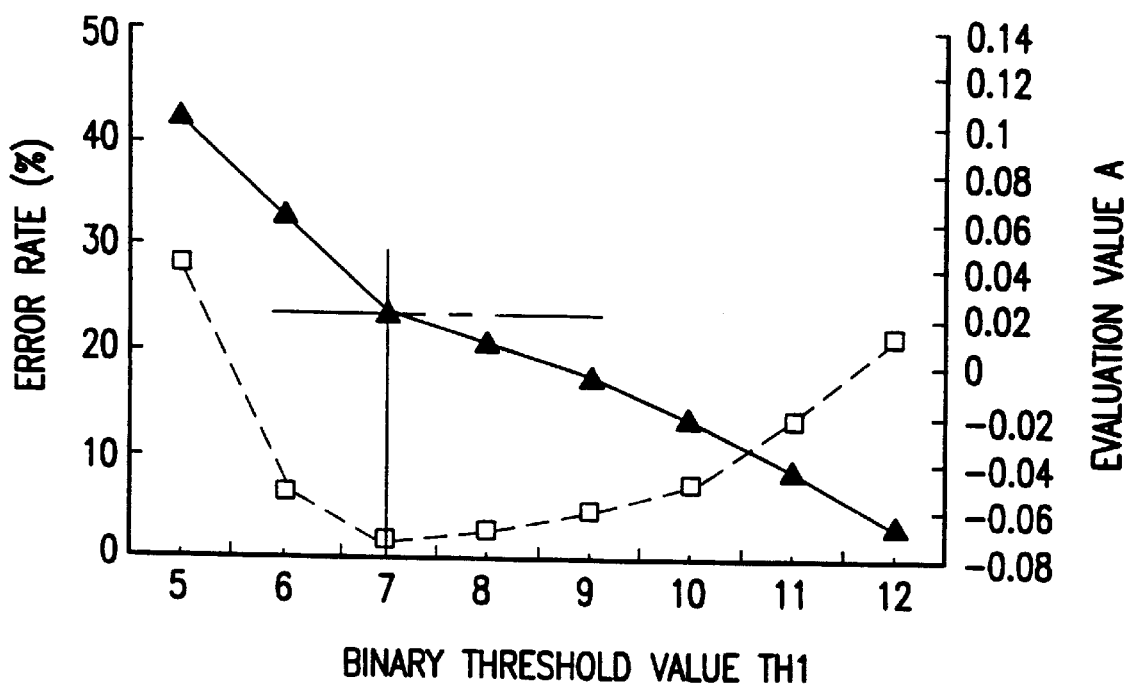
FIG. 10(a) and FIG. 10(b) are graphs showing the relationship between the binary threshold value, the character recognition error rate, and the evaluation value A (first evaluation value-second evaluation value) based on "faintness."
Figure 10B:
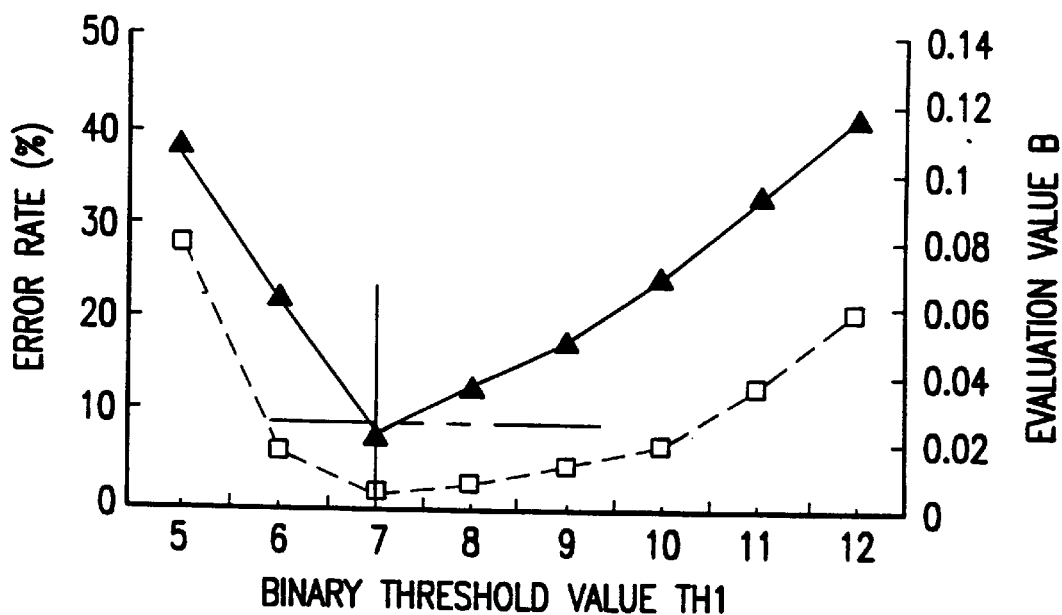

FIG. 10(*a*) shows the relationship (indicated by the dotted line) of the error rate (the rate of inability to recognize) with respect to each image with binary threshold values TH1 of 5 to 12, as shown in FIG. 5, and the relationship (indicated by the solid line) of the evaluation value A with respect to each image with binary threshold values TH1 of 5 to 12. As can be seen from FIG. 10(*a*), the error rate is lowest when the image has a binary threshold value TH1 of 7. In addition, because in this case the evaluation value A is value found by subtracting the second characteristic amount from the first characteristic amount, for example the first characteristic amount (first evaluation value) is 0.11 from FIG. 6(*a*) when the binary threshold value TH1 is 5, and the second characteristic amount (second evaluation value) at this time is 0 from FIG. 8(*a*). Accordingly, the evaluation value A, taking into consideration the first and second characteristic amounts, is 0.11.

In addition, the first characteristic amount (first evaluation value) is 0.04 from FIG. 6(*a*) when the binary threshold value TH1 is 7, and the second characteristic amount (second evaluation value) at this time is 0.02 from FIG. 8(*a*). Accordingly, the evaluation value A is 0.02. In addition, the first characteristic amount (first evaluation value) is 0.02 from FIG. 6(*a*) when the binary threshold value TH1 is 12, and the second characteristic amount (second evaluation value) at this time is 0.09 from FIG. 8(*a*). Accordingly, the evaluation value A is −0.07. In this way, the evaluation value A is computed.

In FIG. 10(*a*), the error rate is high due to deterioration of image quality caused by faintness when the binary threshold value TH1 is 5 and 6, and in addition, the error rate is high due to deterioration of image quality caused by smudging when the binary threshold value TH1 is 7 or higher.

In the case shown in this drawing also, the relationship between the error rate and the second evaluation value is reversed, with the boundary being a binary threshold value TH1 of 7. Here, because the second characteristic amount relating to "smudging" is subtracted from the first characteristic amount relating to "faintness", it is possible to think of this as having "faintness" as a standard in this case also, so similar to above-described FIG. 6(*b*), FIG. 10(*b*) results when the evaluation value at or above a binary threshold value of 7 is folded back around the dashed line in FIG. 10(*a*). From this FIG. 10(*b*), when the correlation between the error rate (indicated by the dotted line) and the evaluation value A (indicated by the solid line) is found, the correlation coefficient becomes 0.90. In this way, by determining image quality through detecting the evaluation value A, which takes into consideration the first and second characteristic amounts, a higher correlation coefficient is obtained than when the first characteristic amount or the second characteristic amount is used independently, indicating that this becomes an extremely reliable indicator as a determination of image quality.

When computing the evaluation value, which takes into consideration "faintness", which is the first characteristic amount, and "smudging", which is the second characteristic amount, in the above-described example a new evaluation value was computed by finding the difference of the first characteristic amount and the second characteristic amount, but a new evaluation value (called evaluation value B) may also be found from the sum of the first characteristic amount and the second characteristic amount using the formula below.

$$\text{(Evaluation value B)=(First characteristic amount)+(second characteristic amount)} \quad (5)$$

The flowchart of the processes of computing this evaluation value B is basically the same as FIG. 9, but the process in step S24 differs in that each time the first characteristic amount and the second characteristic amount are computed, evaluation value B is computed from formula (5) in place of above-described formula (4).

In addition, in the above processes, each time the processes in step S23 are completed, evaluation value B is computed in order that this kind of image quality determination process in this image quality computation unit 11 is conducted in parallel with the below-described image quality improvement processes in the image quality improvement unit or the optimum binary threshold value determination processes in the binary threshold value determination unit. However, when the image quality computation process is first conducted as described for the entire page of the document that is the object of processing, following which all of the image quality improvement processes or the binary threshold value determination processes are conducted, in the process flow of FIG. 9 all evaluation values B may be computed after the processes in step S23 have been completed for the entire image that is the object of processing.

Next, the justification of this evaluation value B in a particular sample character image (herein, a sample character image containing the Chinese character "kura") will be described, said value taking into consideration these first and second characteristic amounts.

In this case also, the evaluation of this evaluation value B will be conducted with reference to FIG. 5. As this method of evaluation, here also evaluation will be conducted using character recognition rate. Even in evaluations using the character recognition rate, the recognition ratio will change even with the same image depending on the character recognition method, but the tendency will be the same in both.

Figure 11:
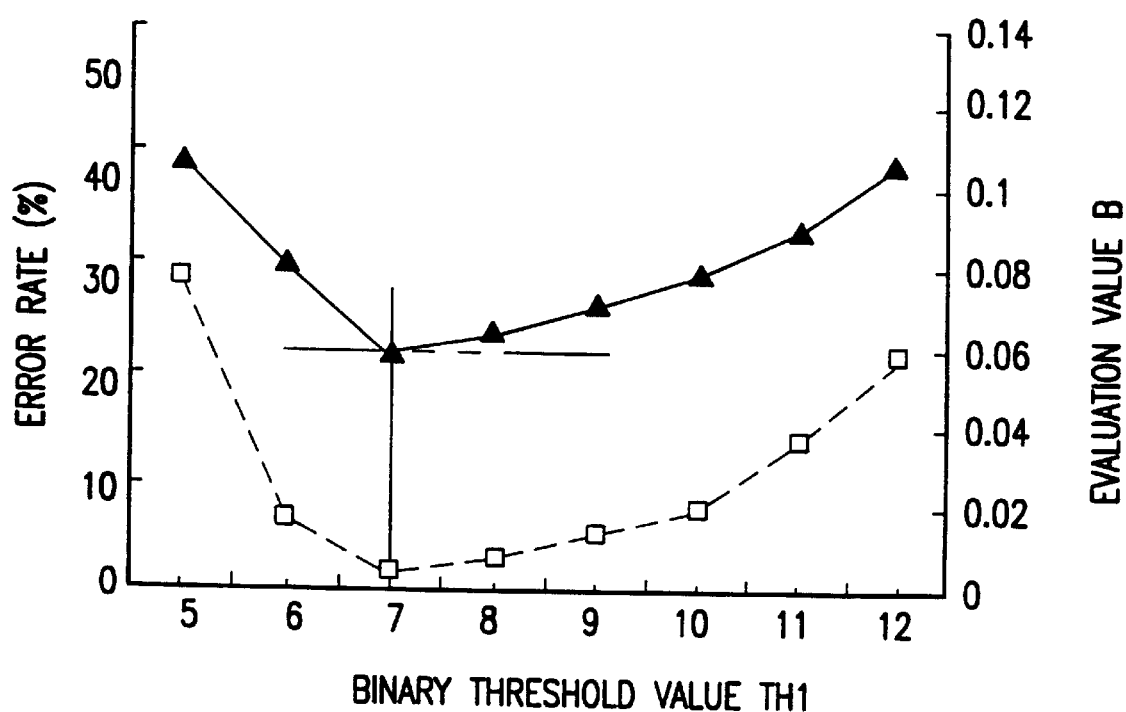
FIG. 11 is a graph showing the relationship between the binary threshold value, the character recognition error rate, and the evaluation value B (first evaluation value+second evaluation value) based on "faintness."

FIG. 11 shows the relationship (indicated by the dotted line) of the error rate (the rate of inability to recognize) with respect to each image with binary threshold values TH1 of 5 to 12, as shown in FIG. 5, and the relationship (indicated by the solid line) of the evaluation value B to each image with binary threshold values TH1 of 5 to 12. As can be seen from FIG. 11, the error rate is lowest when the binary threshold value TH1 is 7. In addition, because in this case the evaluation value B is a value found by adding the second characteristic amount to the first characteristic amount, for example the first characteristic amount (first evaluation value) is 0.11 from FIG. 6($a$) when the binary threshold value TH1 is 5, and the second characteristic amount (second evaluation value) at this time is 0 from FIG. 8($a$). Accordingly, the evaluation value B, taking into consideration the first and second characteristic amounts, is 0.11. In addition, the first characteristic amount (first evaluation value) is 0.04 from FIG. 6($a$) when the binary threshold value TH1 is 7, and the second characteristic amount (second evaluation value) at this time is 0.02 from FIG. 8($a$). Accordingly, the evaluation value B is 0.06. In addition, the first characteristic amount (first evaluation value) is 0.02 from FIG. 6($a$) when the binary threshold value TH1 is 12, and the second characteristic amount (second evaluation value) at this time is 0.09 from FIG. 8($a$). Accordingly, the evaluation value B is 0.11. In this way, the evaluation value B is computed.

From this FIG. 11, when the correlation between the error rate (indicated by the dotted line) and the evaluation value B (indicated by the solid line) is found, the correlation coefficient is high at 0.96. In this way, by determining image quality through detecting the evaluation value B, which takes into consideration the first and second characteristic amounts, a higher correlation coefficient is obtained than when the first characteristic amount or the second characteristic amount is used independently, indicating that this becomes an extremely reliable indicator as a determination of image quality.

In addition, as is clear from FIG. 11, the binary threshold value where evaluation value B is smallest is 7, and because the best image quality can be obtained when the binary threshold value is 7, the binary threshold value corresponding to the point where the evaluation value B is smallest may be chosen as the threshold value for binary coding. In other words, when the first characteristic amount and the second characteristic amount are added together, the point where the evaluation value B thus obtained is smallest is the threshold value with the best image quality, and because of this it is possible to determine easily the threshold value for binary coding by selecting said threshold value as the threshold value for binary coding (a description of this threshold value for binary coding is provided hereinafter). For example, in the case of FIG. 10($a$), when the threshold value is larger than the evaluation value which is a certain standard, faintness is produced, while when the threshold value is smaller than an evaluation value which is a certain standard, smudging is produced, but because it is difficult to specify where to choose the evaluation value which is that certain standard, promptly obtaining the optimum threshold value for binary coding is not possible with the degree of ease in FIG. 11. Similarly, with FIG. 6($a$) and FIG. 8($a$) also, because it is difficult to specify where to choose the evaluation value which is a certain standard, promptly obtaining the optimum threshold value for binary coding is not possible with the degree of ease indicated in FIG. 11.

Next, an evaluation value which makes the processes in the below-described image quality improvement unit more effective is obtained by adding one more characteristic amount (called the third characteristic amount) to the above-described first characteristic amount and second characteristic amount. This third characteristic amount is computed by the third characteristic amount extraction device 113 in FIG. 1, and this characteristic amount is the length in the sideways direction corresponding to the size of the character.

With the below-described image quality improvement unit, processes which restore missing pixels are primarily conducted, but in this case, the number of missing pixels differs depending on the character size. In other words, large characters have a large number of missing pixels, while small characters have only a small number of missing pixels. Thus, by making a new evaluation value C out of the value found using the character size, which is this third characteristic amount, in addition to the above-described first and second characteristic amounts and evaluation values A and B, it becomes possible to conduct a more effective process in the image quality improvement unit.

This third characteristic amount is an average length of black runs at least as long as a fixed length, and as explained above, this is a value close to the size of the character. The average length of black runs at least as long as a fixed length is the length of the average of "black runs at least as long as a fixed length" used when finding the above-described second characteristic amount. In addition, an evaluation value C is computed using the following formula.

(evaluation value C)=(first and second evaluation values or evaluation values A and B)×(third characteristic amount)  (6)

Figure 12:
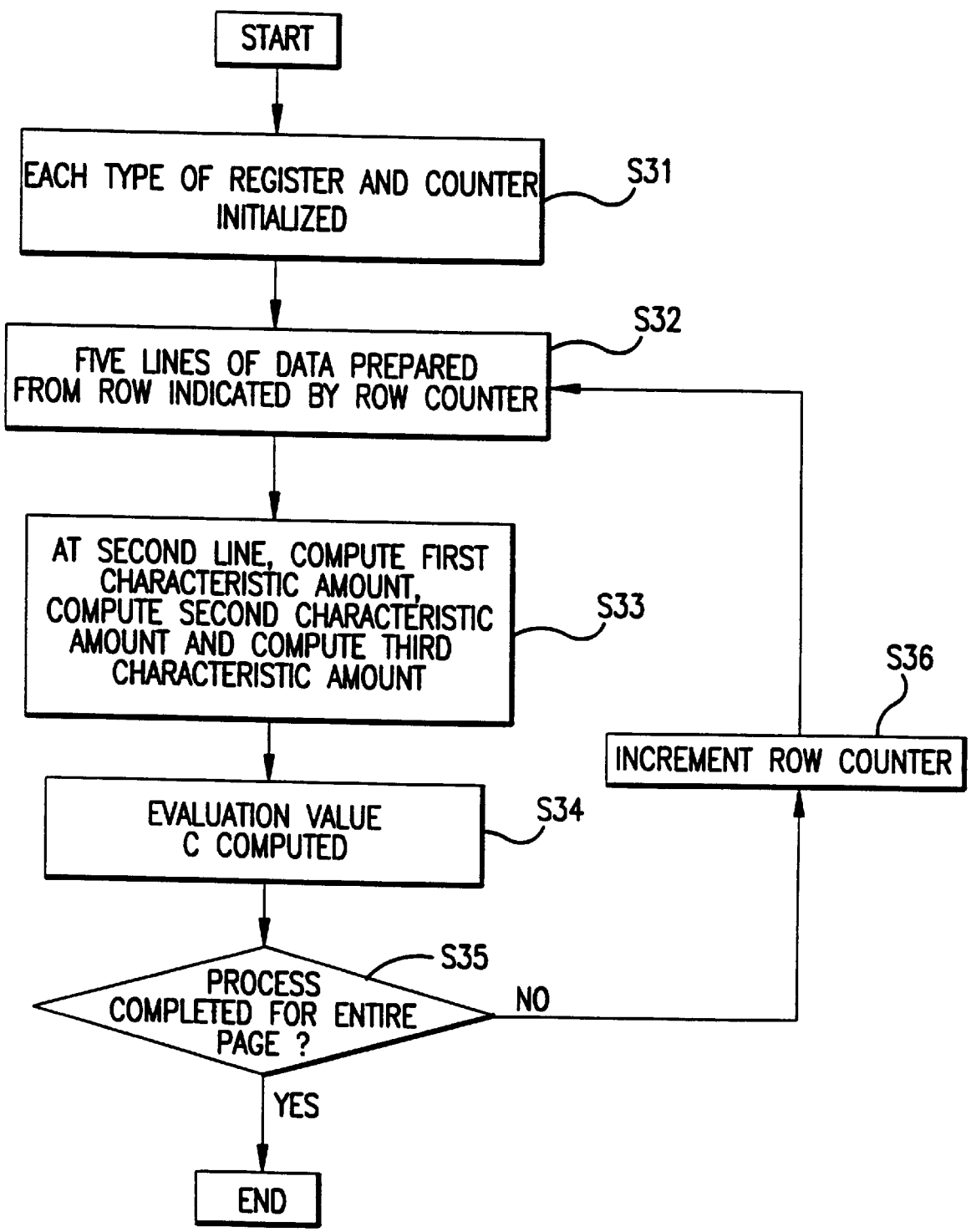
FIG. 12 is a flow chart showing a computation process of the evaluation value C based on the first evaluation value, the second evaluation value, and the third characteristic amount for use in the present invention.

FIG. 12 shows a flowchart of the process of computing this evaluation value C. In FIG. 12, first each of the registers and counters are initialized (step S31), similar to the processes shown in the flowchart in above-described FIG. 9. Next, the line data is prepared through line five from the row indicated by the row counter (step S32), scanning of the line(s) is conducted with the second line being the target line, and the above-described first characteristic amount, second characteristic amount and third characteristic amount are computed (step S33).

Furthermore, each time these first, second and third characteristic amounts are computed, the evaluation value C is computed using above-described formula (6) (step S34). Next, the determination is made (step S35) as to whether or not the process of computing evaluation value C has been completed for the entire page of the document that is the object of processing, and if this process has not been completed, the row counter is incremented (step S36), and the processes in above-described steps S32 through S35 are conducted again.

In the above processes, each time the processes in step S33 are completed, the evaluation value C is computed in order that this kind of image quality determination process in this image quality computation unit 11 is conducted in parallel with the below-described image quality improvement processes in the image quality improvement unit or the optimum binary threshold value determination processes in the binary threshold value determination unit. However, when the image quality computation process is first conducted as described for the entire page of the document that is the object of processing, following which all of the image quality improvement processes or the binary threshold value determination processes are conducted, in the process flow of FIG. 11 all evaluation values C may be computed after the processes in step S33 have been completed for the entire image that is the object of processing.

Now, the following four patterns can be considered for this evaluation value C.

(a) (evaluation value C)=(first characteristic amount (first evaluation value))×(third characteristic amount)
(b) (evaluation value C)=(second characteristic amount (second evaluation value))×(third characteristic amount)
(c) (evaluation value C)=(evaluation value (evaluation value A) taking the second characteristic amount into consideration in addition to the first characteristic amount)×(third characteristic amount)
(d) (evaluation value C)=(evaluation value (evaluation value B) taking the second characteristic amount into consideration in addition to the first characteristic amount)×(third characteristic amount)

The above (a) is called evaluation value C1, (b) is called evaluation value C2, (c) is called evaluation value C3 and (d) is called evaluation value C4.

In this way, by using the third characteristic amount, which is character size, it is possible to more efficiently conduct image quality improvement processes in the below-described image quality improvement unit.

Extraction of the various characteristic amounts as described above was conducted in actual space (the image as seen by the naked eye), but next a description will be given of extraction of characteristic amounts in frequency space.

First, a description will be given of a method of extracting a characteristic amount (called the fourth characteristic amount) relating to "faintness" in this frequency space. In extracting the characteristic amount relating to "faintness" in this frequency space, first a description will be given of the relationship between the frequency and the characteristic amount which is "faintness."

As can be seen from FIG. 41, when "faintness" is produced, the edge portion of lines become unclear. The edges becoming unclear can be thought of as a decrease in the high frequency component. Accordingly, it is possible to know the degree of faintness by paying attention to the high frequency component.

In light of this, a description is now provided of the method of extracting the characteristic amount (fourth characteristic amount) relating to "faintness" in the frequency space. Extraction of this fourth characteristic amount is conducted by the fourth characteristic amount extraction device 114 in FIG. 1. Fourier transformation, discrete cosine transformation, and Hadamard's transformation are among the methods of orthogonal transformation to frequency space, and any orthogonal transformation method may be used, but here, the description will be given for an example using a Hadamard's transformation with the computation processes limited to only addition and subtraction.

Figure 13:
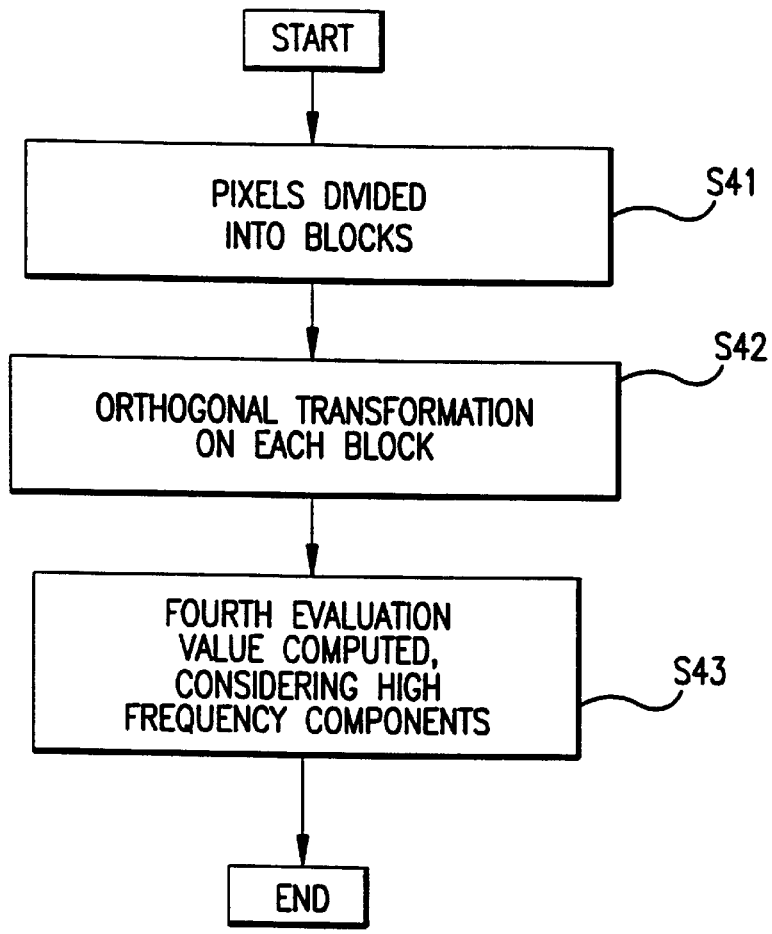
FIG. 13 is a flow chart showing a computation process of the fourth evaluation value in the frequency region for use in the present invention.

Roughly, in the order of processes in this Hadamard's transformation, as shown in the flowchart in FIG. 13, first the pixels that are the objects of processing are divided into blocks of size n pixels by m pixels (step S41), and a orthogonal transformation (a Hadamard's transformation in this case) is conducted (step S42) with respect to the separated blocks. The size of this division is arbitrary, but here it is convenient if n and m are in the range 1–32. Furthermore, computation of the fourth characteristic amount is conducted (step S43), paying attention to the high frequency component (called high sequences in Hadamard's transformation) obtained from the Hadamard's transformation. A description of the method of computing this fourth characteristic amount is given below.

This Hadamard's transformation is conducted as shown by the following formula.

$$Y = H_n X H_m \qquad (7)$$

In the above formula, Y represents the matrix with n rows and m columns following a Hadamard's transformation, $H_n$ and $H_m$ represent the matrices of dimension n and m respectively used in the Hadamard's transformation, and X represents the n pixel by m pixel sectional image matrix. Here, the matrices $H_n$ and $H_m$ used in the Hadamard's transformation when n and m are both 4 pixels (dimension 4) are:

$$H_4 = 1/\sqrt{4} \begin{pmatrix} 1, & 1, & 1, & 1 \\ 1, & 1, & -1, & -1 \\ 1, & -1, & -1, & 1 \\ 1, & -1, & 1, & -1 \end{pmatrix} \qquad (8)$$

In addition, X, which indicates the sectional image matrix, is an n×m matrix represented by data indicating the black or white state of each pixel (0 for white, 1 for black).

Figure 14:
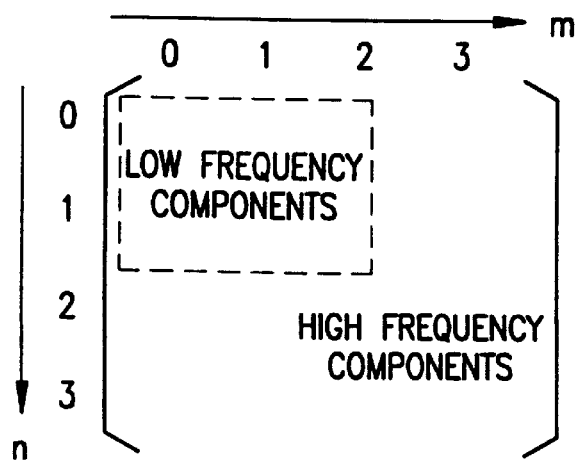
FIG. 14 is a drawing showing the high frequency components and the low frequency components in a matrix after Hadamard's transformation.

The n row by m column matrix Y found in this way following the Hadamard's transformation (here, n and m are both 4 pixels) has the properties that said matrix yields higher frequency components (higher sequences) the larger the numerical values n and m become, as shown in FIG. 14, and in addition yields lower frequency components (low sequences) the smaller the numerical values of n and m become. Accordingly, in the n row by m column matrix Y following the Hadamard's transformation (here, n and m are both 4 pixels), it is desirable to pay attention to the sections with large numerical values n and m when looking for high frequency components, and it is preferable to pay attention to the sections with small numerical values n and m when looking for low frequency components. Specifically, in the case where n and m relates to 4 pixels (n=m=4), the low frequency components are when n and m are 0 or 1 as indicated by the dotted line in FIG. 14, and the high frequency components are when n or m is 2 or 3.

With this Hadamard's transformation, the n row by m column matrix Y following the Hadamard's transformation can be divided into blocks. That is to say, if N is the number of block divisions, the n row by m column matrices Y1, Y2, . . . , YN are obtained following the Hadamard's transformation. Here, representing each entry in the matrices Y1, Y2, . . . , YN following the Hadamard's transformation as $y_{ij}$ ($0 \leq i \leq n-1$, $0 \leq j \leq m-1$), the variance $\sigma_{ij}$ in each entry is represented by the following formula.

$$\sigma_{ij} = \frac{N \cdot \sum y_{ij}^2 - (\sum y_{ij})^2}{N^2} \quad (9)$$

In addition, calling the total variance $\sigma_x$, the ratio $\rho_{ij}$ of the variance in each entry $y_{ij}$ of the matrices Y1, Y2, ..., YN following the Hadamard's transformation can be defined as:

$$\rho_{ij} = \sigma_{ij}/\sigma_x \quad (10)$$

Here, the total variance $\sigma_x$ of formula (10) is represented by:

$$\sigma_x = \sum_{i=0}^{n-1} \sum_{j=0}^{m-1} \sigma_{ij} \quad (11)$$

Figure 15A:
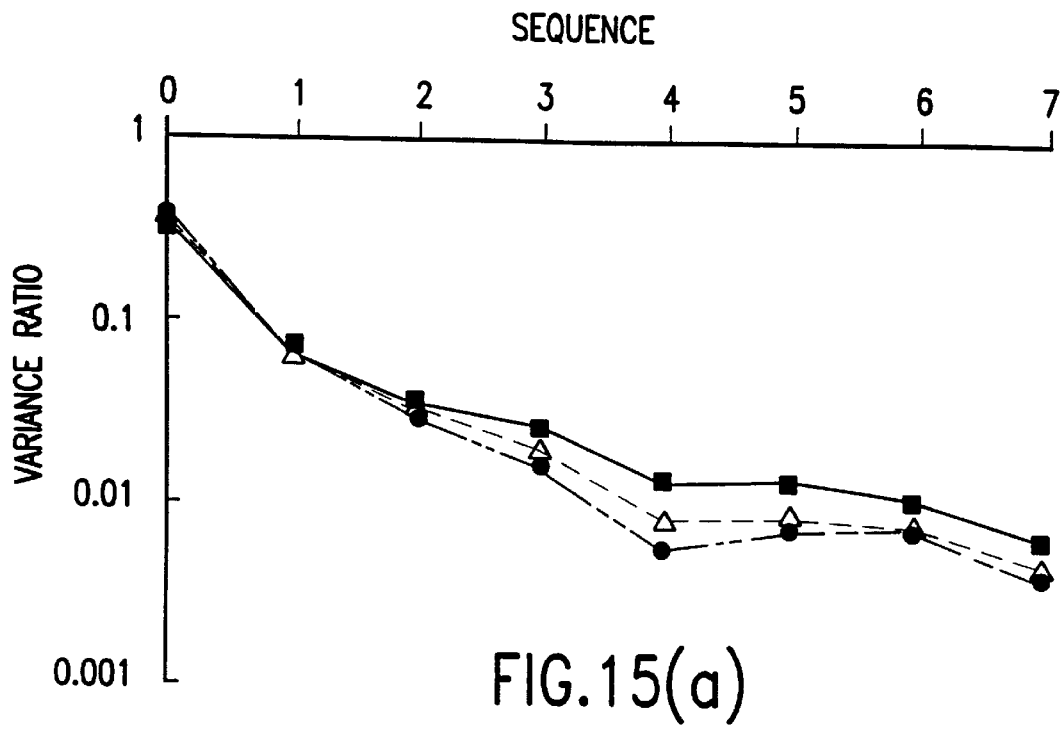
FIG. 15(a) and FIG. 15(b) are graphs showing the relationship between the sequence and the ratio of dispersion in a certain binary threshold value.
Figure 15B:
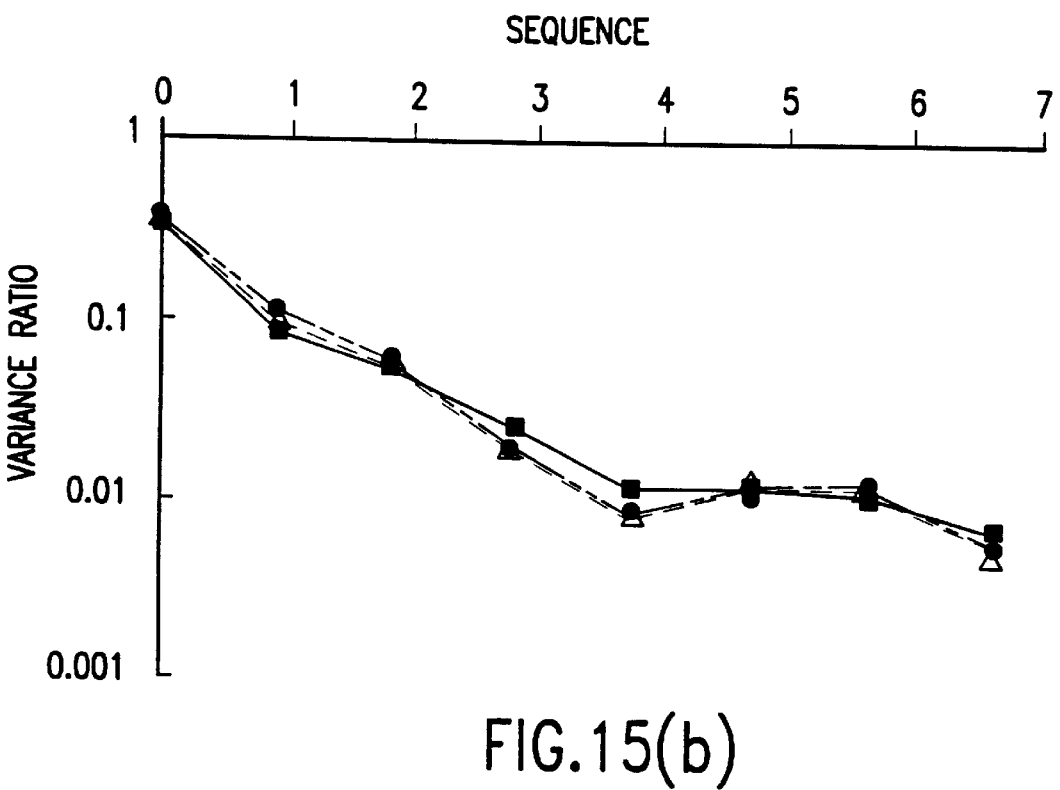

FIG. 15(a) and FIG. 15(b) are graphs indicating the ratio of the variance in each sequence (frequency component) when faintness is produced by copying a particular sample image. Here, n=m=8, so the sequences in both the row direction and the column direction are from 0 to 7, and in addition, taking the number of copies to be 0 (this corresponds to a binary threshold value TH1 of 7 in FIG. 5), taking the number of copies to be 1 (this corresponds to a binary threshold value TH1 of 6 in FIG. 5), and taking the number of copies to be 2 (this corresponds to a binary threshold value TH1 of 5 in FIG. 5), in FIG. 15(a) the relationship between the ratio of the variance and each sequence when the binary threshold value TH1 is 7 is indicated by the solid line, the relationship between the ratio of the variance and each sequence when the binary threshold value TH1 is 6 is indicated by the dotted line, and the relationship between the ratio of the variance and each sequence when the binary threshold value TH1 is 5 is indicated by the dashed line. In addition, in FIG. 15(a) the data is data when a document with horizontal writing is input in a vertical direction and scanned in the horizontal direction (the row direction). FIG. 15(a) represents the relationship between the variance ratio and each sequence for the components (i=0, j=0 to 7) in the horizontal direction (row direction) while FIG. 15(b) represents the relationship between the variance ratio and each sequence for the components (i=0 to 7, j=0) in the vertical direction (column direction).

Here, because this is a case wherein a document written horizontally has been inserted in the vertical direction and is scanned in the horizontal direction (row direction), faintness is easily produced in the horizontal direction (row direction), and consequently, the difference in number of copies appears as the difference in the degree of faintness in the horizontal direction (row direction), as can be seen from FIG. 15(a) and FIG. 15(b). That is, in FIG. 15(a), when considering the high sequence (sequence 4) sections, it can be seen that the difference in the number of copies appears as the difference in the degree of faintness. Thus it is possible to find an evaluation value (this evaluation value will be called the fourth evaluation value) relating to "faintness", paying attention to these high sequence sections.

The following methods are given as methods of computing this fourth evaluation value.

(I) The sum of the variance ratios in the high sequence sections becomes the fourth evaluation value. That is to say, the fourth evaluation value is expressed as:

$$\text{Fourth evaluation value} = 1 \bigg/ \left( \sum_{i=0}^{n-1} \sum_{j=0}^{n-1} \rho_{ij} - \sum_{i=0}^{n/2-1} \sum_{j=0}^{n/2-1} \rho_{ij} \right) \quad (12)$$

This takes into consideration all variance ratios in the high frequency components shown in FIG. 14, but in cases wherein the direction of faintness is known beforehand, for example in the above-described case wherein faintness is easily produced in the horizontal direction, the fourth evaluation value may take into consideration only FIG. 15(a) (take into consideration only the j component), so that the value is found from:

$$\text{Fourth evaluation value} = 1 \bigg/ \sum_{j=n/2}^{n-1} \rho_{0j} \quad (13)$$

Figure 16:
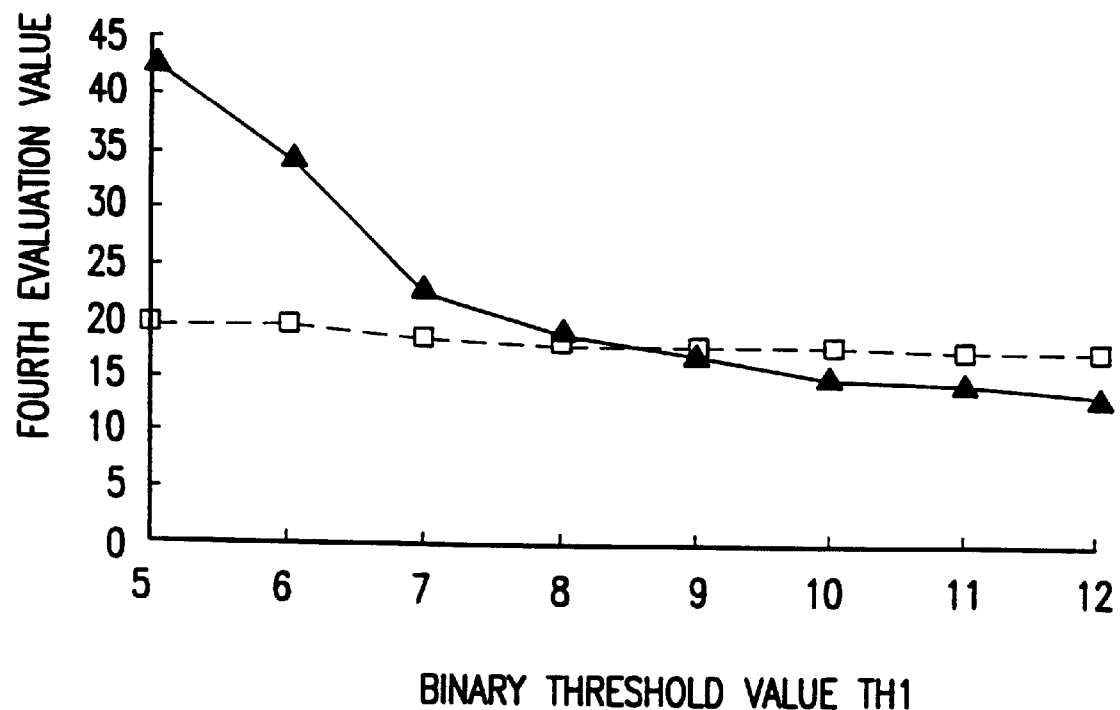
FIG. 16 is a graph showing the relationship between the binary threshold value and the fourth evaluation value obtained in the frequency region (part 1).

Because this formula (13) uses only the numerical value (variance ratio) clearly expressing the difference in number of copies as the difference in the degree of faintness, it is possible to make the precision of the evaluation value that is found high. In formulas (12) and (13), a reciprocal expression is used in order to make the evaluation value a large numerical value in comparison with the size of the faintness. FIG. 16 is used to describe the relationship between the above-described binary threshold value TH1 (TH1=5 to 12) and the fourth evaluation value found from formula (13). Here, because the block size is n×m=8×8, the high sequence sections are in the range n/2 to n−1 from formula (13), that is to say, sequences 4 to 7. Now, taking the variance ratios in the horizontal direction with respect to sequences 4 to 7 at a binary threshold value TH1 of 5 to be, for example, 0.0055 at sequence 4, 0.0070 at sequence 5, 0.0068 at sequence 6, and 0.0039 at sequence 7 as found through calculations, the sum of these becomes 0.0232. The reciprocal of this is 43.1, and this value becomes the fourth evaluation value. Similarly, supposing that 0.0288 is found through calculations to be the sum of the variance ratios in the horizontal direction with respect to sequences 4 to 7 at a binary threshold value TH1 of 6, the reciprocal is 34.7 and this value becomes the fourth evaluation value. In addition, supposing that 0.0431 is found through calculations to be the sum of the variance ratios in the horizontal direction with respect to sequences 4 to 7 at a binary threshold value TH1 of 7, the reciprocal is 23.2 and this value becomes the fourth evaluation value. The curve (FIG. 16) of these fourth evaluation values found in this manner at binary threshold values TH1 of 5 to 7 traces a curve similar to the curve of the first evaluation value at binary threshold values TH1 of 5 to 7 shown in above-described FIG. 6(a).

From FIG. 15(a), only evaluation values in the range of binary threshold values TH1 from 5 to 7 have been found, but it is clear that even at binary threshold values TH1 of 8 and greater, a curve is traced which is similar to that in above-described FIG. 6(a), and in fact it is possible to obtain a curve similar to that in FIG. 6(a) in the range of binary threshold values TH1 from 5 to 12. In addition, the curve indicated by the dotted line in FIG. 16 shows the sum (see FIG. 15(b)) of variance ratios in the vertical direction with respect to sequences 4 to 7 at binary threshold values TH1 of 5 to 12, and consequently, because faintness is slight in the vertical direction in this case, not a large difference is created in the respective evaluation values in the range of binary threshold values from 5 to 12.

The fourth evaluation value can be found as described above, but this method uses many sum computations in order to find the variance ratio as can be seen from formulas (12) and (13), and because of this the following method is given as a simpler method.

(II) The ratio of sum of the absolute values of the high sequence sections in the matrix Y (matrices Y1 to YN) following the Hadamard's transformation to the sum of the absolute values of all components in matrix Y (matrices Y1 to YN) following the Hadamard's transformation is found, and the fourth evaluation value is found on the basis of this ratio.

This method (II) is described below.

Figure 17A:
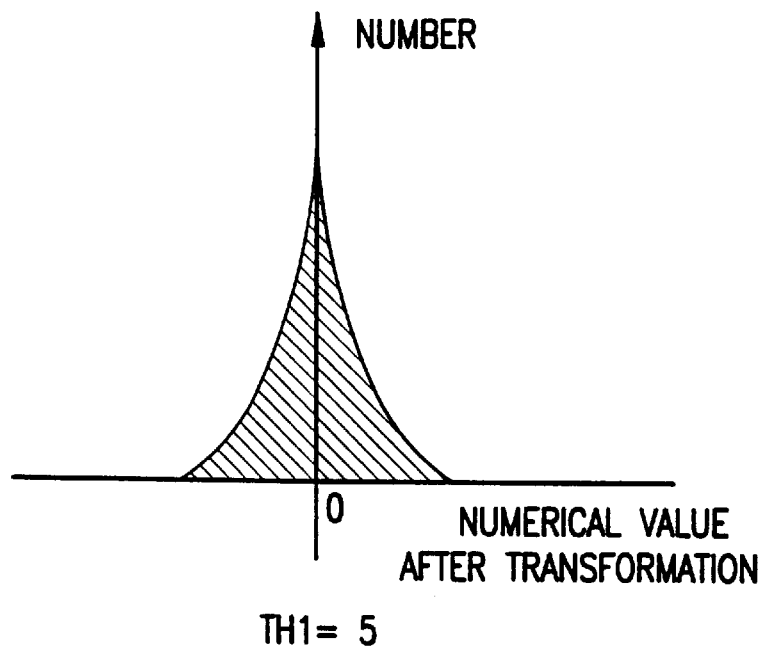
FIG. 17(a) and FIG. 17(b) are graphs showing a distribution in a certain sequence other than the DC component in Hadamard's transformation.

The above-described variance ratios being large means that the variances are relatively large. In the case of a Hadamard's transformation, the average values can be approximated with a Laplace distribution about 0, as shown in FIG. 17, with the exception of the DC component (i=0, j=0). From this, when the variance ratio is relatively small (faintness is large) at the high sequence sections in FIG. 15(a), such as in the case of the image with a binary threshold value TH1 of 5, the width of the distribution about 0 is relatively small as in FIG. 17(a), and as a result, the sum of the absolute values of the high sequence sections in matrix Y (matrices Y1 to YN) following the transformation also becomes relatively small.

Figure 17B:
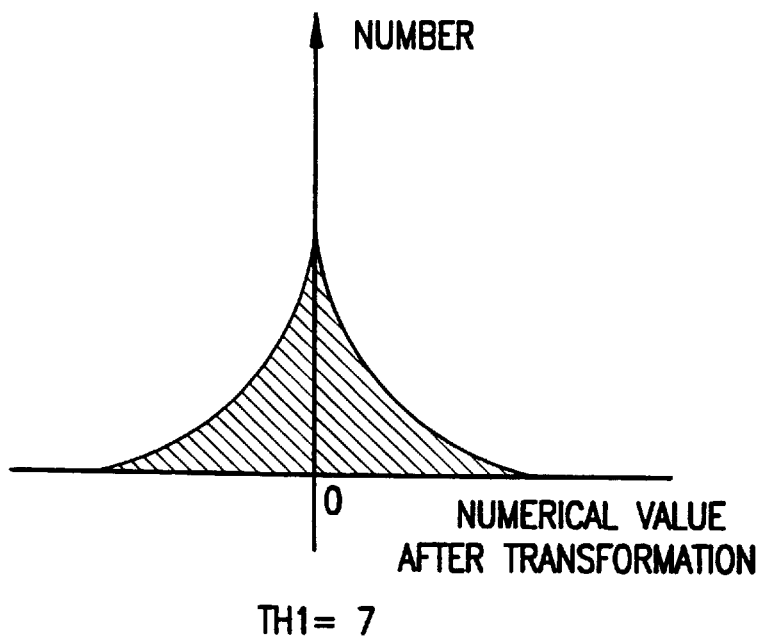

On the other hand, when the variance ratio is relatively large (faintness is small) at the high sequence sections, such as in the case of the image with a binary threshold value TH1 of 7, the width of the distribution about 0 is relatively large as in FIG. 17(b), and as a result, the sum of the absolute values of the high sequence sections in matrix Y (matrices Y1 to YN) following the transformation also becomes relatively large.

FIG. 17(a) shows the distribution of the values of the high sequence sections (here, the values of each Y corresponding to sequence 4) of the matrix Y (matrices Y1 to YN) following the transformation at a binary threshold value TH1 of 5 in FIG. 15(a), while FIG. 17(b) shows the distribution of the values of the high sequence sections (here, the values of each Y corresponding to sequence 4) of the matrix Y (matrices Y1 to YN) following the transformation at a binary threshold value TH1 of 7 in FIG. 15(a). As can also be seen from FIG. 17(a) and FIG. 17(b), comparing images with large faintness and images with small faintness in the high sequences (sequence 4 in this case), the images with large faintness have a smaller width of distribution than do the images with small faintness, and as a result of this, the sum of the absolute values in all high sequence components is relatively small in the case of the images with large faintness in contrast to the images with small faintness. From this, it is possible to compute an evaluation value on the basis of the sum of the absolute values in all high sequence components in the matrix Y (matrices Y1 to YN).

Accordingly it is possible to express the fourth evaluation value with the following formula.

$$\text{Fourth evaluation value} = 1 \bigg/ \left\{ 1 - \left( \sum_{i=0}^{n/2-1} \sum_{j=0}^{n/2-1} \sum |y_{ij}| \bigg/ \sum_{i=0}^{n-1} \sum_{j=0}^{n-1} \sum |y_{ij}| \right) \right\} \quad (14)$$

In formula (14), $\Sigma |y_{ij}|$ expresses the total sum of the ij components of the matrix Y (matrices Y1 to YN) following the transformation of each block in the N blocks. Furthermore, if the direction of faintness is known beforehand, as noted above, for example when it is known that faintness is easily produced in the horizontal direction as noted above, it is fine for only the j component to be taken into consideration, in which case formula (14) is found from:

$$\text{Fourth evaluation value} = 1 \bigg/ \left\{ \sum_{j=n/2}^{n-1} \sum |y_{0j}| \bigg/ \sum_{j=0}^{n-1} \sum |y_{0j}| \right\} \quad (15)$$

Because this formula (15) uses only the numerical value (variance ratio) which clearly expresses the difference in the number of copies as a difference in the degree of faintness, it is possible to make the precision greater for the evaluation value that is found. The reason reciprocals are used in formulas (14) and (15) is so that the evaluation value is a large numerical value in comparison to the size of the faintness.

Figure 18:
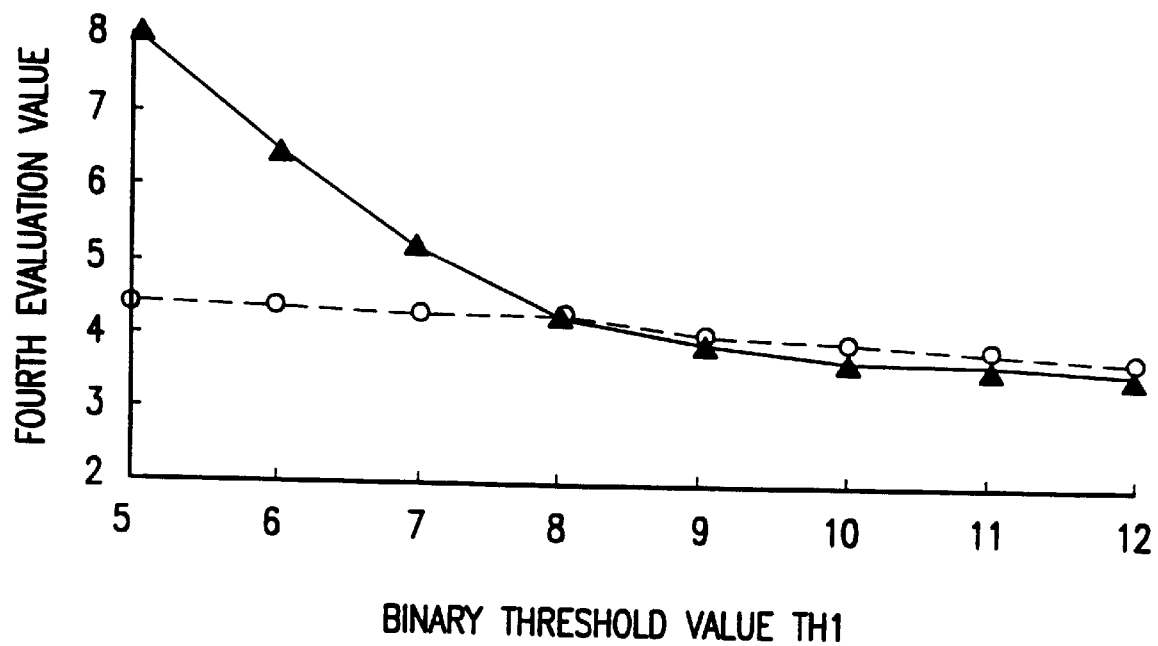
FIG. 18 is a graph showing the relationship between the binary threshold value and the fourth evaluation value obtained in the frequency region (part 2).

FIG. 18 shows the relationship between the above-described binary threshold value TH1 (TH1=5 to 12) and the fourth evaluation value obtained from above-described formula (15). Here, the size of the division blocks is n×m=8×8, and in addition, the number N of blocks is 3. When the binary threshold value TH1 is 6, the $y_{0j}$ ($0 \leq j \leq 7$) components of matrix Y1 after the transformation in the first block are (14, 6, −5, 2, 1, −2, −2, 1), the $y_{0j}$ ($0 \leq j \leq 7$) components of matrix Y2 after the transformation in the second block are (13, −7, 0, −4, 0, 2, 0, −1), and the $y_{0j}$ ($0 \leq j \leq 7$) components of matrix Y3 after the transformation in the third block are (12, 5, −3, 0, −2, 1, 0, 1).

Now, the sum of the absolute values of all components of matrix Y1 after the transformation in the first block is, from formula (15), 14+6+5+2+1+2+2+1=33, and in addition, the sum of the absolute values of the high sequence sections (from sequence 4 up) out of these is 1+2+2+1=6. In addition, the sum of the absolute values of all components of matrix Y2 after the transformation in the second block is 27 using a similar calculation, and the sum of the absolute values of the high sequence components out of these is 3. Furthermore the sum of the absolute values of all components of matrix Y3 after the transformation in the third block is 24, and the sum of the absolute values of the high sequence components out of these is 4.

Accordingly, the fourth evaluation value when the binary threshold value TH1 is 6 is, from formula (15), fourth evaluation value=1/[(sum of absolute values of high sequence components)/(sum of absolute values of all components)], and when the above numerical values are substituted into this formula, the fourth evaluation value becomes 1/[(6+3+4)/33+27+24)], and thus it is found that the fourth evaluation value is about 6.6.

FIG. 18 is a graph showing the fourth evaluation values as found using formula (15) for the cases when the binary threshold value TH1 is 5 and when the binary threshold value TH1 is 7, similar to the case explained above. The curve in this FIG. 18 traces a curve that is similar to that of FIG. 6. In addition, the curve indicated by the dotted line in FIG. 18 indicates the evaluation values with respect to the vertical direction in each image when the binary threshold value TH1 is 5 to 12, and in this case, because the faintness in the vertical direction is small, no large difference is produced in the evaluation values in each of the images at binary threshold values of 5 to 12.

By thus extracting the characteristic amounts in the frequency space as described above, it is possible to compute a fourth evaluation value relating to "faintness." However, because this description in FIGS. 16 and 18 is of data for the case wherein a document written horizontally is inserted in the vertical direction and scanned in the horizontal direction (row direction) as explained above, the evaluation value of each image is the result of the effects of faintness in the horizontal direction. Accordingly, if the results of FIG. 16 and FIG. 18 are considered, it is possible to determine the direction in which faintness is produced, or the direction of insertion of the image (insertion in the vertical direction or insertion in the horizontal direction).

In addition, with the above description, a description was given only for the horizontal direction and the vertical direction, but it is possible to detect the direction in which faintness is produced from the matrix Y following transformation, said direction being in the range from 0° to 90°. For example, it is possible to investigate the 45° direction by finding the values from the i=j ($0 \leq i \leq n-1$) components in the matrix Y following transformation.

In formula (12), a fourth evaluation value is computed taking into consideration the variance ratio of all elements in the high frequency components, and in addition, in formula (13), a fourth evaluation value is computed taking into consideration the variance ratio of all elements in the high frequency components in the direction in which faintness is produced, but the fourth evaluation value may also be computed taking into consideration the variance ratio of only one or two or more elements in the high frequency components. The same is also true of formulas (14) and (15).

The above description is a description for a method of extracting a characteristic amount (the fourth characteristic amount) relating to "faintness" in a frequency space, but next, a method will be described for extracting a characteristic amount (called the fifth characteristic amount) relating to "smudging" in the frequency space. In extracting the characteristic amount relating to "smudging" in this frequency space, first a description will be given of the relationship between the frequency and the characteristic amount which is "smudging."

As described above, the occurrence of smudging consists of pixels becoming black and the frequency of black and white reversals of the pixels becoming small, and greater smudging can be considered to occur when the frequency of black and white reversals becomes smaller. Thinking of this frequency of black and white reversals as the frequency, the sections where smudging is produced can be considered the low frequency components, and it is possible to know the degree of smudging by considering these low frequency components.

A description will be given of the method of extracting the characteristic amount (fifth characteristic amount) relating to "smudging" in the frequency space. Extraction of this fifth characteristic amount is conducted by the fifth characteristic amount extraction device 115 in FIG. 1. Fourier transformation, discrete cosine transformation, and Hadamard's transformation are among the methods of orthogonal transformation to frequency space as noted above, and any orthogonal transformation method may be used, but here, the description will be given for an example using a Hadamard's transformation with the computation processes limited to only addition and subtraction.

Figure 19:
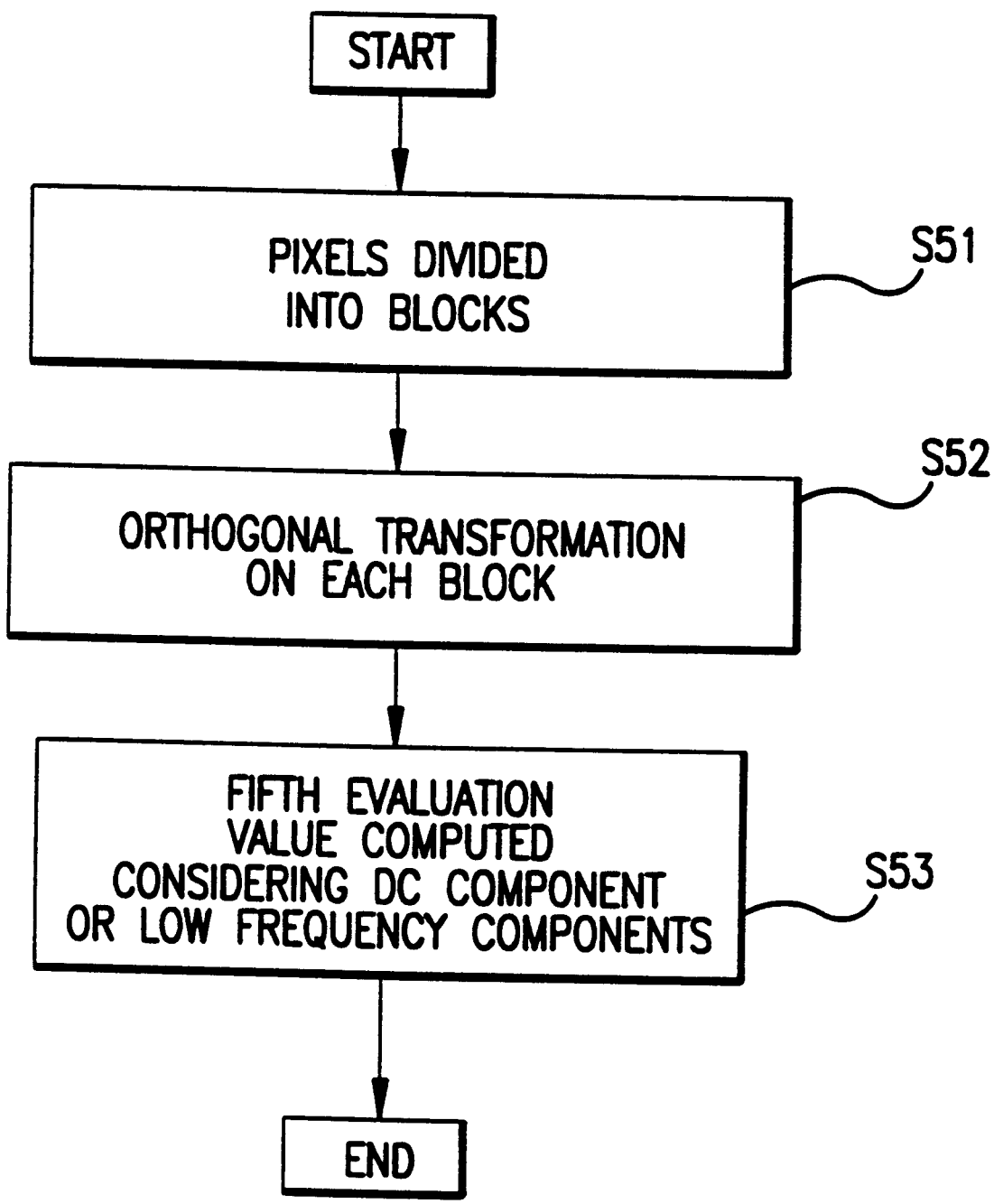
FIG. 19 is a flow chart of a computation process of the fifth evaluation value in the frequency region for use in the first aspect of present invention.

Basically, in the order of processes in this Hadamard's transformation, as shown in the flowchart in FIG. 19, first the pixels that are the objects of processing are divided into blocks of size n pixels by m pixels (step S51), and a orthogonal transformation (a Hadamard's transformation in this case) is conducted (step S52) with respect to the separated blocks. The size of this division is arbitrary, but here it is convenient if n and m are in the range 1–32. Furthermore, computation of the characteristic amount (called the fifth characteristic amount) is conducted (step S53), paying attention to the low, frequency components (low sequences) or the DC component (direct current component, that is to say, the i=j=0 component) of the matrix Y following the transformation which is obtained from the Hadamard's transformation.

As the method of computing this fifth evaluation value, there are:

(I) Considering the DC component in the matrix Y (Y1–YN) following the Hadamard's transformation, the fifth evaluation value is set, for example, as the variance value (found using formula (9) above) in this DC component.

The numerical value of this DC component is a value which corresponds to the number of black pixels in each block. Hence, the distribution width of the numerical value in this DC component becomes wider the more smudging is produced, and as a result, the variance becomes larger. Accordingly, by paying attention to this DC component, it is possible to set an evaluation value relating to "smudging."

(II) The evaluation value is computed paying attention to the low frequency components (low sequences) in the matrix Y (matrices Y1 to YN) following the Hadamard's transformation.

This uses the variance value (found from formula (9) above) of the low sequences (sequences 1 to 3 when the block size is n=m=8) other than the DC component as the evaluation value. Or, it is also possible to use the sum of the variance values of two or more elements of the low sequences (sequences 0 to 3) including the DC component as the evaluation value.

Figure 20:
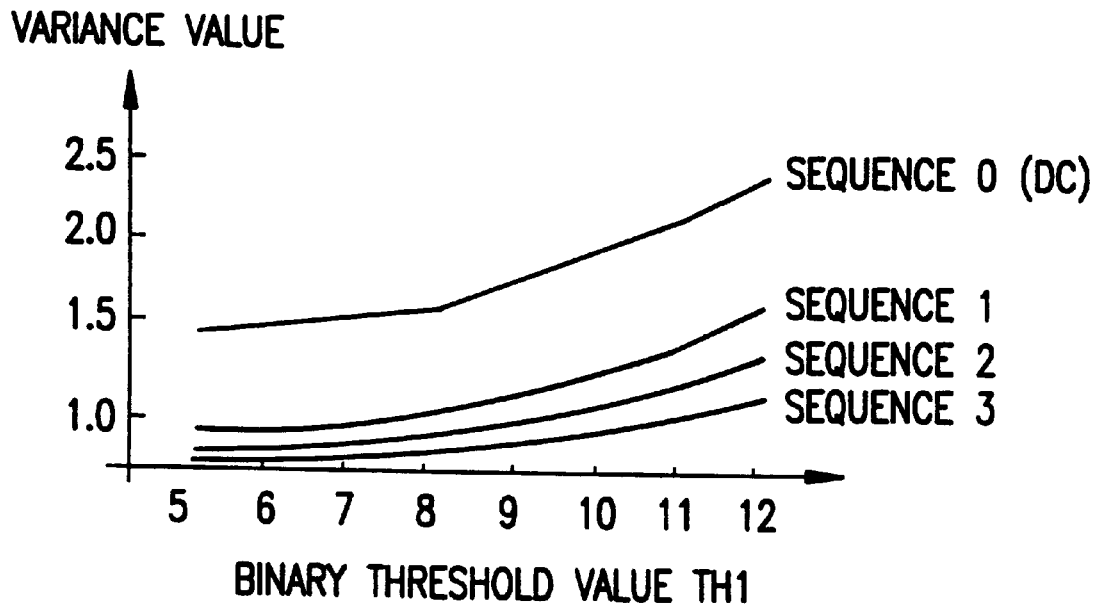
FIG. 20 is a graph showing the relationship between the binary threshold value and the fifth evaluation value obtained in the frequency region (part 1).

FIG. 20 shows the change in the variance value with respect to the image condition (binary threshold values TH1 of 5 to 12) in the low sequences (sequences 0 to 3) in the matrix Y following the Hadamard's transformation (with the size of 1 block being n×m=8×8), and as is clear from this graph, the variance value is larger the larger the smudging of the image is. Accordingly, in this case the variance value in the DC component may be set as the evaluation value considering only this DC component as indicated by method (I) above, and in addition, it is also possible to use the variance value of any of the low sequences other than the DC component (sequences 1 to 3) as the evaluation value. Furthermore, it is also possible to use the sum of the variance values of two or more elements in the low sequences including the DC component (sequences 0 to 3) as the evaluation value.

(III) The evaluation value is set as the sum of the absolute values of each component of the low frequency components (low sequences) in the matrix Y (Y1 to YN) following the Hadamard's transformation.

As can be seen from above-described FIG. 20, the variance value becomes larger the larger the smudging is. The variance value being large means that the width of the distribution of numerical values for each $y_{ij}$ in the matrix Y (Y1 to YN) following the transformation is wide. From this, the variance being large (large smudging) in the low sequences such as in the case of the image when the binary threshold value TH1 is 12, for example, means that the width of the distribution of numerical values is large, and as a result, the sum of the absolute values of each component in the matrix Y (Y1 to YN) following transformation also becomes large. In contrast, the variance values being small in the low sequences (small smudging) means that the width of the distribution of numerical values is small, and as a result the sum of the absolute values of each component in the matrix Y (Y1 to YN) following transformation also becomes small.

Hence, it is possible to extract a characteristic amount relating to "smudging" from the sum of the absolute values of each component in the matrix Y (Y1 to YN) following transformation in the low sequences, and it is also possible to compute the average of these values (the fifth evaluation value). The fifth evaluation value is found from the following formula.

$$\text{Fifth evaluation value} = \sum_{i=0}^{n/2-1} \sum_{j=0}^{n/2-1} \sum |y_{ij}|/N \qquad (16)$$

In this formula (16), division by the number N of blocks is used in order to prevent change in the size of the evaluation value because of the number of blocks (in order to normalize the numerical value). In the above formula (16), it is also possible to use only values in the direction of faintness in order to simplify the process. Here, "the direction of faintness" is used regardless of the fact that this is a formula for computing an evaluation value relating to smudging in order that this coincide with the above-described process of computing "faintness", and in addition so that the determination as to whether or not more smudging is being produced in the direction of ease of smudging can be conducted with ease. Accordingly, when faintness is noticeably produced in the horizontal direction similar to above, the above formula 16 can be expressed as:

$$\text{Fifth evaluation value} = \sum_{j=0}^{n/2-1} \sum |y_{0j}|/N \qquad (17)$$

Figure 21:
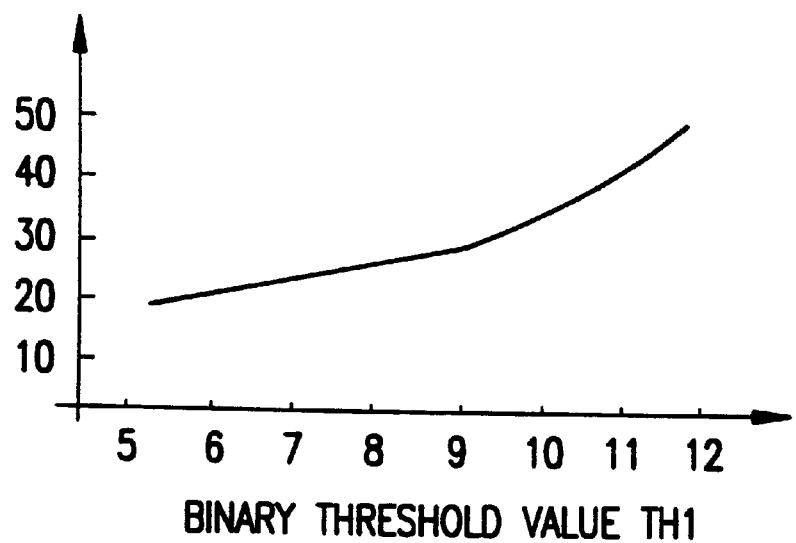
FIG. 21 is a graph showing the relationship between the binary threshold value and the fifth evaluation value obtained in the frequency region (part 2).

FIG. 21 explains the relationship between the above-described binary threshold value TH1 (TH1=5 to 12) and the fifth evaluation value obtained from this formula (17). Here, the size of the division blocks is n×m=8×8, and in addition, the number N of blocks is 3. When the binary threshold value TH1 is 6, the $y_{0j}$ (0≦j≦7) components of matrix Y1 following the transformation in the first block are (14, 6, −5, 2, 1, −2, −2, 1), the $y_{0j}$ (0≦j≦7) components in matrix Y2 following the transformation in the second block are (13, −7, 0,−4, 0, 2, 0, −1), and the $y_{0j}$ (0≦j≦7) components of matrix Y3 following the transformation in the third block are (12, 5, −3, 0, −2, 1, 0, 1).

From formula (17), the sum of the absolute values in the low sequences (sequences 0 to 3) of matrix Y1 following the transformation in the first block is 14+6+5+2=27. By a similar calculation, the sum of the absolute values in the low sequences in matrix Y2 following the transformation in the second block is 24. Furthermore, the sum of the absolute values in the low sequences in matrix Y3 following the transformation in the third block is similarly 20.

Hence, the evaluation value for the case where the binary threshold value TH1 is 6 is, from formula (17), the fifth evaluation value=[(sum of the absolute values of the low sequence components)/(number N of blocks)], and when the above-described numerical values are substituted in, the fifth evaluation value becomes (27+24+20)/3, so that this fifth evaluation value is found to be about 23.7. Because there are in actuality a good number of white sections on the surface of the document on which is drawn the image that is the object of processing, the actual numerical value is a value smaller than the above numerical value, but because no problem at all arises in this description if the above noted numerical value is used as shown, the numerical value that is the result of the above calculations is used as shown to facilitate this description.

Similarly, FIG. 21 is a graph of the evaluation values found using formula (17) for binary threshold values TH1 from 5 to 12. The curve in this FIG. 21 traces out the same curve as in FIG. 8(a).

By thus extracting a characteristic amount in the frequency space as described above, it is possible to compute a fifth evaluation value relating to "smudging."

In formula (16), a fifth evaluation value is computed taking into consideration all elements in the low frequency components, and in addition, in formula (17), a fifth evaluation value is computed taking into consideration all elements in the low frequency components in the direction in which faintness is produced, but the fifth evaluation value may also be computed taking into consideration only one or two or more elements in the low frequency components.

Next, an evaluation value will be computed which takes into consideration both the fourth characteristic amount and the fifth characteristic amount found in the processes above. In other words, a more accurate image quality determination will be conducted by computing an evaluation value which takes into consideration "faintness," which is the fourth characteristic amount, and "smudging," which is the fifth characteristic amount. Among the methods of computing this evaluation value, there is a method wherein the difference of the fourth evaluation value and the fifth evaluation value is found and a method wherein the sum of the fourth evaluation value and the fifth evaluation value is found, but here the description will be for the case wherein the sum of the fourth evaluation value and the fifth evaluation value is found. The evaluation value found from the difference of the fourth evaluation value and the fifth evaluation value will be called evaluation value D, and the evaluation value found from the sum of the fourth evaluation value and the fifth evaluation value will be called evaluation value E. Evaluation value E is computed using the following formula.

Evaluation value E=(Fourth characteristic amount (fourth evaluation value))+(fifth characteristic amount (fifth evaluation value)) (18)

Figure 22:
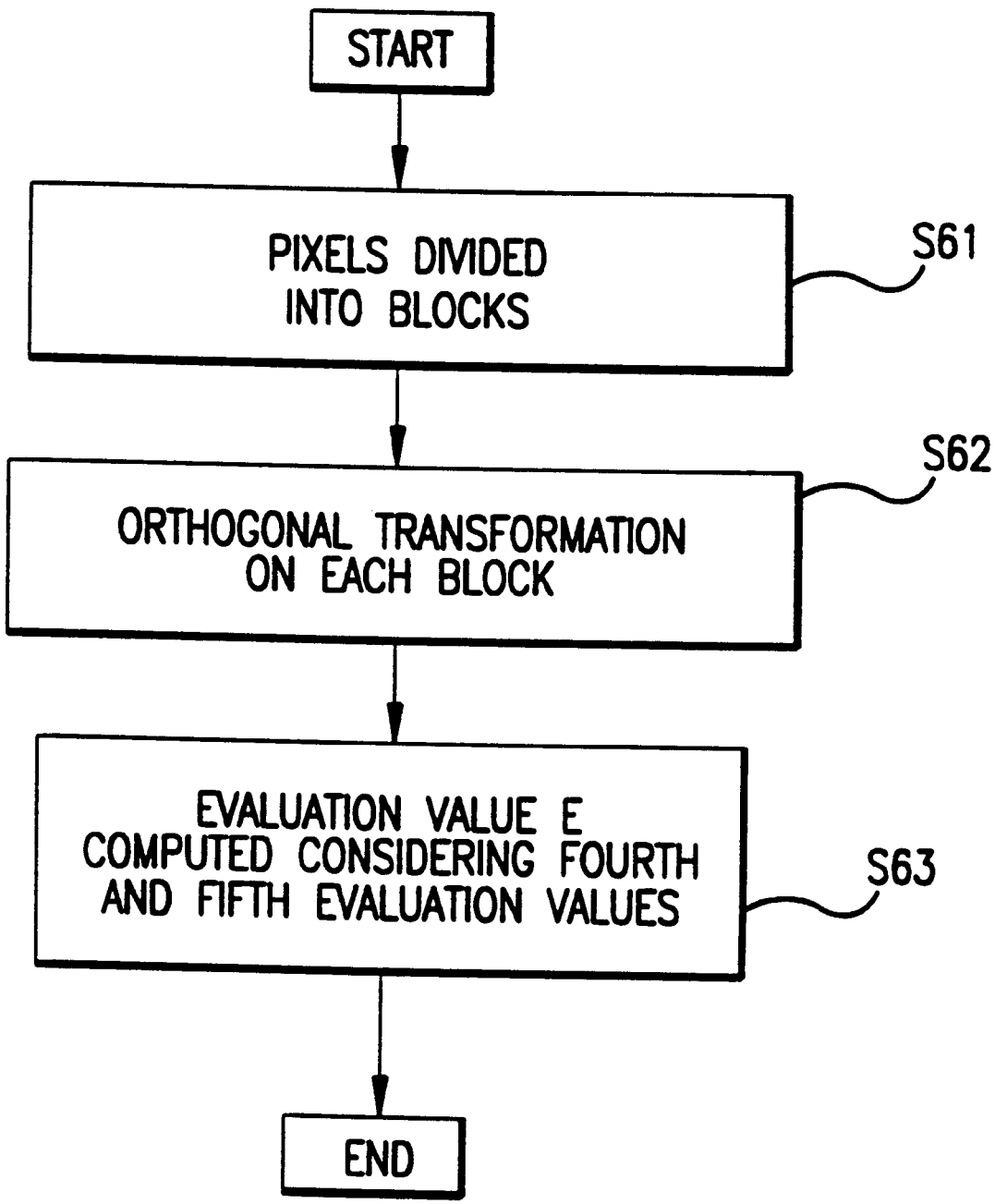
FIG. 22 is a flow chart showing a computation process of the evaluation value D or the evaluation value E based on the fourth evaluation value and the fifth evaluation value for use in the present invention.

FIG. 22 shows a flowchart of the process of computing this evaluation value E. In FIG. 22, first the pixels that are the objects of processing are divided into blocks of size n pixels by m pixels (step S61), and a orthogonal transformation (a Hadamard's transformation in this case) is conducted (step S62) with respect to the divided blocks. Furthermore, the evaluation value E is computed, taking into consideration the above-described fourth evaluation value and fifth evaluation value (step S63).

In conducting computations with the above formula (18), when the absolute values of the two evaluation values differ by a large amount, the effects of the larger absolute value are felt while it is impossible to effectively utilize the evaluation value with the smaller absolute value. For example, as shown in FIG. 23(a)(1)–FIG. 23(b)(3), FIG. 23(a)(1) is a curve (corresponding to FIG. 18) showing faintness while FIG. 23(a)(2) is a curve (corresponding to FIG. 21) showing smudging, and the absolute values of these evaluation values differ greatly. When the two values are added with this kind of large difference between the absolute values of the evaluation values, a curve such as the one shown in FIG. 23(a)(3) results. In other words, over the interval where the binary threshold value TH1 is 5 to 7, faintness is large and the evaluation value should also be a large value, but an irregularity results because the effects of the larger absolute value are felt while it is impossible to effectively utilize the evaluation value with the smaller absolute value.

Accordingly, in this kind of case, a correction of evaluation values is conducted so that the absolute values of each of the evaluation values are equal at some standard binary threshold value (here, TH1=7) and so that the range of change of the two values is also the same. The following example uses the values (see FIG. 18) for the fourth evaluation value obtained from method (II) in the description of the extraction of the fourth characteristic amount, and the values (see FIG. 19) for the fifth evaluation value obtained from method (III) in the description of the extraction of the fifth characteristic amount.

The above-described correction of the evaluation value is conducted as described below. That is to say, the new evaluation value following correction is found from:

(new evaluation value)=({(Maximum of other evaluation value)−(minimum of other evaluation value)}/{(maximum of evaluation value being corrected)−(minimum of evaluation value being corrected)})×((evaluation value)−(standard value of evaluation value being corrected))+(standard value of other evaluation value)    (19)

Here, "evaluation value being corrected" indicates the evaluation value which is being corrected, while "other evaluation value" indicates the evaluation value not being corrected. In addition, standard value refers to the evaluation value at the binary threshold value TH1 which is the standard. For example, in the case shown in FIG. 23(a)(1)–FIG. 23(a)(3), calling the evaluation value for "faintness" shown in FIG. 23(a)(1) the "evaluation value being corrected", and calling the binary threshold value TH1 of 7 the standard, the result is:

(new evaluation value)={(50−20)/(8−4)}×(evaluation value−5)+25

In this formula, when the evaluation value 5 at the binary threshold value of 7 is substituted in as the evaluation value in (evaluation value−5), the new evaluation value that should be found at the binary threshold value TH1 of 7 is found to be 25. In addition, when the evaluation value 8 at the binary threshold value TH1 of 5 is substituted in as the evaluation value in (evaluation value−5), the new evaluation value that is to be found at the binary threshold value TH1 of 5 is found to be 47.5, and in addition, when the evaluation value 4 at the binary threshold value TH1 of 12 is substituted in as the evaluation value in (evaluation value−5), the new evaluation value that is to be found at the binary threshold value TH1 of 12 is found to be 17.5, yielding the curve for the new evaluation value after correction shown in FIG. 23(b)(1).

Accordingly, by adding the values in FIG. 23(b)(1) and FIG. 23(b)(2), the curve for evaluation value E for binary threshold values TH1 of 5 to 12 shown in FIG. 23(b)(3) is obtained. By making this correction on a standard image, it becomes possible to use the other image as shown.

As can be seen from the curve for evaluation value E found in this way by adding the fifth characteristic amount (fifth evaluation value) to the fourth characteristic amount (fourth evaluation value), the binary threshold value TH1 where the image quality is best is the location with the smallest evaluation value, and from this fact it is possible to determine the optimum binary threshold value TH1 upon binary coding by detecting the place where the evaluation value is smallest. Hence, it is possible to conduct determination of the binary threshold value at the time of binary coding of characters with simplicity and moreover with precision.

Next, an evaluation value is obtained which makes the process in the below-described image quality improvement unit more effective, said value obtained by adding one more characteristic amount (the above-described third characteristic amount) to the above-described fourth characteristic amount and fifth characteristic amount. As described above, this third characteristic amount is computed by the third characteristic amount extraction device 113 in FIG. 1, and this characteristic amount is the length in the horizontal direction corresponding to the size of the character.

With the below-described image quality improvement unit, processes which restore missing pixels are primarily conducted, but in this case, the number of missing pixels differs depending on the character size. In other words, large characters have a large number of missing pixels, while small characters have only a small number of missing pixels. Thus, by making a new evaluation value (called evaluation value F) out of the value found using the character size, which is this third characteristic amount, in addition to the above-described fourth and fifth characteristic amounts and evaluation values D and E, it becomes possible to conduct a more effective process in the image quality improvement unit.

This third characteristic amount is an average length of black runs at least as long as a fixed length, and as explained above, this is a value close to the size of the character. The average length of black runs at least as long as a fixed length is the length of the average of "black runs at least as long as a fixed length" used when finding the above-described second characteristic amount. In addition, this evaluation value F can be expressed as follows:

(evaluation value F)=(fourth and fifth evaluation values or evaluation values D and E)×(third characteristic amount)    (20)

Figure 24:
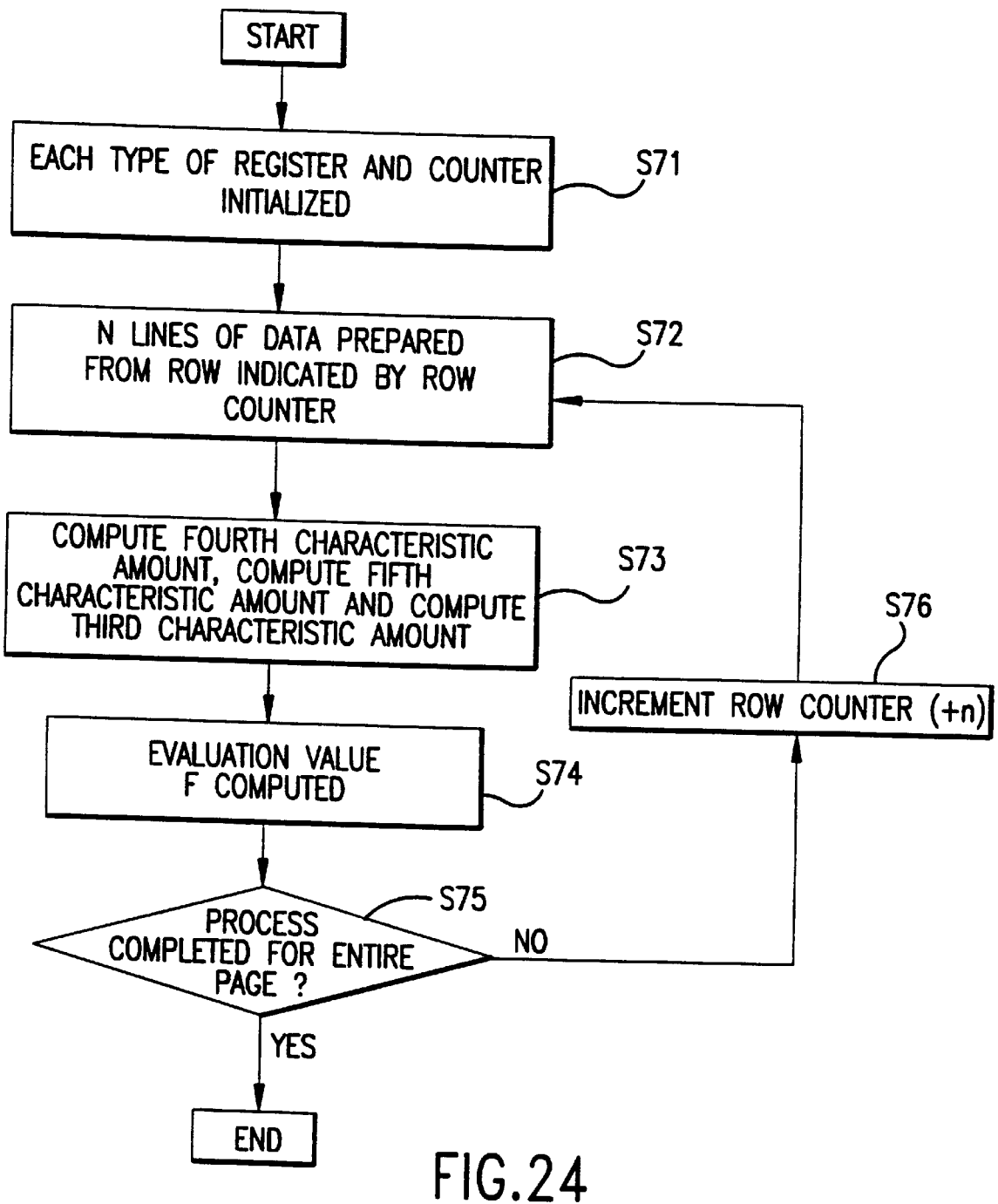
FIG. 24 is a flow chart showing a computation process of the evaluation value F based on the fourth evaluation value, the fifth evaluation, and the third characteristic amount for use in the present invention.

FIG. 24 shows the order of processes in computing this evaluation value F. This FIG. 24 is basically the same as the flowchart shown in FIG. 12. In FIG. 24, first each of the registers and counters are initialized (step S71), similar to the processes shown in the flowchart in FIG. 9. Next, the line data is prepared for n lines from the row indicated by the row counter (step S72) because the orthogonal transformation is conducted on n rows, and the above-described fourth characteristic amount, fifth characteristic amount and third characteristic amount are computed (step S73). Furthermore, each time these fourth, fifth and third characteristic amounts are computed, the evaluation value F is computed using above-described formula (20) (step S74). Next, the determination is made (step S75) as to whether the process of computing evaluation value F has been completed for the entire page of the document that is the object of processing, and if this process has not been completed, the row counter is incremented by n (step S76), and the processes in above-described steps S72 through S75 are conducted again.

In the above processes, each time the processes in step S73 are completed, the evaluation value F is computed in order that this kind of image quality determination process in this image quality computation unit 11 is conducted in parallel with the below-described image quality improvement processes in the image quality improvement unit or the binary threshold value determination processes in the binary threshold value determination unit. However, when the image quality computation process is first conducted as described for the entire page of the document that is the object of processing, following which all of the image quality improvement processes or the binary threshold value determination processes are conducted, in the process flow of FIG. 24 all evaluation values F may be computed after the processes in step S73 have been completed for an entire image. Similarly, computation of the evaluation values in n line data units may also be conducted for the above-described fourth evaluation value and fifth evaluation value or evaluation values D and E, or the evaluation values may be computed for the entire image.

Now, the following four patterns can be considered for this evaluation value F.

(a) (evaluation value F)=(fourth characteristic amount (fourth evaluation value))×(third characteristic amount)

(b) (evaluation value F)=(fifth characteristic amount (fifth evaluation value))×(third characteristic amount)

(c) (evaluation value F)=(evaluation value (evaluation value A) taking the fifth characteristic amount into consideration in addition to the fourth characteristic amount)×(third characteristic amount)

(d) (evaluation value F)=(evaluation value (evaluation value B) taking the fifth characteristic amount into consideration in addition to the fourth characteristic amount)×(third characteristic amount)

The above (a) is called evaluation value F1, (b) is called evaluation value F2, (c) is called evaluation value F3 and (d) is called evaluation value F4.

In this way, by using the third characteristic amount, which is character size, it is possible to more efficiently conduct image quality improvement processes in the below-described image quality improvement unit.

With this embodiment, an example was shown in which the image quality computation unit 11 is provided with a first characteristic amount extraction device 111, a second characteristic amount extraction device 112, a third characteristic amount extraction device 113, a fourth characteristic amount extraction device 114, and a fifth characteristic amount extraction device 115. Furthermore, as noted to this point, each evaluation value was computed, but as the image quality computation unit, it is possible to independently determine image quality relating to "faintness" using either the first characteristic amount extraction device 111 or the fourth characteristic amount extraction device 114, and it is possible to independently determine image quality relating to "smudging" using either the second characteristic amount extraction device 112 or the fifth characteristic amount extraction device 115.

Figure 25A:
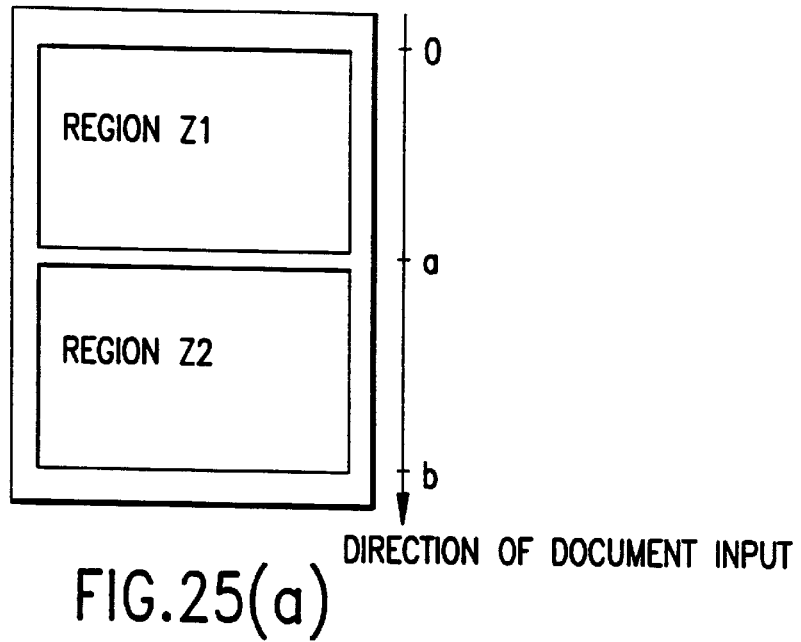
FIG. 25(a) is a drawing of an original document for processing with different regions for imposition of a restriction on the characteristic amount extraction range.

Next, when the image quality computations noted to this point are conducted, processes were described for the case wherein different character regions (e.g., the gothic character region Z1 where deterioration of the characters is difficult to produce, and the Mincho character region Z2 where deterioration is easily produced due to faintness and the like) exist on the surface of the paper that is the object of processing, as shown in FIG. 25(a).

Figure 25B:
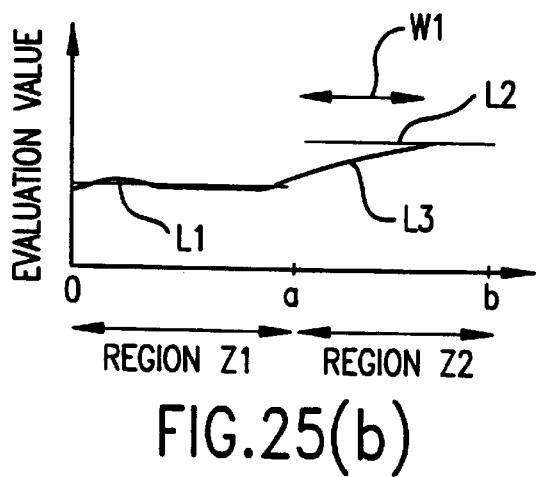
FIG. 25(b) and FIG. 25(c) are graphs of evaluation values related to the different regions based on different restrictions.
Figure 25C:
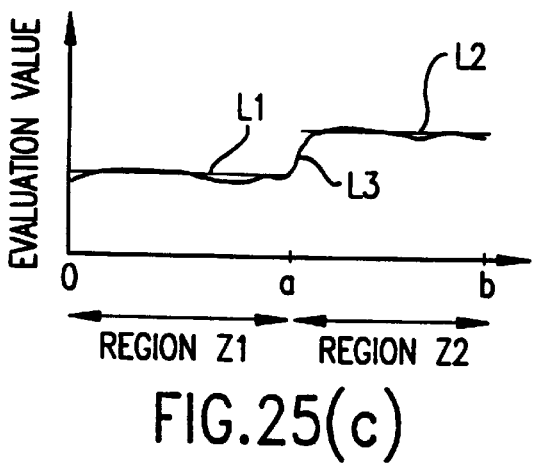

When character regions of different types exist in this manner, in the method whereby data is successively stored when the evaluation values are computed, as noted above, the problem arises that it is impossible to obtain the correct evaluation values in the areas where the regions change. This will be explained using FIGS. 25(b) and 25(c). In FIGS. 25(b) and 25(c), the thick solid line L1 is the ideal evaluation values that should be found in region Z1 and the thick solid line L2 is the ideal evaluation values that should be found in region Z2. As can be seen from FIG. 25(b), in the method whereby the evaluation values are computed by successively storing data, the evaluation values that are actually found are not the correct evaluation values over an interval (the range indicated by w1 in the drawing) where the change is made from region Z1 to region Z2, shown by the thin solid line L3.

Hence with the present invention, a limit is provided to the range over which evaluation values are computed, making it possible to compute the appropriate evaluation values even when character regions of difference types exist. This method is described below.

In images wherein different types of characters exist, changes in character type within a row are rare, and most cases have changes in units of rows. Accordingly, finding the evaluation values in units of a certain number of rows is also possible.

Figure 26:
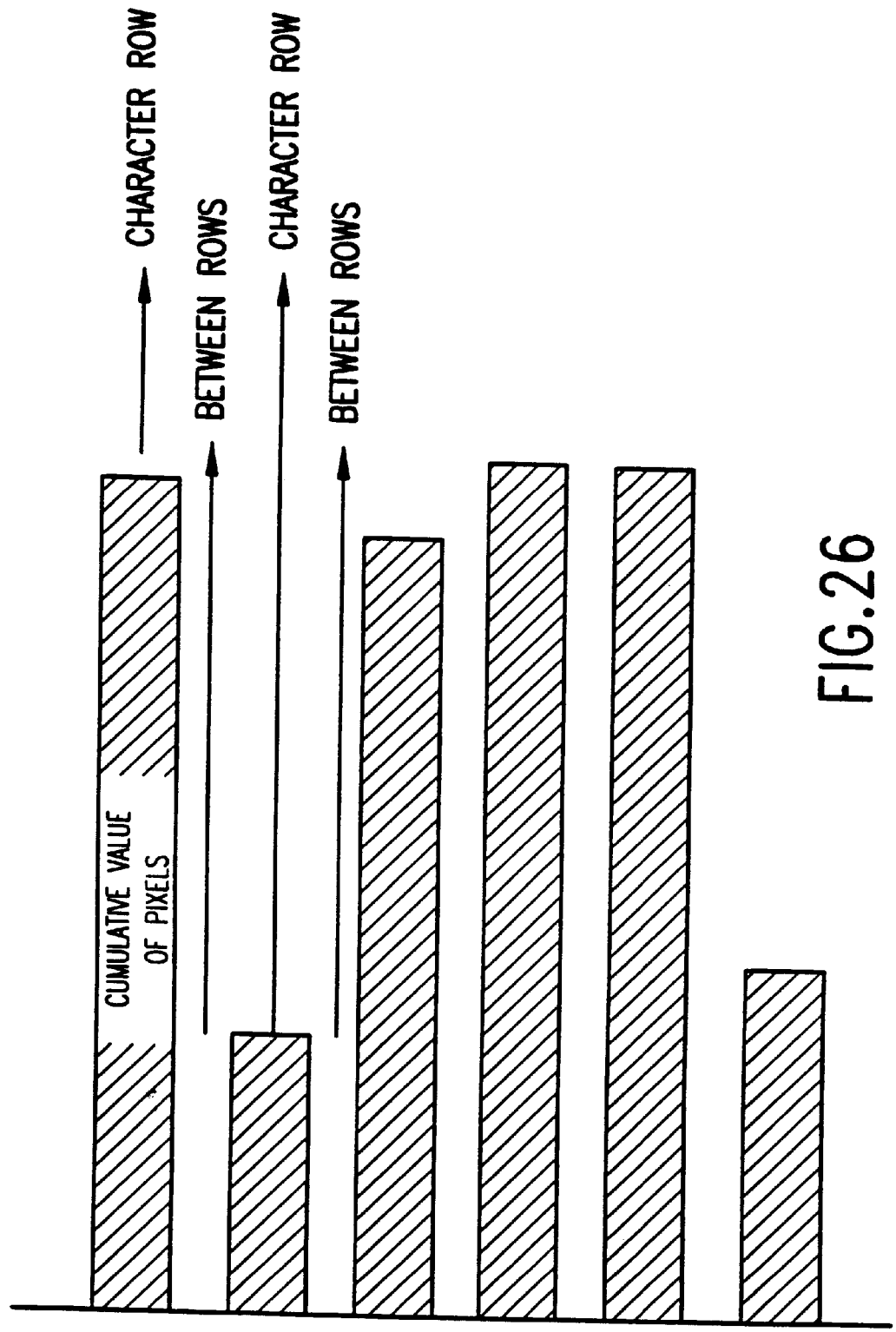
FIG. 26 is a drawing showing an example of the detection of different regions in an original document.

As one example of thus finding the evaluation values in units of a certain number of rows, the case of processing each row will be described. In this case, first one row of text images is cut-out from the image, and evaluation values are found in the range of this cut-out row. As this method of cutting out rows, a method exists whereby a projection which is the cumulative value of the pixels in the row direction is found, and from this projection the determination is made that the valleys are between rows so that the rows are thus cut-out. FIG. 26 shows an example of cumulative values for rows and between rows. As a still simpler method, a method exists wherein at the stage of scanning the image, the absence or presence of pixels is detected and the determination is made that the areas where there are no pixels are between rows, and the rows are thus cut-out. Furthermore, the evaluation values are found in units of cut-out rows with the above-described methods.

In addition, even in cases wherein character regions of differing types exist, another method that enables computation of the appropriate evaluation values is to find the frequency of black and white reversals in the line that is the object of processing, to reverse on lines where this frequency of black and white reversals reaches at least a preset number (the number that is necessary for finding evaluation values is preset), and the evaluation values are found within this range. For example, suppose that the frequency of black and white reversals needed to find the evaluation values is 2000. At the point where the frequency of black and white reversals reached 2000, the evaluation values would be found in the range up to the point where this frequency of black and white reversals reached 2000. With this method, a process of cutting out rows is unnecessary.

By thus providing a limit to the range in which computation of evaluation values is conducted, it becomes possible to find the optimum evaluation values in each of the regions (regions Z1 and Z2 in this case) as shown in FIG. 25(c) by computing the evaluation values in each of the preset ranges. That is to say, the ideal evaluation values (thick solid lines L1 and L2) that should be found in region Z1 and region Z2 and the evaluation values (thin solid line L3) actually found substantially coincide.

The process described here of finding the optimum evaluation values in each region is an important process in the below-described process of improving image quality and process of determination the binary threshold value suitable for an image. That is to say, the evaluations values appropriate for each region out of these regions (for each type of character) becomes important in the process of improving image quality and the process of determination the binary threshold value suitable for an image.

Next, as a second aspect of the present invention, an image processing device will be described which is equipped with an image quality improvement unit (details of which are given hereinafter) that improves image quality using the results of the image quality computation unit 11 described with respect to the above first aspect of the present invention.

Figure 27:
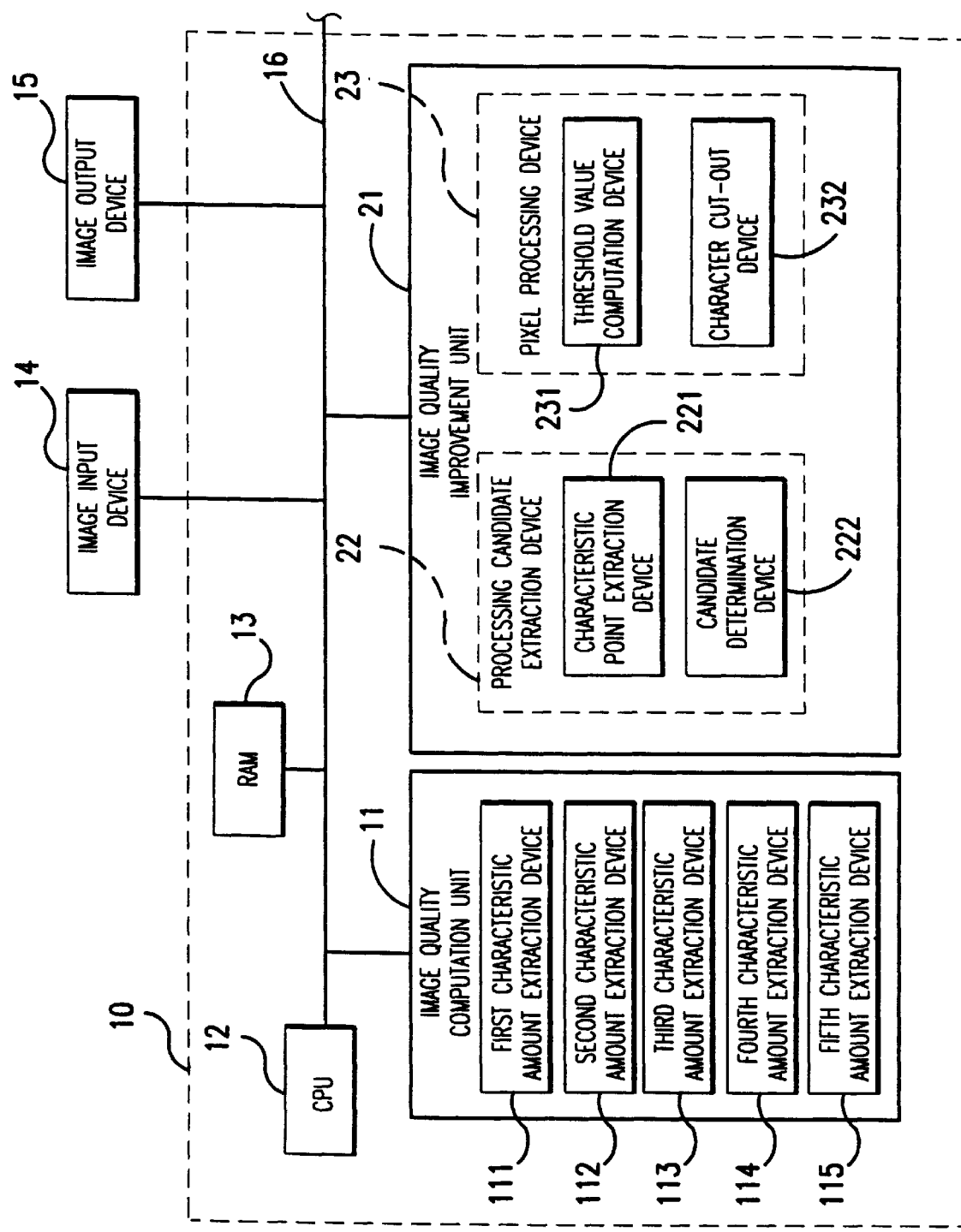
FIG. 27 is a block diagram including a second aspect of the present invention with the first aspect of the present invention.

FIG. 27 shows the composition of this second aspect of the present invention, and herein the image quality computation unit 11, the CPU 12, the RAM 13, the image input device 14, the image output device 15 and the bus line 16 are the same as explained in FIG. 1, and in this FIG. 27, in addition to these components an image quality improvement unit 21 is also connected to the above-described bus line 16.

This image quality improvement unit 21 extracts sections where there is a possibility of pixels missing, and conducts an interpolation on this section with pixels missing using the evaluation values computed by the above-described image quality computation unit 11. Consequently, this image quality improvement unit 21 has a processing candidate extraction device 22 and a pixel processing device 23 as the major elements. Hereinafter, this processing candidate extraction device 22 and pixel processing device 23 will be described.

The processing candidate extraction device 22 extracts sections where there is a possibility of pixels missing, and consequently includes a characteristic point extraction device 221 and a candidate determination device 222. In addition, the pixel processing device 23 conducts an interpolation of pixels on the sections where there is a possibility of pixels missing, said sections having been extracted by the processing candidate extraction device 22 and said interpolation conducted using each evaluation value computed by the above-described image quality computation unit 11. Consequently, this pixel processing device has a threshold value computation device 231 and a character cut-out device 232. Each of these components is described hereinafter.

The characteristic point extraction device 221 extracts the trace of the sections in which image quality has deteriorated. That is to say, as can be seen from FIG. 2(b), the sections where faintness is produced are where pixels from one pixel to two pixels (or three pixels) lined up in the vertical direction are convex in the horizontal direction. It is these kinds of sections that are extracted. Specifically, at this time characteristic points having the six types of patterns shown in FIGS. 3(a)–FIG. 3(f) are extracted.

The candidate determination device 222 performs determination of the deteriorated sections from the positional relationship of the characteristic points extracted by the above-described characteristic point extraction device 221. As can be seen from FIG. 2(b), the sections where image quality has deteriorated are primarily sections where the characteristic points oppose each other (face each other), such as section A in FIG. 2(b). However, some sections where characteristic points and black pixels that are not characteristic points oppose each other, such as in section B. Thus this candidate determination device 222 extracts these kinds of sections, and determines that said sections are sections with a possibility of image quality deterioration.

The combination of characteristic points of a deteriorated section is set as described below. However, this is intended to be illustrative and not limiting.

(1) Three pixel characteristic points mutually facing each other (e.g., FIG. 3(e) and FIG. 3(f)).
(2) Three pixel characteristic points and two pixel characteristic points facing each other (e.g. FIG. 3(c) and FIG. 3(f)).
(3) Three pixel characteristic points and one pixel characteristic point(s) facing each other (e.g. FIG. 3(a) and FIG. 3(f)).
(4) Two pixel characteristic points mutually facing each other (e.g., FIG. 3(c) and FIG. 3(d)).
(5) Two pixel characteristic points and one pixel characteristic point(s) facing each other (e.g. FIG. 3(a) and FIG. 3(d)).
(6) One pixel characteristic points mutually facing each other (e.g., FIG. 3(a) and FIG. 3(b)).
(7) Three pixel characteristic points and black pixels other than characteristic points facing each other.
(8) Two pixel characteristic points and black pixels other than characteristic points facing each other.
(9) One pixel characteristic point(s) and black pixels other than characteristic points facing each other.

In these kinds of combinations, in the cases from (2) to (6) where characteristic points mutually face each other, as a first condition pixel interpolation can be considered necessary (processing candidate) if even some of the characteristic points are facing each other, but even when characteristic points mutually face each other, in case (1) where three characteristic points mutually face each other, as a second condition pixel interpolation can be considered necessary (processing candidate) only when two or more pixels face each other. This relationship is shown in FIG. 28. FIG. 28(a) shows a case where the above-described first condition is satisfied, and this is case (2) where three pixel characteristic points and two pixel characteristic points face each other, this example being one in which one pixel of each face each other. In addition, FIG. 28(b) shows a case where the above-described second condition is satisfied, and this is case (1) where three pixel characteristic points mutually face each other, this example being one in which two pixels of each face each other. In addition, FIG. 28(c) is case (1) where three pixel characteristic points mutually face each other, but in this case two or more pixels do not face each other, so condition 2 is determined to not be satisfied.

In addition, in FIG. 28(a)–FIG. 28(c) pixel interpolation is conducted on the interval between facing pixels when the space between said facing pixels (indicated in the drawing by arrows) is a spacing within a preset number of pixels. In other words, the determination is made as to how many white pixels there are between the facing pixels (black pixels), the threshold value of these white pixels is established, this white pixel section is considered to be "faintness" when the this value is below the threshold value, and thus black pixels are interpolated into this section. A detailed description of this is given hereinafter.

Next, the process will be described whereby interpolation of pixels is conducted in the above-described pixel processing device 23 on sections with pixels missing, said process performed using each evaluation value computed by the above-described image quality computation unit 11.

This pixel processing device 23 has a threshold value computation device 231 and a character cut-out device 232. This threshold value computation device 231 computes the threshold value at the time pixel interpolation is conducted (this threshold value will be called threshold value TH3) using each evaluation value computed by the above-described image quality computation unit 11 as variables. This threshold value computation device 231 is described hereinafter.

The sections which have been determined to be deteriorated sections by the candidate determination device 222 in the processing candidate extraction device 22 have a space (white pixels) several pixels wide between black pixels, such as sections A and B in FIG. 2(b). In addition, comparing FIG. 41(b) and FIG. 41(c) used in the paragraphs describing related art, this space is wider the larger the deterioration of the image quality. Hence, the space in the deteriorated section can be considered to be wider the larger the deterioration of image quality, and the threshold value TH3 is established as an index of the size of space up to which pixel interpolation is conducted. That is to say, when image quality is good, pixel interpolation is conducted even over sections without pixels in the original when the process of conducting interpolation on the white pixel sections is performed. Hence, the threshold value TH3 which agrees with image quality is computed in the threshold value computation device 231 in order to prevent this kind of erroneous process.

The method of computing this threshold value TH3 in this threshold value computation device 231 is described hereinafter.

The computation of threshold value TH3 is conducted for each of the 9 combinations of deteriorated sections indicated in above-described cases (1) to (9). The reason for this is that a most suitable threshold value exists for each combination indicated by above-described (1) to (9) depending on the combination. Thus, threshold value TH3 is computed with the formula below.

$$\text{Threshold value TH3}(n)=f(n)\ (x) \quad (21)$$

Here, n takes on the values $1 \leq n \leq 9$, and these numerical values from 1 to 9 indicate the number inside the parentheses for the nine combinations of deteriorated sections indicated by (1) to (9) above. In addition, f(n) (x) is a function (the method of creation of which is described below) used to compute different threshold values for each combination, with x being a variable. This variable x is in this case the evaluation value. Accordingly, the above formula 21 can be expressed as:

$$\text{Threshold value TH3}(n)=f(n)\ (\text{evaluation value}) \quad (22)$$

Here, evaluation value means each kind of evaluation value found by the image quality computation unit 11. In this way, a threshold value TH3 corresponding to each individual combination is established through the nine combinations of deteriorated sections indicated by (1) to (9). Furthermore, if the space in sections found by the candidate determination device 222 which have a possibility of image deterioration is no greater than the threshold value TH3(n) found from formula (22), pixel interpolation is performed on these sections by the pixel processing device 21, while if this space is larger than the threshold value TH3(n) found from formula (22), pixel interpolation is not performed.

However, the function used to compute the above-described threshold value TH3 performs computations as described below. Here, three types of images, namely, the original undeteriorated image such as shown in FIG. 29(*a*), an image in which image quality has deteriorated somewhat such as shown in FIG. 29(*b*), and an unrepresented image in which image quality has deteriorated further—are prepared as standard images.

Figure 29A:
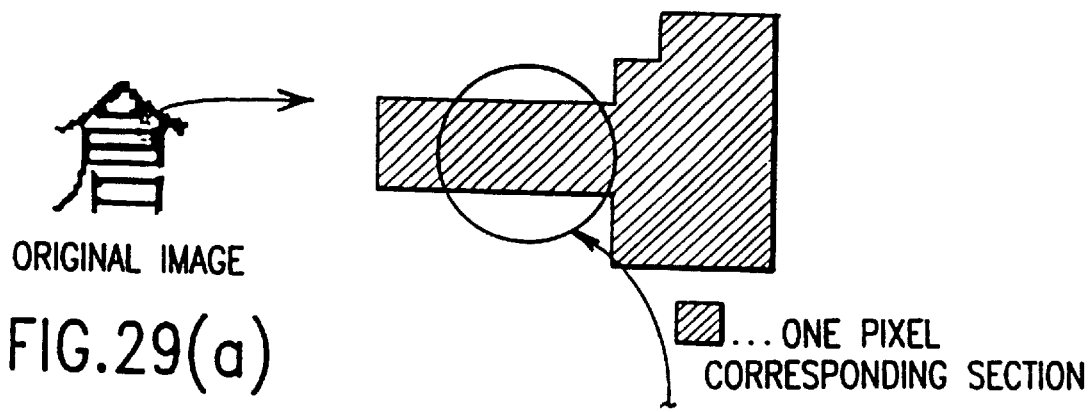
FIG. 29(a) and FIG. 29(b) are views, including enlarged views of a portion, of the Chinese character "kura" related to showing deterioration of the image.
Figure 29B:
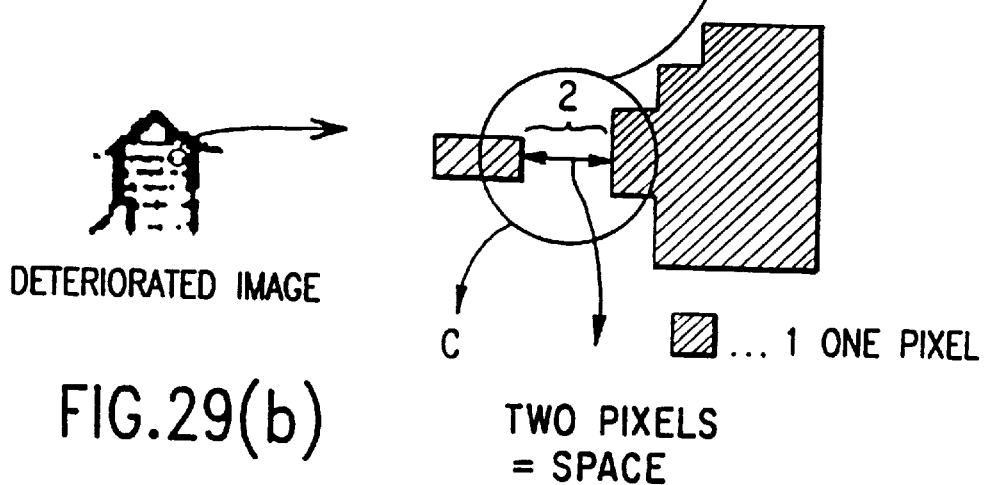

In the image in which image quality has deteriorated somewhat such as is shown in FIG. 29(*b*), extraction of the sections where image quality is thought to have deteriorated (the section indicated by C in the drawing) is performed by the candidate determination device 222. In addition, along with finding the type of combination of the characteristic points in the extracted section and the space between pixels, the determination is made as to whether the section where image quality is thought to have deteriorated is a section that has actually deteriorated by comparing such with the original image. Here, the type of combination of the characteristic points of the section indicated by C in the drawing is type (5) because two pixel characteristic points and one pixel characteristic points are facing each other, and in addition, the spacing in this case is two pixels.

Figure 30:
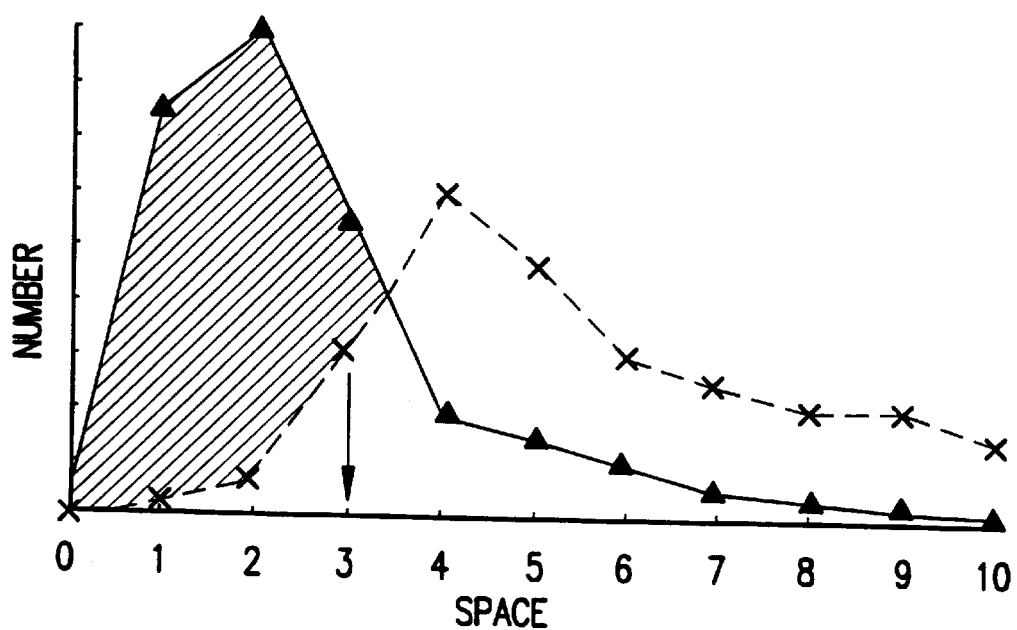
FIG. 30 is a graph indicating whether an interval between the pixels and the corresponding section is an empty space due to deterioration or is initially empty.

This information is found for the entire image that is the object of processing, and as shown in FIG. 29(*b*) all of the section wherein the image quality has deteriorated somewhat and two pixel characteristic points and one pixel characteristic points are facing each other (the above-described combination (5)) is cut-out, and the relationship between the spacing in this deteriorated section is shown in FIG. 30 along with the results of determining whether or not this deteriorated section is actually a deteriorated section by comparing such with the original image.

The graph in this FIG. 30 has on the horizontal axis the spacing (number of pixels) of separation in the deteriorated section on the horizontal axis, and on the vertical axis has the number of correct answers where a correct answer is the case wherein the section is actually a deteriorated section as the result of determining whether the section is actually a deteriorated section by comparing such with the original image, and has the number of incorrect answers where an incorrect answer is the case wherein the section is not a deteriorated section as the result of determining whether or not the section is actually a deteriorated section by comparing such with the original image, said section thus being an original white pixel section. In FIG. 30, the item indicated by the solid line shows the number of correct answers, and the item indicated by the dotted line shows the number of incorrect answers.

From the graph it can be seen that correct answers (deteriorated sections) are more prevalent up to a spacing of three pixels, while incorrect answers (originally white pixel sections) are more prevalent when the spacing becomes 4 pixels (in FIG. 30, the shaded area is the section where the number of correct answers is larger.) Accordingly, in this case threshold value TH3(5) is 3. That is to say, in above-described combination (5), the section is considered a deteriorated section up to a spacing of 3, indicating that no problems will arise if this space is interpolated. Conversely, when the spacing is 4 or greater, the determination is made that this is a space which existed originally, indicating that it is better to not perform the interpolation process.

Similarly, suppose that the threshold value TH3(5) is 6 as a result of finding a graph showing the spacing in deteriorated sections in the case where two pixel characteristic points and one pixel characteristic points face each other in further deteriorated images, and showing the results of determining whether this deteriorated section is actually a deteriorated section by comparing such with the original image.

In addition, suppose that the evaluation value of the somewhat deteriorated image shown in FIG. 29(*b*) (any of the several evaluation values computed with the first aspect of the present invention may be used) is 0.49, and further suppose that the evaluation value of the further deteriorated image (here also, any of the several evaluation values computed with the first aspect of the present invention may be used) is 0.99.

Now suppose that the above-described function f(n) (evaluation value) is, for example, expressed as a first degree function of the type ax+b. Because in this case the variable x is the evaluation value, the result is:

$$\text{Threshold value TH3}(n)=a \times \text{evaluation value}+b \quad (23)$$

In this case, because n=5, the result is:

$$\text{Threshold value TH3}(5)=a \times \text{evaluation value}+b \quad (24)$$

Finding a and b by substituting into this formula 24 the threshold value TH3(5)=3 and evaluation value 0.49 and the threshold value TH3(5)=6 and evaluation value 0.99, said values found as described above, it is found that a=6 and b=0.06, so that the function in the case "(5) Two pixel characteristic point and one pixel characteristic point facing each other" in the image that is the object of processing is determined. In this way, the functions are determined for each of the types of combinations from (1) to (9).

Figure 31:
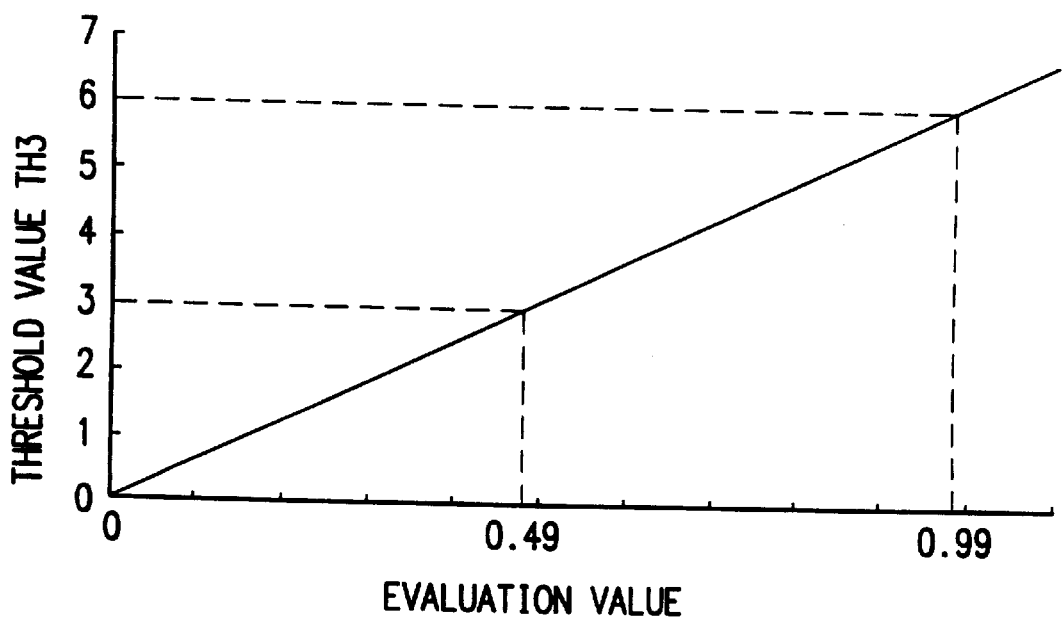
FIG. 31 is a graph showing an example for aiding in obtaining a threshold value TH3 using a function having evaluation values as variables.

In this way, the functions are set for each of the types of combinations from (1) to (9). That is to say, in this case a line is obtained with the evaluation value as the variable, such as in FIG. 31, and through this the other threshold value(s) TH3(n) are found.

Because the threshold value is an integer, it is also possible to use a value which has been made into an integer value through rounding off the part after the decimal in the value found from the above-described function. Furthermore, the determination as to whether or not to interpolate pixels is made from the relationship between the detected spacing and this threshold value TH3. That is to say, interpolation of pixels is performed on a detected spacing if this spacing is no greater than the threshold value TH3, and interpolation of pixels is not performed on a detected spacing if this spacing is larger than the threshold value TH3 because such a space is considered to be originally white.

Figure 32:
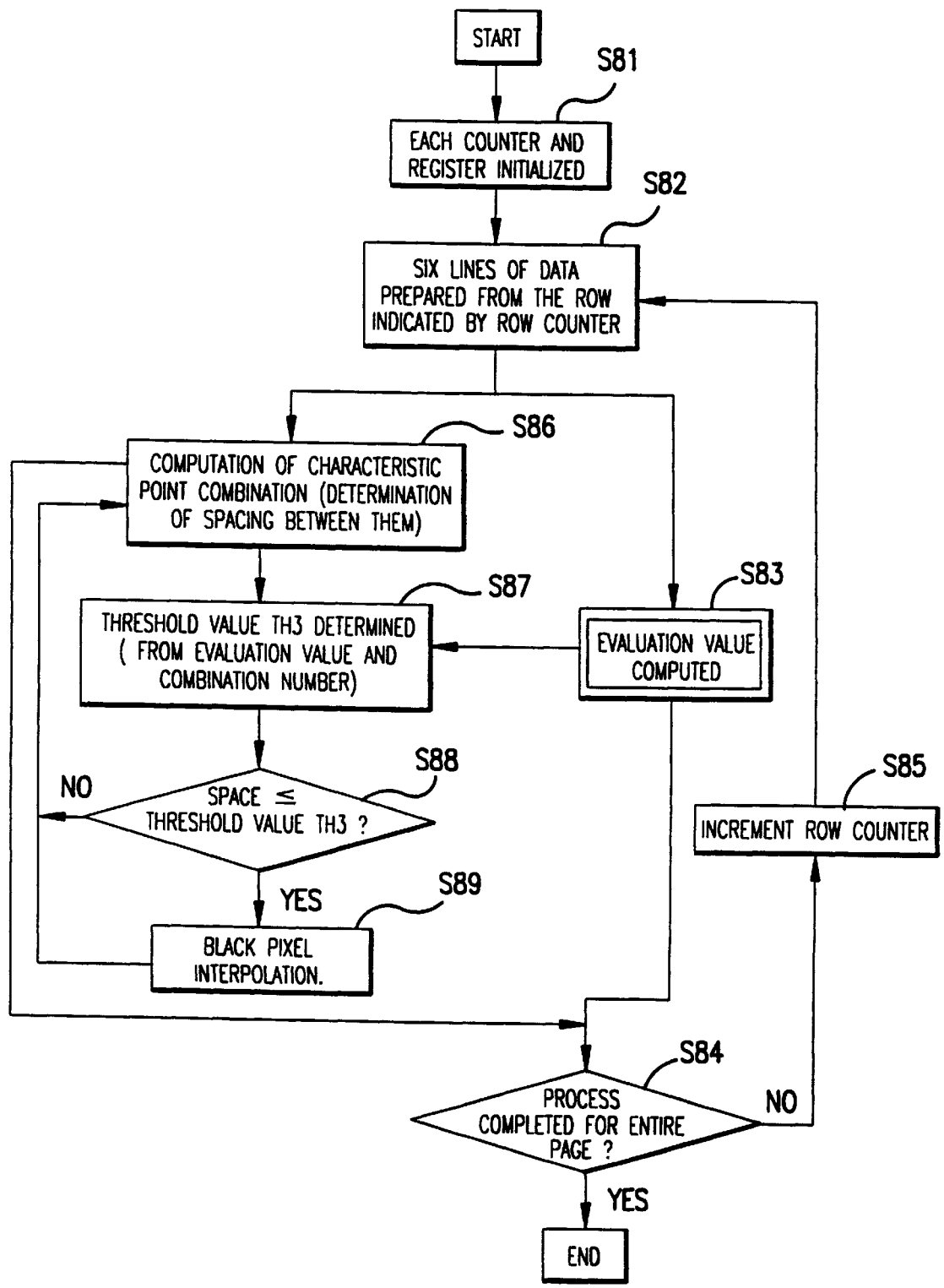
FIG. 32 is a flow chart showing the overall processing with the first and second aspects of the present invention.

FIG. 32 shows the flowchart for the above process.

In FIG. 32, each type of counter and register are first initialized (step S81). This process is the same as in step S11 of the flowchart in FIG. 7. Next, six lines of data are prepared starting with the row indicated by the row counter (step S82). In this case, when three pixel characteristic points mutually facing each other as shown in FIG. 28, at least six lines of data are necessary in order to determine whether or not condition 2, which requires at least two of these pixels on each side to be facing each other, has been satisfied.

Furthermore, computation of each evaluation value is performed on each line as described in the first aspect of the present invention above. The series of processes from step S81 to step S85 is similar to the process flowchart in FIG. 12.

On the other hand, an image improvement process is performed in parallel with the process in step S83. That is to say, detection of the characteristic point combination in (1) to (9) above is conducted, and the determination of the spacing is also conducted (step S86). Then, the threshold value TH3(n) is found from the number of the characteristic point combination from (1) to (9) above and the evaluation values (step S87), and this threshold value TH3(n) and the spacing detected in step S86 are compared (step S88) and an interpolation of pixels is performed if the threshold value TH3(n) is at least as great as the spacing (step S89).

Figure 33:
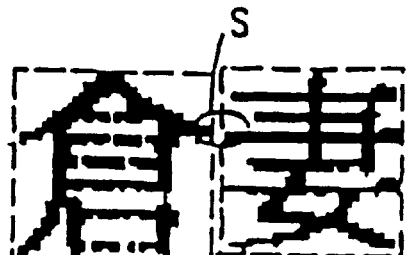
FIG. 33 is a drawing showing an example of adjacent characters illustrating the execution of the pixel interpolation process after the process of character cut-out.

The reason a character cut-out device 232 is provided in the pixel processing device 23 of the image quality improvement unit 21 described in FIG. 27 is to try to perform the interpolation process after extracting characters one at a time because there are cases wherein erroneous pixel interpolation processes are conducted between adjacent characters, for example, such as is shown in FIG. 33. In other words, as shown in FIG. 33, where there is a section s where adjacent characters are extremely close to each other, there is the possibility that this section s could be determined to be a section where pixel interpolation is necessary and an erroneous process could be performed, so in order to prevent this the characters are cut-out one character at a time, and the interpolation process is conducted within the range of the cut-out character. Through this, prevention of erroneous pixel interpolation processes between adjacent characters can be achieved.

FIG. 34(a)(I)–FIG. 34(b)(III) show concrete examples of images restored using the above-described image restoration process. FIG. 34(a)(I) is the image shown in FIG. 41(b) which has been copied once, while FIG. 34(b)(I) is the image shown in FIG. 41(c) which has been copied twice. By employing the above-described processes on these images, the images become such that the "faintness" sections are substantially restored, as shown in FIG. 34(a)(II) and FIG. 34(b)(II). In addition, when a process that eliminates unevenness in the image (a smoothing process) is also employed in addition to the above processes, an image which appears even better results, as shown in 1.

When these kinds of processes are employed, the recognition rate in the character recognition device is improved, in the case of the image that has been copied once as shown in FIG. 34(a) (I–III), from 93.4% for the image in FIG. 34(a)(I) to 97.1% for the image in FIG. 34(a)(II), and in addition, is improved in the case of the image which has been copied twice as shown in FIG. 34(b) (I–III), from 82.3% for the image in FIG. 34(b)(I) to 93.1% for the image in FIG. 34(b)(II).

In this way, by determining the threshold value TH3 in accordance with the image quality, pixel interpolation is performed on a detected space when said space is smaller than this threshold value, and pixel interpolation is not performed on a detected space when this space is larger than the threshold value and therefore considered to originally be white space. Consequently, it is possible to prevent erroneous processes which perform pixel interpolation even on sections without pixels, and it becomes possible to accurately conduct restoration processes only on sections deteriorated by faintness or the like.

Accordingly, when this image improvement device is applied to digital copiers and character recognition devices and the like, the results are dramatic. In particular, the results are even more noticeable in digital copiers. That is to say, a digital copier is a device used to faithfully reproduce an image, and if the original document is faint, a copy is produced which is also faint. However, by applying the image processing device of the present invention, it becomes possible to perform an image quality improvement process according to quality when it is determined that the image quality is poor. In other words, because a copy is produced in which the faint sections have been restored (through pixel interpolation or the like) when the original document is faint, a duplicate document is obtained in which the quality is better than in the original document. In addition, because the processes are performed while making determinations about image quality, extra processes are not added to documents with good image quality, so that there are no ill effects of such. Furthermore, even in character recognition devices, by determining the image quality prior to the character recognition process and then conducting image quality improvement processes in accordance with quality when it is determined that image quality is poor, it is possible to greatly increase the character recognition rate.

In this second aspect of the present invention, the evaluation values used as variables in finding this threshold value TH3 can be any of the various evaluation values computed in the above-described first aspect of the present invention. That is, the evaluation values can be evaluation values C1 to C4 which are found by multiplying the third characteristic amount by the first evaluation value which is the first characteristic amount, the second evaluation value which is the second characteristic amount, and evaluation values which taken into consideration the first characteristic amount and the second characteristic amount (e.g. evaluation value A which is found by subtracting the second characteristic amount from the first characteristic amount, or evaluation value B which is found by adding the second characteristic amount to the first characteristic amount); or evaluation values F1 to F4 which are found by the third characteristic amount by the fourth evaluation value which is the fourth characteristic amount, the fifth evaluation value which is the fifth characteristic amount, or evaluation values which take into consideration the fourth characteristic amount and the fifth characteristic amount (e.g. evaluation value D which is found by subtracting the fifth characteristic amount from the fourth characteristic amount, or evaluation value E which is found by adding the fifth characteristic amount to the fourth characteristic amount). However, better results are obtained by using either evaluation values C1 to C4 or evaluation values F1 to F4.

In addition, with this second aspect of the present invention, the function in formula (22) used to find threshold value TH3 was illustrated as a first degree function, but it is possible to use an n-degree function, for example, by preparing a plurality of deteriorated images. Furthermore, in order to simplify the process, the function in formula (22) can be a fixed value instead of a function using the evaluation value as a variable.

Next, devices for determining the optimum binary threshold value suitable for the character image are described as a third aspect of the present invention.

A multitude of methods have been proposed from before as methods of binary coding, but these conventional methods cannot necessarily be said to be binary coding methods which are suitable for character images. In other words, there are cases where faintness and smudging are produced after binary coding. Hence, with the present aspect of the present invention, a method is described for determining the binary threshold value using the evaluation values found by the above-described image quality computation unit 11.

Figure 35:
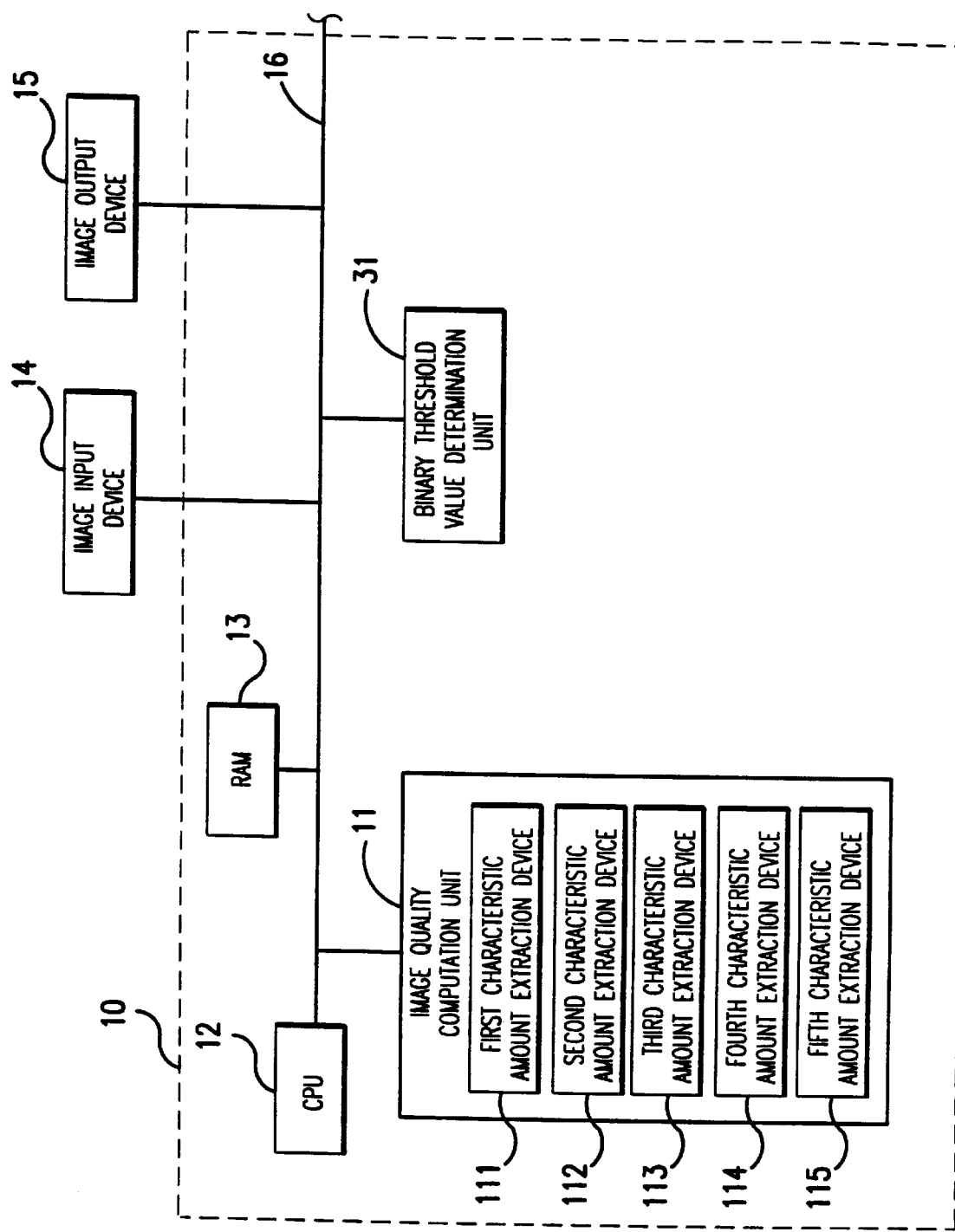
FIG. 35 is a block diagram including a third aspect of the present invention with the first aspect of the present invention.

FIG. 35 is a block diagram showing the structure of this third aspect of the present invention with the first aspect of the present invention. This structure is similar to the structure shown in FIG. 1 in which a binary threshold value determination unit 31 has been provided.

Figure 36:
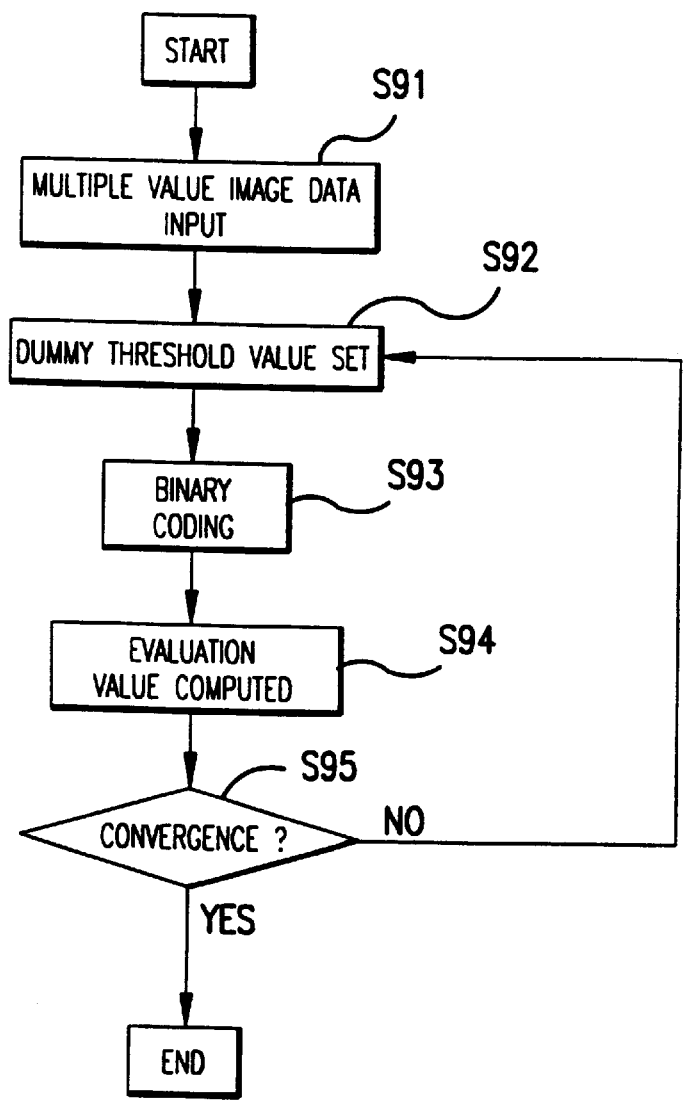
FIG. 36 is a flow chart showing the overall processing with the first and third aspects of the present invention.

The contents of the processes of this binary threshold value determination unit 31 are described below with reference to the flowchart in FIG. 36.

First, the image that is the object of processing is input as multiple values (step S91). Here, it is supposed that the input is in 16 gradations, with 0 being the white gradation and 15 being the black gradation. Next, a dummy binary threshold value for binary coding is determined (step S92). The central value in the 16 gradations is 7 or 8, and here, let it be supposed that the determination range of the dummy binary threshold value is changeable within the range of gradations from 5 to 11, and suppose that the initial value of the dummy binary threshold value is 8. The reason the determination range of the dummy binary threshold value is taken to be from 5 to 11 is because in general threshold values suitable for binary coding exist in this range in the case of 16 gradation input.

Figure 37:
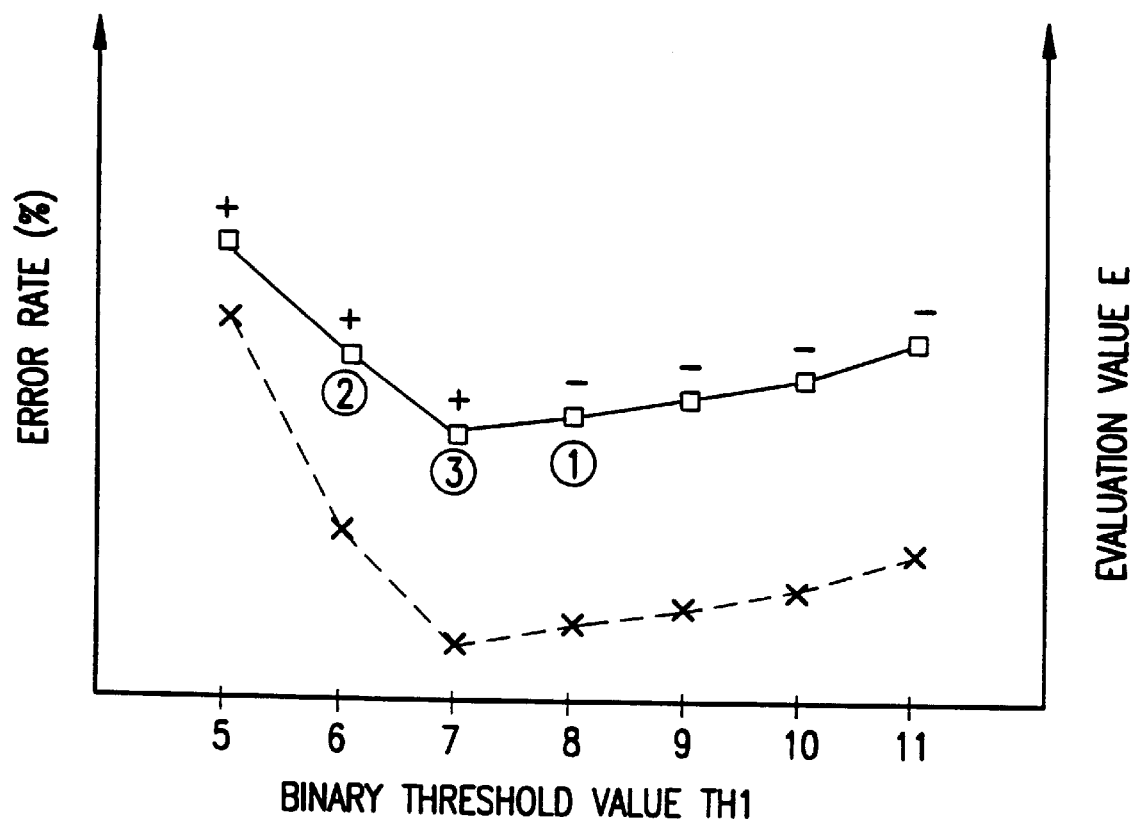
FIG. 37 is a graph of a binary threshold value versus error rate and evaluation value E.

Furthermore, binary coding is performed using this dummy binary threshold value which has been determined in this manner (step S93). After this binary coding process, computation of the evaluation value(s) is conducted (step S94). Any of the above-described methods may be used here as the method of computing the evaluation value, but here the description will be provided for an example that uses the evaluation value (evaluation value E) found by adding the fifth characteristic amount to the fourth characteristic amount as described in FIG. 23. In this case, the place where the evaluation value E is a minimum is the place where the best image quality is obtained, as has been noted above. Accordingly, it is preferable to set the place where this evaluation value E is a minimum as the binary threshold value. Below, the determination of a threshold value wherein the evaluation value E becomes a minimum is described. FIG. 37 is a graph showing the relationship between the binary threshold value TH1 of the image that is the object of processing and the error rate (indicated by the dotted line) and the evaluation value E (indicated by the solid line), where the evaluation value E is a value found by adding the fifth characteristic amount to the fourth characteristic amount. In this FIG. 37, the "+" symbols attached to the solid line which indicates the evaluation value E indicate that the value of "faintness" is at least as great as the value for "smudging", while the "−" symbols attached to the line indicates all other states. The order of processes is described below with reference to FIG. 38.

Figure 38:
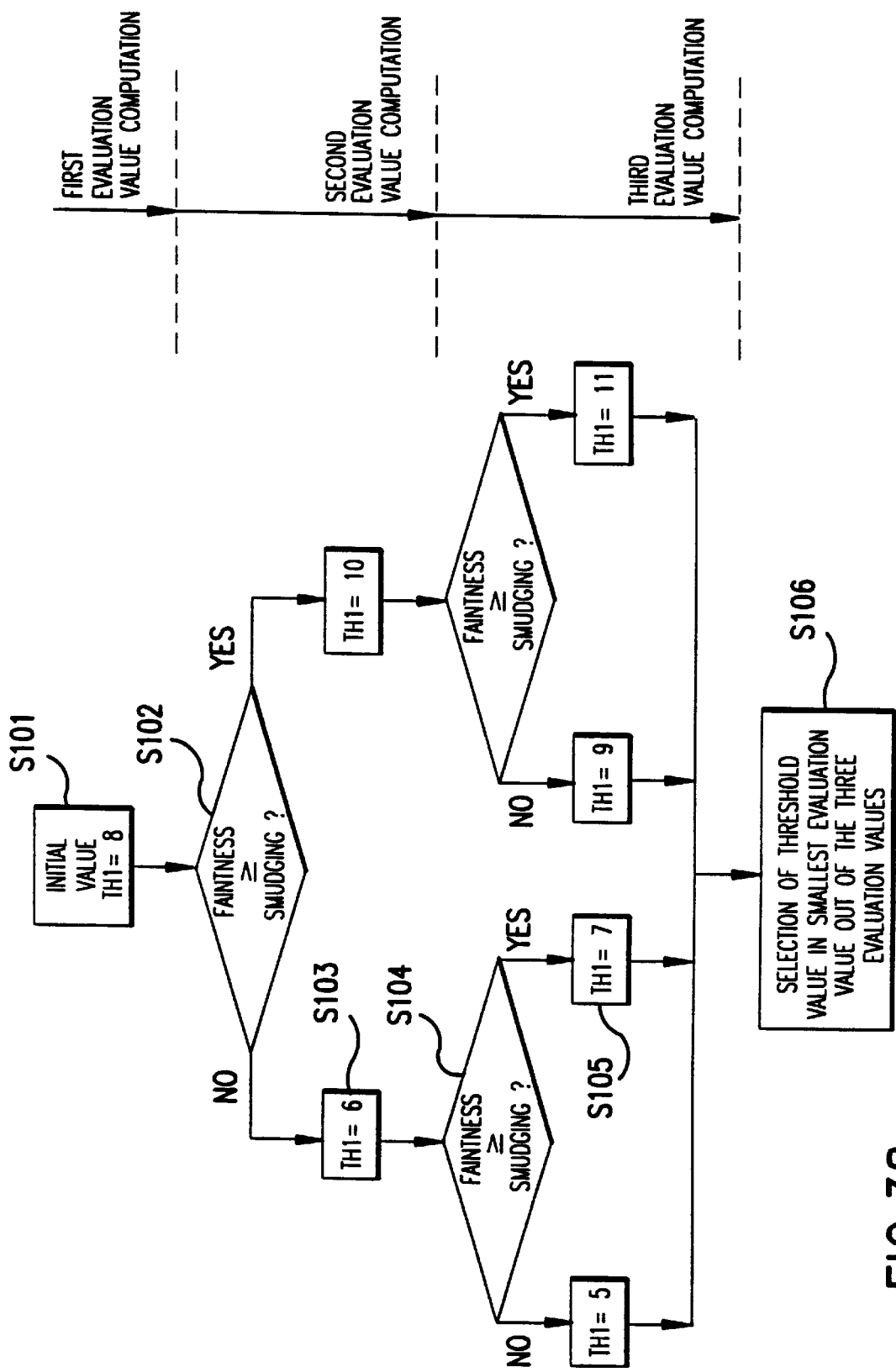
FIG. 38 is a flow chart of a binary threshold value determination process.

In FIG. 38, first the initial value of the dummy binary threshold value TH1 is set to 8 (step S101), following which the evaluation value is found at an initial value of 8 for this binary threshold value TH1, and the determination is made as to the size of the faintness and smudging at this time, i.e., the determination is made as to whether or not "faintness $\geq$ smudging" (step S102). At this determination, in this case the determination is made that the binary threshold value that should be found is smaller than 8 because smudging is greater than faintness, as can be seen from FIG. 37, so the dummy threshold value TH1 is set to 6 (step S103). Furthermore, the evaluation value is found at this dummy binary threshold value of 6, and the determination is made as to the size of the faintness and smudging at this time, i.e., the determination is made as to whether or not "faintness $\geq$ smudging" (step S104). At this determination, in this case "faintness smudging", so consequently the dummy binary threshold value TH1 is set to 7 (step S105). Furthermore, the evaluation value is found at this dummy binary threshold value TH1 of 7, and here "faintness $\geq$ smudging." Hence, because the dummy binary threshold value TH1 of 7 is close to faintness and a value TH1 of 8 is close to smudging, either of these can be the optimum binary threshold value. Thus the binary threshold value which corresponds to the smaller evaluation value out of these two evaluation values (or the three evaluation values that have been found) becomes the optimum binary threshold value for 16 gradations, so in this case, this optimum binary threshold value is TH1=7. In other words, the binary threshold value TH1 is determined to converge to 7 (step S106). In this way, in this case it is possible to determine the binary threshold value that should be found through three dummy binary threshold value determination processes and evaluation value computations.

Here, the above description has been for the case using evaluation value E found by adding the fifth characteristic amount to the fourth characteristic amount, but in cases using evaluation values found by simple subtraction or simple addition such as is shown in FIG. 6(*a*) or FIG. 8(*a*), by setting a point as a standard for the evaluation value (e.f., the dashed line showing in these figures), it becomes possible to conduct processes similar to that described above. In addition, the number of gradations is not restricted to 16, and the convergence method for determining the binary threshold value is not restricted to the above-described method either. In addition, when this is applied to a scanner, because input of multiple values of data requires time for data transfer, determining of the binary threshold value and binary input from the scanner may be conducted by inputting a binary value from the scanner at the dummy binary threshold value, and by successively changing the binary threshold value while performing the convergence determination and evaluation value computations with a personal computer. In addition, after multiple values are input in some regions and the binary threshold value has been determined, input of all binary data may be conducted through this binary threshold value. Furthermore, it is also possible to divide the input image into several regions (e.g., units of character rows) and to conduct determination of the binary threshold value in each of these divided regions.

As described above, with the third aspect of the present invention the place where the best image quality is obtained can be determined as the binary threshold value, and consequently by applying this third aspect of the present invention to a copy machine or a scanner or the like, it is possible to obtain high quality images with little faintness and smudging. In addition, by using such as a pre-process for OCRs, supposing that the default binary threshold value were TH1=8 conventionally as in the example shown in FIG. 37, it is possible to set this value to TH1=7 at which a high recognition rate is automatically obtained, and thus it is possible to obtain a high recognition rate.

Figure 39:
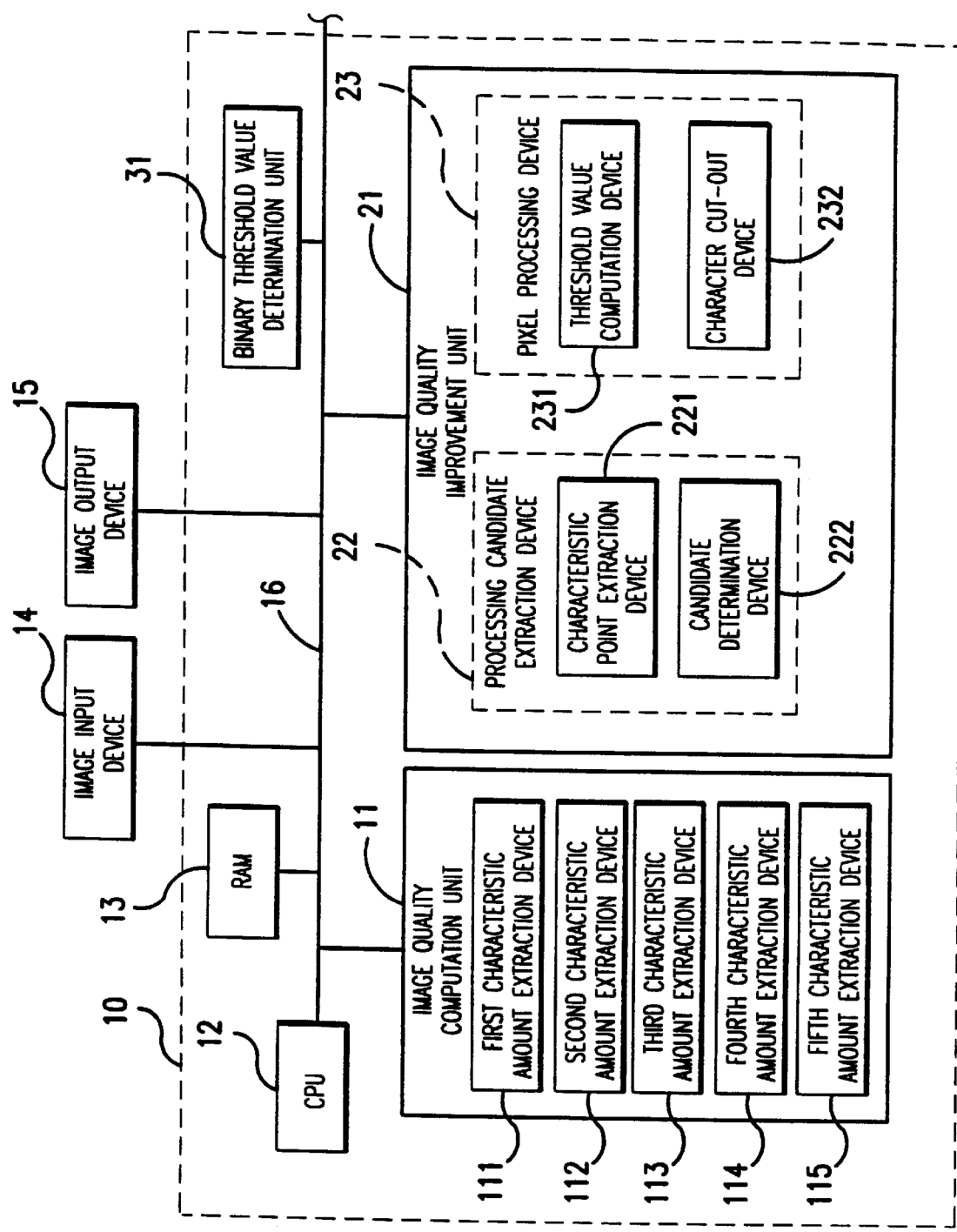
FIG. 39 is a block diagram of an image processing device combining an image quality computation unit, a binary threshold determination unit, and an image quality improvement unit.

FIG. 39 is a drawing showing the structure of an image processing device which, in addition to performing binary coding through a binary threshold value determination method such as described above, is also capable of a process to improve images which have been deteriorated by faintness and smudging, or the like. The basic structure here is the same as that of FIG. 27, and to this structure in FIG. 27 the binary threshold value determination unit 31 described in the above third aspect of the present invention has been provided. In other words, this device has a structure combining an image quality computation unit 11, an image quality improvement unit 21 and a binary threshold value determination unit 31.

The rough processes of this image processing device consist of conducting binary coding by determining the binary threshold value using the evaluation values found by the above-described image quality computation unit 11, and conducting a process to improve image quality using the above-described evaluation values with respect to the image after binary coding. Detailed descriptions have been provided hereinbefore of the evaluation value computation process in this process, the binary threshold value determination process using this evaluation value(s), and the process of improving image quality using the above-described evaluation values. Consequently, a description of the order of these processes is omitted here.

The process of performing binary coding by determining a binary threshold value using the evaluation values and the process of improving image quality using the above-described evaluation values with respect to the image following binary coding may be conducted by first performing binary coding by determining the binary threshold value for the entire surface of the image that is the object following which image improvement may be conducted, or these processes may be conducted in parallel (the process of conducting binary coding by determining the binary threshold value is performed first).

In this way, binary coding is conducted by determining a binary threshold value using the evaluation values found by the image quality computation unit 11, and a process is conducted to improve image quality by using the above-described evaluation values with respect to the image following binary coding, and through this it is possible to set the place where the best image quality is obtained as the binary threshold value. Consequently, it is possible to obtain a high quality image with little faintness and smudging in the binary coding gradations. In addition, in cases where the image quality is determined to be poor, it is possible to conduct a process to improve image quality. In other words, in a case where the original document is plagued with faintness, even if the binary threshold value is determined optimally, this does not mean that the faintness subsides. Hence, because copying can be conducted which restores the points of faintness (through pixel interpolation or the like) by conducting a process to improve image quality further, a copy of the document can be obtained which has better quality than the original document. In addition, because the process is conducted while determining image quality, there is no addition of extra processes when the quality of the document is good, so that there are no ill effects of such. Furthermore, even in character recognition devices, by determining the image quality prior to the character recognition process and then conducting image quality improvement processes in accordance with quality when it is determined that image quality is poor, it is possible to greatly increase the character recognition rate.

In addition, in the embodiments described thus far, the descriptions have primarily been of devices as applied to the Japanese language, but application to alphanumerics ($\alpha$N) is also possible by employing the following alterations.

First, the sections noting the first aspect of the present invention are handled as follows.

1) The formula for computing the first characteristic amount shown by formula (1) above is changed as shown below.

First characteristic amount=(frequency of appearance of one pixel characteristic points)/(frequency of black and white reversals)

Here, one pixel characteristic points are the characteristic points shown in FIGS. 3(a) and 3(b). The reason for this change is that in the case of alphanumerics, "faintness" sections are essentially all one pixel convex parts.

2) In formula (2) above, i.e. the formula for computing the second characteristic amount, which is:

Second characteristic amount=Number of black runs longer than the specified length/Total number of black runs.

The method of computing the threshold value TH2 for counting the number of black runs is changed. The threshold value TH2 in the first aspect of the present invention was found based on the number of pixels in a horizontal line close to the size of the character, but alphanumeric characters have low linearity horizontally in comparison to the Japanese language, making it difficult to determine the size of the character from a horizontal line. In addition, the determination can be accomplished with more accuracy by determining the size of alphabetic characters based on the thickness of a vertical line as the standard. From this point, the formula is taken to be:

Binary threshold value TH2=$\alpha$×(thickness of vertical line in character)

Here, $\alpha$ is in the range 3.0 to 4.0. This is because the size of alphabetic characters and the like is usually about 3 to 4 times the thickness of the vertical line in the character, and from experiments, the value $\alpha$=3.4 was found to be suitable. In other words, it can be determined that the length of the series of pixels of a character in the horizontal direction is about 3.4 times the thickness of the vertical line in the character. Here, the thickness of the vertical line of the character is taken as the average of the length of black runs at least six pixels long (corresponding to about one-third to one-fourth of the size of the character during 300 DPI input.)

In addition, the sections noting the second aspect of the present invention are handled as follows.

3) The pixel processing device 23 is changed

In alphanumerics, touching of an adjacent character near the base line of a character is relatively common, and because this does not cause a drop in the recognition rate even when there is a good deal of touching near the base line, and in addition because this does not make the character look bad as viewed by the naked eye, a threshold value in the interpolation process near the baseline and a threshold value in the interpolation process other than near the base line are determined separately.

This is described with reference to FIG. 40.

Figure 40:
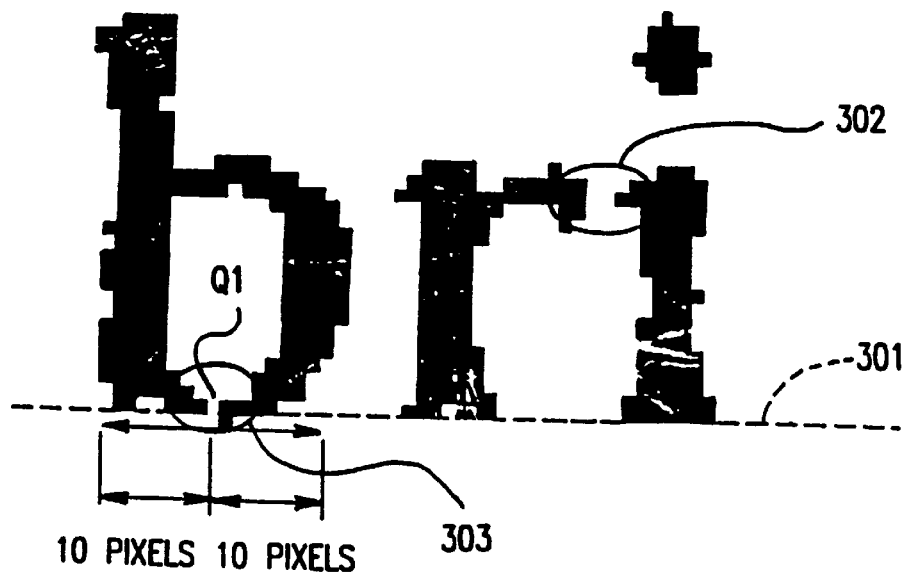
FIG. 40 is a drawing showing the detection of the base line when the present invention is applied to alpha numeric characters.

FIG. 40 shows an example wherein the letters "bri" have been written, and in the case of letters, as explained above, there is no drop in the recognition rate even when there is a good deal of touching of adjacent characters near the base line 301, and in addition this does not make the characters look bad when viewed by the naked eye. In contrast, in sections other than near the base line 301, for example when the section indicated by 302 in FIG. 40 merge, in this case the letters appear to form the letter "n". Accordingly, the threshold value TH3 is set small for sections other than near the base line 301, and to the extent possible, interpolation processes are not conducted. Near the base line 301, it is acceptable if the threshold value TH3 is somewhat large.

Detection of the base line 301 is accomplished when this kind of process is conducted by investigating a line about two pixels below a section which is a candidate for image deterioration, e.g. point Q1 in the section indicated by 303 in FIG. 40, and by determining that this point Q1 is on the base line if no black pixels exist within about 10 pixels to the left and right (a total of 20 pixels) centered at above-described Q1 on this line 301. The aforementioned 20 black pixels correspond roughly to the size of a single character.

Through performing this kind of process, it is possible to conduct pixel restoration even with alphanumeric characters.

With each of the above-described aspects of the present invention, examples were described wherein determination of threshold values and the like was conducted for cases where the character resolution was 300 DPI, but the present invention can also be applied to other resolutions. For example, each threshold value and the like may be multiplied by two-thirds in the case of a resolution of 200 DPI.

In addition, with each of the above-described aspects of the present invention, characters were the object of processing, and consequently, discrimination between drawings and charts and noise is determined by the length of the string of black pixels. In other words, the length of the string of black pixels in charts and drawings is normally considerably longer than that of characters, while conversely that of noise is shorter. Accordingly, charts and drawings and noise can be determined from this length, so that such do not become the object of processing. Charts and the like are not the object of processing of the present invention at the point of computing evaluation values, but the technology of tracing pixels in deteriorated sections and restoring such can be applied to this case also.

In addition, applications of the present invention to color are also possible. That is to say, it is possible to apply the present invention to such cases by conducting the processes described in these embodiments on each RBG that has been binary coded.

The image processing method of the present invention, as described above, includes an image quality computation process wherein a characteristic amount may be extracted to determine the image quality of the image data entered by an image input device, and wherein the characteristic amount may be computed as an evaluation value, and the image quality may be determined by the evaluation value obtained by the image quality computation process, resulting in more objective evaluation of the image quality, enabling more effective development of copy machines than does the traditional subjective evaluation. Moreover, using the evaluation values thus obtained, capabilities of copy machines are assessed more objectively and accurately.

Moreover, several patterns of pixel characteristics may be provided, to begin with, as characteristic points and the first characteristic amount which is the ratio of the frequency of the appearance of said characteristic points in the processing lines and the frequency of reversals of black pixels and white pixels may be computed to be used as an index for faintness, and the image quality may be determined using the first evaluation value; thus, deterioration due to faintness of the image is determined accurately.

Furthermore, the average length of a continuous string of black pixels nearly equivalent to the size of a character may be obtained, and the number of continuous strings of black pixels longer than the average continuous string of black pixels nearly equivalent to the size of a character may be computed. Then a second characteristic amount which is the ratio of the number of continuous strings of black pixels longer than the average length and one-half of the number of reversals of black pixels and white pixels may be computed to be used as an index for smudging; thus, deterioration due to smudging may be determined accurately.

In addition, the first characteristic amount to be used as an index for faintness and the second characteristic amount to be used as an index for smudging may be computed, and evaluation values based on these two types of characteristic amounts may be obtained, enabling more accurate determination of deteriorated sections of the image than when only the first or the second evaluation value is used. Especially in the case when the evaluation value is obtained by adding the first characteristic amount and the second characteristic amount, the binary threshold value which results in the best image quality can be determined easily by defining the threshold value corresponding to the part in which the evaluation value obtained by the two evaluation values becomes the smallest as the desired threshold value. In this manner, the binary threshold determining process may be simplified.

Moreover, a third characteristic amount representing the size of the character may be obtained in addition to said first characteristic amount. By adding the third characteristic amount representing the size of the character, the restoration process of the deteriorated section due to missing pixels, which increases in proportion to the size of the character, can be performed more effectively. Thus, addition of the third characteristic amount enables more effective execution of the image quality improvement process.

Furthermore, a third characteristic amount representing the size of the character may be obtained in addition to said second characteristic amount. By adding the third characteristic amount, more effective execution of the image quality improvement process is enabled in a similar manner as above.

In addition, a third characteristic amount representing the size of the character may be obtained in addition to said first and said second characteristic amount. In a similar manner as above, addition of the third characteristic amount enables more effective execution of the image quality improvement process. Moreover, by considering the third characteristic amount after determining the image quality using two types of characteristic amounts, the first and the second characteristic amounts, a more effective execution of the image quality improvement process is enabled.

Moreover, orthogonal transformation of the input image data into frequency regions may be performed, and a fourth characteristic amount to be used as an index for faintness may be computed by focusing on the high frequency component after orthogonal transformation. Then, by determining the image quality using a fourth evaluation value, which is the fourth characteristic amount computed above, deteriorated sections due to faintness of the image may be determined accurately. The orthogonal transformation also enables determination of the direction of the deterioration.

Furthermore, orthogonal transformation of the input image data into frequency regions may be performed, and a fifth characteristic amount to be used as an index for smudging may be computed by focusing on the low frequency component after orthogonal transformation. Then, by determining the image quality using a fifth evaluation value, which is the fifth characteristic amount computed above, deteriorated sections due to smudging of the image may be determined accurately.

In addition, a fourth characteristic amount to be used as an index for faintness and a fifth characteristic amount to be used as an index for smudging, both obtained in the frequency regions, may be computed, and evaluation values based on these two types of characteristic amounts may be obtained, enabling more accurate determination of deteriorated sections of the image than when only the fourth or the fifth evaluation value is used. Especially in the case when the evaluation value is obtained by adding the fourth characteristic amount and the fifth characteristic amount, the binary threshold value which results in the best image quality can be determined easily by defining the threshold value corresponding to the part in which the evaluation value obtained by adding two evaluation values becomes the smallest as the target binary threshold value. In this manner, the binary threshold determining process is simplified.

Moreover, a third characteristic amount representing the size of the character may be obtained in addition to said fourth characteristic amount. By adding the third characteristic amount representing the size of the character, the restoration process of the deteriorated section due to missing pixels, which increases in proportion to the size of the character, can be performed more effectively. Thus, addition of the third characteristic amount enables more effective execution of the image quality improvement process.

Furthermore, a third characteristic amount representing the size of the character may be obtained in addition to said fifth characteristic amount. By adding the third characteristic amount, more effective execution of the image quality improvement process may be enabled in a manner similar to the above.

In addition, a third characteristic amount representing the size of the character may be obtained in addition to said fourth and said fifth characteristic amount. In a similar manner as above, addition of the third characteristic amount enables more effective execution of the image quality improvement process. Moreover, by considering the third characteristic amount after determining the image quality using two types of characteristic amounts, the fourth and the fifth characteristic amounts, a more effective execution of the image quality improvement process is enabled.

Moreover, if different regions exist on an original to be processed, a restriction may be imposed on the ranges where said characteristic amount is extracted, and the evaluation value may be computed by extracting a characteristic amount from each range; thus, computation of an evaluation value matching each range is enabled even when different types of range, such as gothic fonts and mincho fonts, exist next to each other. Since an evaluation value matching each range is necessary in performing the image quality improvement process and the binary coding process, computation of an evaluation value matching each range becomes very effective.

Furthermore, by providing an image quality computation process to extract a characteristic amount to determine the image quality of the image data entered by an image input device, and to compute an evaluation value which is the extracted characteristic amount; and by providing an image quality improvement process to determine, from the characteristic amounts, candidates for the image quality improvement process by extracting sections which have the possibility of deteriorated image quality, and to execute the image quality improvement process on candidates for image quality improvement processing by using the evaluation values obtained by said image quality computation process, accurate determination of deteriorated image sections is enabled. Moreover, missing pixels in the deteriorated section are determined and the interpolation process of pixels is enabled only when pixels are missing due to deterioration; thus, accurate restoration of deteriorated pixels is realized. Therefore, by applying this to a copy machine, when an original has faintness, for example, the present invention produces a higher quality copy than the original by restoring the faint sections in the original; though, in general, the copied original has the same level of faintness or worse than the original. Moreover, the present invention executes processes while determining image quality, but it has no effect on an original with a high quality image, leaving the high quality original as it is. Also, the present invention can be applied to a character recognition device to obtain a high rate of recognition.

In addition, a processing candidate extraction process to extract candidates for image quality improvement processing, and pixel processing to interpolate pixels in executing image quality improvement on processing candidates extracted by the processing candidate extraction process may be provided, and only sections with deteriorated image quality may be extracted, where the image quality improvement process may be performed using evaluation values computed by said image quality computation unit. Thus, the image quality improvement process may be performed only when image quality is poor, preventing erroneous operations such as addition of new pixels in a section which was initially blank.

Moreover, by providing a characteristic point extraction process to detect and extract characteristic points generated by deterioration in a section with deteriorated image quality, and a candidate determination process to determine candidates for image quality improvement using the positional relationship of the characteristic points extracted by the characteristic point extraction process, characteristic points from pixels facing each other across an empty space produced by deterioration may be extracted and, using the positional relationship of the extracted characteristic points, determination of candidates for the image improvement process is enabled. Hence, deteriorated sections where the image improvement process is to be performed are extracted effectively and accurately.

Furthermore, a threshold computation process may be provided which, using the evaluation value obtained by said image quality computation process, obtains a threshold value from a function with the evaluation value as a variable, compares said threshold value with the interval on which interpolation of pixels is performed, and determines whether to perform the interpolation process of pixels based on the results of the comparison. Hence, the interpolation process may be performed only on deteriorated sections due to missing pixels according to the degree of image quality deterioration, preventing erroneous operations such as addition of new pixels in a section which was initially blank.

Furthermore, a character cutting-out process may be provided and pixel interpolation may be performed within the region of characters which are cut out by the character cutting-out process to improve image quality. Hence erroneous pixel interpolation operation between adjacent characters may be prevented without fail.

In addition, an image quality computation unit to extract a characteristic amount to determine the image quality of the image data entered by an image input device and to compute the characteristic amount as an evaluation value, and a binary threshold determination process to determine the binary threshold value for the image to be processed using the evaluation value obtained by the image quality computation process may be provided. Hence, a binary threshold value suitable for the character may be determined, minimizing faintness and smudging of the image after the binary coding process.

Moreover, the binary threshold value determination process may define a threshold value which, in case the evaluation value is obtained by adding the first evaluation value and the second evaluation value among the evaluation values obtained by said image quality computation process, corresponds to the section making the evaluation value, obtained by adding the two evaluation values, minimum as the target binary threshold value. Hence the binary threshold value producing the best image quality may be determined easily and the binary threshold value determination process may be simplified.

Furthermore, an image quality computation unit to extract a characteristic amount to determine the image quality of the image data entered by an image input device and to compute the characteristic amount as an evaluation value, a binary threshold determination process to determine the binary threshold value for an image to be processed using an evaluation value obtained by the image quality computation unit, and an image quality improvement process to determine candidates for the image quality improvement process by extracting sections which have the possibility of image quality deterioration based on the characteristics and to perform the image quality improvement process on candidates for image quality improvement processing using the evaluation value obtained by said image quality computation process may be provided, enabling determination of a binary threshold value suitable to the character. Hence, faintness and smudging of images after the binary coding process may be minimized, and the deteriorated section may be further improved. Application of the present invention to copy machines, character recognition devices, and the like will produce good results.

In addition, the image processing device of the present invention may include an image quality computation unit wherein a characteristic amount may be extracted to determine the image quality of the image data entered by an image input device, and wherein the characteristic amount may be computed as an evaluation value, and the image quality may be determined by the evaluation value obtained by the image quality computation unit, resulting in more objective evaluation of the image quality, enabling more effective development of copy machines than does traditional subjective evaluation. Moreover, using the evaluation values thus obtained, capabilities of copy machines may be assessed more objectively and accurately.

Moreover, several patterns of pixel characteristics may be provided, to begin with, as characteristic points; and the first characteristic amount, which is the ratio of the frequency of the appearance of said characteristic points in the processing lines and the frequency of the reversals of black pixels and white pixels, may be computed to be used as index for faintness; and image quality may be determined using the first evaluation value. Thus deterioration due to faintness of the image may be determined accurately.

Furthermore, the average length of a continuous string of black pixels nearly equivalent to the size of a character may be obtained, and the number of continuous strings of black pixels longer than the average continuous string of black pixels nearly equivalent to the size of a character may be computed. Then a second characteristic amount, which is the ratio of the number of continuous strings of black pixels longer than the average length and one-half of the number of reversals of black pixels and white pixels, may be computed to be used as an index for smudging. Thus deterioration due to smudging may be determined accurately.

In addition, the first characteristic amount to be used as an index for faintness and the second characteristic amount to be used as an index for smudging are computed, and evaluation values based on these two types of characteristic amounts may be obtained, enabling more accurate determination of deteriorated sections of the image than when only the first or the second evaluation value is used. Especially in the case when an evaluation value is obtained by adding the first characteristic amount and the second characteristic amount, the binary threshold value which results in the best image quality can be determined easily by defining the threshold value corresponding to the part in which the evaluation value obtained by the two evaluation values becomes the smallest as the target binary threshold value. In this manner, the binary threshold determining process may be simplified.

Moreover, in a third characteristic amount representing the size of the character may be obtained in addition to said first characteristic amount. By adding the third characteristic amount representing the size of the character, the restoration process of the deteriorated section due to missing pixels, which increases in proportion to the size of the character, can be performed more effectively. Thus, addition of the third characteristic amount enables more effective execution of the image quality improvement process.

Furthermore, a third characteristic amount representing the size of the character may be obtained in addition to said second characteristic amount. By adding the third characteristic amount, more effective execution of the image quality improvement process is enabled in a manner similar to the above.

In addition, a third characteristic amount representing the size of the character may be obtained in addition to said first and said second characteristic amount. In a similar manner as above, addition of the third characteristic amount enables more effective execution of the image quality improvement process. Moreover, by considering the third characteristic amount after determining the image quality using two types of characteristic amounts, the first and the second characteristic amounts, a more effective execution of the image quality improvement process is enabled.

Moreover, orthogonal transformation of the input image data into frequency regions may be performed, and a fourth characteristic amount to be used as an index for faintness may be computed by focusing on the high frequency component after orthogonal transformation. Then, by determining the image quality using a fourth evaluation value, which is the fourth characteristic amount computed above, deteriorated sections due to faintness of the image may be determined accurately. The orthogonal transformation also enables determination of the direction of the deterioration.

Furthermore, in orthogonal transformation of the input image data into frequency regions may be performed, and a fifth characteristic amount to be used as an index for smudging may be computed by focusing on the low frequency component after orthogonal transformation. Then, by determining the image quality using a fifth evaluation value, which is the fifth characteristic amount computed above, deteriorated sections due to smudging of the image may be determined accurately.

In addition, in the fourth characteristic amount to be used as an index for faintness and the fifth characteristic amount to be used as an index for smudging, both obtained in the frequency regions, may be computed, and evaluation values based on these two types of characteristic amounts may be obtained, enabling more accurate determination of deteriorated sections of the image than when only the fourth or the fifth evaluation value is used. Especially in the case when an evaluation value is obtained by adding the fourth characteristic amount and the fifth characteristic amount, the binary threshold value which results in the best image quality can be determined easily by defining the threshold value corresponding to the part in which the evaluation value obtained by adding two evaluation values becomes the smallest as the desired threshold value. In this manner, the binary threshold determining process may be simplified.

Moreover, a third characteristic amount representing the size of the character may be obtained in addition to said fourth characteristic amount. By adding the third characteristic amount representing the size of S the character, the restoration process of a deteriorated section due to missing pixels, which increases in proportion to the size of the character, can be performed more effectively. Thus, addition of the third characteristic amount enables more effective execution of the image quality improvement process.

Furthermore, in a third characteristic amount representing the size of the character may be obtained in addition to said fifth characteristic amount. By adding the third characteristic amount, more effective execution of the image quality improvement process is enabled in a similar manner as above.

In addition, a third characteristic amount representing the size of the character may be obtained in addition to said fourth and fifth characteristic amount. In a similar manner as above, addition of the third characteristic amount enables more effective execution of the image quality improvement process. Moreover, by considering the third characteristic amount after determining the image quality using two types of characteristic amounts, the fourth and the fifth characteristic amounts, a more effective execution of the image quality improvement process is enabled.

Moreover, if different regions exist on the original to be processed, restrictions may be imposed on the ranges where said characteristic amount is extracted, and the evaluation value may be computed by extracting a characteristic amount from each range. Thus, computation of an evaluation value matching each range is enabled, even when different types of range, such as gothic fonts and mincho fonts, exist next to each other. Since an evaluation value matching each range is necessary in performing the image quality improvement process and the binary coding process, computation of an evaluation value matching each range becomes very effective.

Furthermore, by providing an image quality computation unit to extract a characteristic amount to determine the image quality of the image data entered by an image input device and to compute an evaluation value which is the extracted characteristic amount; and an image quality improvement process to determine, from the characteristic amounts, candidates for the image quality improvement process by extracting sections which have the possibility of deteriorated image quality, and to execute the image quality improvement process on candidates for image quality improvement processing by using evaluation values obtained by said image quality computation unit, accurate determination of deteriorated image sections is enabled. Moreover, missing pixels in the deteriorated section are determined and the interpolation process of pixels is enabled only when pixels are missing due to deterioration; thus, accurate restoration of deteriorated pixels is realized. Therefore, by applying this to a copy machine, when an original has faintness, for example, the present invention produces a higher quality copy than the original by restoring faint sections in the original; though, in general, the copied original has the same or worse faintness than the original. Moreover, while the present invention executes processes while determining image quality, it has no effect on an original with a high quality image, leaving the high quality original as it is. Also, the present invention can be applied to a character recognition device to obtain a high rate of recognition.

In addition, a processing candidate extraction device to extract candidates for image quality improvement processing, and pixel processing to interpolate pixels in executing image quality improvement on the processing candidates extracted by the processing candidate extraction device may be provided, and only sections with deteriorated image quality are extracted, and the image quality improvement process may be performed using the evaluation values computed by said image quality computation unit. Thus, the image quality improvement process is performed only when the image quality is poor, preventing, erroneous operations such as addition of new pixels in a section which was initially blank.

Moreover, by providing a characteristic point extraction device to detect and extract the characteristic points generated by deterioration in a section with deteriorated image quality, and a candidate determination device to determine candidates for image quality improvement using the positional relationship of the characteristic points extracted by the characteristic point extraction device, characteristic points from pixels facing each other across an empty space produced by deterioration may be extracted and, using the positional relationship of the extracted characteristic points, determination of candidates for the image improvement process is enabled. Hence, deteriorated sections where the image improvement process is performed are extracted effectively and accurately.

Furthermore, a threshold computation means may be provided which, using the evaluation value obtained by said image quality computation unit, obtains a threshold value from a function with the evaluation value as a variable, compares said threshold value with the interval on which interpolation of pixels is performed, and determines whether or not to perform the interpolation process of pixels based on the results of the comparison. Hence, the interpolation process may be performed only on deteriorated sections due to missing pixels according to the degree of image quality deterioration, preventing, erroneous operations such as addition of new pixels in a section which was initially blank.

Furthermore, a character cutting-out means may be provided and pixel interpolation may be performed within the region of characters which are cut out by the character cutting-out means to improve the image quality. Hence erroneous pixel interpolation operation between adjacent characters may be prevented.

In addition, an image quality computation unit to extract a characteristic amount to determine the image quality of the image data entered by an image input device and to compute the characteristic amount as an evaluation value, and a binary threshold determination means to determine the binary threshold value for the image to be processed using the evaluation value obtained by the image quality computation unit may be provided. Hence, a binary threshold value suitable for the character is determined, minimizing faintness and smudging of the image after the binary coding process.

Moreover, the binary threshold value determination process may define a threshold value which, in case the evaluation value is obtained by adding the first evaluation value and the second evaluation value, among the evaluation values obtained by said image quality computation unit, corresponds to the section making the evaluation value obtained by adding the two evaluation values minimum as the target binary threshold value. Hence, the binary threshold value producing the best image quality may be determined easily, and the binary threshold value determination process may be simplified.

Furthermore, an image quality computation unit to extract a characteristic amount to determine the image quality of the image data entered by an image input device and to compute the characteristic amount as an evaluation value, a binary threshold determination means to determine a binary threshold value for the image to be processed using an evaluation value obtained by the image quality computation unit, and an image quality improvement unit to determine candidates for the image quality improvement unit by extracting sections which have the possibility of image quality deterioration based on the characteristics and to perform the image quality improvement unit on candidates for image quality improvement processing using the evaluation value obtained by said image quality computation unit may be provided, enabling determination of a binary threshold value suitable to the character. Hence, faintness and smudging of images after the binary coding process may be minimized and the deteriorated section may be further improved. Application of the present invention to copy machines, character recognition devices, and the like will produce good results.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An image processing method for an image processing device, comprising:
    inputting binary coded pixel character image data to the image processing device;
    dividing the binary coded pixel character image data into a plurality of data blocks representative of blocks of pixels of an image;
    performing a first orthogonal transformation with respect to the data blocks;
    determining an evaluation value based on the first orthogonal transformation performed with respect to the data blocks;
    modifying pixel values of the binary coded pixel character image data based on the evaluation value to produce modified binary coded pixel character image data; and
    outputting the modified binary coded pixel character image data.

2. A method according to claim 1, further including performing a second orthogonal transformation with respect to said data blocks, wherein said evaluation value is a function of one of:
    a sum of the first and second orthogonal transformations; and
    a difference between the first and second orthogonal transformations.

3. A method according to claim 1, wherein modifying the pixel values of the binary coded pixel character image data comprises correcting the pixel values of the binary coded pixel character image data based on the evaluation value to produce corrected binary coded pixel character image data that more closely corresponds to an ideal version of the image.

4. A method according to claim 1, wherein the modified binary coded pixel character image data is corrected binary coded pixel character image data that more closely corresponds to an ideal version of the image.

5. A method according to claim 1, wherein modifying the pixel values of the binary coded pixel character image data comprises improving the pixel values of the binary coded pixel character image data based on the evaluation value to produce improved binary coded pixel character image data that more closely corresponds to an ideal version of the image.

6. A method according to claim 1, wherein the modified binary coded pixel character image data is improved binary coded pixel character image data that more closely corresponds to an ideal version of the image.

7. An image processing device comprising:
    an image input device that inputs binary coded pixel character image data to the image processing device;
    an image quality computation unit that divides a plurality of pixels of the binary coded pixel character image data into blocks of pixels, determines an evaluation value based on an orthogonal transformation performed with respect to the blocks of pixels, and determines input image quality based on the evaluation value;
    an image quality improvement unit that determines a first plurality of sections of the binary coded pixel character image data as potential deteriorated sections and modifies pixel values of the binary coded pixel character image data in at least some of said first plurality of sections to produce modified binary coded pixel character image data based on said evaluation value; and
    an image output device that outputs said modified binary coded pixel character image data.

8. An image processing device according to claim 7, wherein said evaluation value is a function of one of a sum and a difference of orthogonal transformations performed with respect to the blocks of pixels.

9. An image processing device according to claim 7, wherein the image quality improvement unit corrects the pixel values of the binary coded pixel character image data in at least some of said first plurality of sections based on said evaluation value to produce corrected binary coded pixel character image data that more closely corresponds to an ideal version of the image.

10. An image processing device according to claim 7, wherein the modified binary coded pixel character image data is corrected binary coded pixel character image data that more closely corresponds to an ideal version of the image.

11. An image processing device according to claim 7, wherein the image quality improvement unit improves the pixel values of the binary coded pixel character image data in at least some of said first plurality of sections based on said evaluation value to produce improved binary coded pixel character image data that more closely corresponds to an ideal version of the image.

12. An image processing device according to claim 7, wherein the modified binary coded pixel character image data is improved binary coded pixel character image data that more closely corresponds to an ideal version of the image.

13. An image processing method for an image processing device, comprising:

inputting binary coded pixel character image data to the image processing device;

dividing the binary coded pixel character image data into a plurality of data blocks representative of blocks of pixels of an image;

performing a first orthogonal transformation with respect to the data blocks;

determining an evaluation value based on the first orthogonal transformation performed with respect to the data blocks;

correcting the binary coded pixel character image data based on the evaluation value to produce corrected binary coded pixel character image data that more closely corresponds to an ideal version of the image; and outputting the corrected binary coded pixel character image data.

14. An image processing device comprising:

an image input device that inputs binary coded pixel character image data to the image processing device;

an image quality computation unit that divides a plurality of pixels of the binary coded pixel character image data into blocks of pixels, determines an evaluation value based on an orthogonal transformation performed with respect to the blocks of pixels, and determines input image quality based on the evaluation value;

an image quality improvement unit that determines a first plurality of sections of the binary coded pixel character image data as potential deteriorated sections and corrects the binary coded pixel character image data in at least some of said first plurality of sections to produce, based on said evaluation value, corrected binary coded pixel character image data that more closely corresponds to an ideal version of the image; and an image output device that outputs said corrected binary coded pixel character image data.

15. An image processing method for an image processing device, comprising:

inputting binary coded pixel character image data to the image processing device;

dividing the binary coded pixel character image data into a plurality of data blocks representative of blocks of pixels of an image;

performing a first orthogonal transformation with respect to the data blocks;

determining an evaluation value based on the first orthogonal transformation performed with respect to the data blocks;

improving the binary coded pixel character image data based on the evaluation value to produce improved binary coded pixel character image data that more closely corresponds to an ideal version of the image; and outputting the corrected binary coded pixel character image data.

16. An image processing device comprising:

an image input device that inputs binary coded pixel character image data to the image processing device;

an image quality computation unit that divides a plurality of pixels of the binary coded pixel character image data into blocks of pixels, determines an evaluation value based on an orthogonal transformation performed with respect to the blocks of pixels, and determines input image quality based on the evaluation value;

an image quality improvement unit that determines a first plurality of sections of the binary coded pixel character image data as potential deteriorated sections and improves the binary coded pixel character image data in at least some of said first plurality of sections to produce, based on said evaluation value, improved binary coded pixel character image data that more closely corresponds to an ideal version of the image; and an image output device that outputs said corrected binary coded pixel character image data.

* * * * *